US012606657B2

(12) United States Patent
Lambic et al.

(10) Patent No.: US 12,606,657 B2
(45) Date of Patent: Apr. 21, 2026

(54) ISOTACTIC PROPYLENE HOMOPOLYMERS AND COPOLYMERS PRODUCED WITH C1 SYMMETRIC METALLOCENE CATALYSTS

(71) Applicant: ExxonMobil Chemical Patents Inc., Baytown, TX (US)

(72) Inventors: Nikola S. Lambic, Houston, TX (US); Tzu-Pin Lin, Seabrook, TX (US); Lubin Luo, Houston, TX (US); Maksim Shivokhin, Houston, TX (US); Laughlin G. McCullough, League City, TX (US); Carlos R. Lopez-Barron, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 747 days.

(21) Appl. No.: 17/636,194

(22) PCT Filed: Jul. 27, 2020

(86) PCT No.: PCT/US2020/043758
§ 371 (c)(1),
(2) Date: Feb. 17, 2022

(87) PCT Pub. No.: WO2021/034459
PCT Pub. Date: Feb. 25, 2021

(65) Prior Publication Data

US 2022/0315680 A1 Oct. 6, 2022

Related U.S. Application Data

(60) Provisional application No. 62/890,410, filed on Aug. 22, 2019.

(30) Foreign Application Priority Data

Feb. 18, 2020 (EP) .................................... 20157983

(51) Int. Cl.
*C08F 210/06* (2006.01)
*C07F 17/00* (2006.01)
*C08F 110/06* (2006.01)

(52) U.S. Cl.
CPC ............ *C08F 210/06* (2013.01); *C07F 17/00* (2013.01); *C08F 110/06* (2013.01); *C08F 2420/07* (2021.01)

(58) Field of Classification Search
None
See application file for complete search history.

(56) References Cited

U.S. PATENT DOCUMENTS 5,041,584 A 8/1991 Crapo et al. .................. 556/179
5,153,157 A 10/1992 Hlatky et al. ................ 502/117
(Continued)

FOREIGN PATENT DOCUMENTS

EP 0573120 11/1998 .............. C08F 10/00
EP 1256594 11/2002 ............ C08F 210/06
(Continued)

OTHER PUBLICATIONS

Periodic Table, Chemical and Engineering News, v. 63(5), p. 27 (1985). (Year. 1985).*
(Continued)

*Primary Examiner* — Catherine S Branch
(74) *Attorney, Agent, or Firm* — Vorys, Sater, Seymour and Pease LLP

(57) ABSTRACT

The present disclosure provides catalyst compounds comprising asymmetric bridged metallocenes containing a ligand having at least one saturated ring, catalyst systems including such compounds, and uses thereof. Catalyst compounds of the present disclosure can include indacenyl-type ligands. In another class of embodiments, the present disclosure is directed to polymerization processes to produce
(Continued)

polyolefin polymers from catalyst systems including one or more olefin polymerization catalysts, at least one activator, and an optional support.

28 Claims, 8 Drawing Sheets

(56) References Cited

U.S. PATENT DOCUMENTS

| | | | | |
|---|---|---|---|---|
| 5,447,895 | A | 9/1995 | Marks et al. | 502/117 |
| 5,453,410 | A | 9/1995 | Kolthammer et al. | 502/155 |
| 5,504,171 | A | 4/1996 | Etherton | 526/336 |
| 6,175,409 | B1 | 1/2001 | Nielsen et al. | 356/337 |
| 6,211,105 | B1 | 4/2001 | Holtcamp | 502/103 |
| 6,260,407 | B1 | 7/2001 | Petro et al. | 73/61.52 |
| 6,294,388 | B1 | 9/2001 | Petro | 436/8 |
| 6,306,658 | B1 | 10/2001 | Turner et al. | 436/37 |
| 6,406,632 | B1 | 6/2002 | Safir et al. | 210/656 |
| 6,436,292 | B1 | 8/2002 | Petro | 210/656 |
| 6,454,947 | B1 | 9/2002 | Safir et al. | 210/656 |
| 6,455,316 | B1 | 9/2002 | Turner et al. | 436/37 |
| 6,461,515 | B1 | 10/2002 | Safir et al. | 210/656 |
| 6,475,391 | B2 | 11/2002 | Safir et al. | 210/656 |
| 6,489,168 | B1 | 12/2002 | Wang et al. | 436/37 |
| 6,491,816 | B2 | 12/2002 | Petro | 210/198.2 |
| 6,491,823 | B1 | 12/2002 | Safir et al. | 210/656 |
| 6,578,413 | B2 | 6/2003 | Sentmanat | 73/160 |
| 6,691,569 | B1 | 2/2004 | Sentmanat | 73/261 |
| 6,780,936 | B1 | 8/2004 | Agarwal et al. | 525/191 |
| 6,977,287 | B2 | 12/2005 | Agarwal et al. | 526/339 |
| 7,005,491 | B2 | 2/2006 | Weng et al. | 526/336 |
| 8,404,880 | B2 | 3/2013 | Kaji et al. | 556/179 |
| 8,658,556 | B2 | 2/2014 | Stewart | 502/202 |
| 8,975,209 | B2 | 3/2015 | Kaji et al. | 502/439 |
| 9,266,910 | B2 | 2/2016 | McCullough | C07F 7/00 |
| 9,309,340 | B2 | 4/2016 | Ishihama et al. | C08F 210/16 |
| 9,340,630 | B2 | 5/2016 | Kaji et al. | C08F 110/02 |
| 9,458,254 | B2 | 10/2016 | Canich et al. | C08F 4/65912 |
| 9,803,037 | B1 | 10/2017 | Canich et al. | C08F 10/00 |
| 10,280,240 | B2 | 5/2019 | Hagadorn et al. | C08F 110/06 |
| 2001/0007896 | A1 | 7/2001 | Agarwal et al. | 526/335 |
| 2002/0013440 | A1 | 1/2002 | Agarwal et al. | 526/335 |
| 2004/0087750 | A1 | 5/2004 | Agarwal et al. | 526/336 |
| 2008/0045638 | A1 | 2/2008 | Chapman et al. | 524/425 |
| 2015/0119539 | A1 | 4/2015 | McCullough | C08F 4/76 |
| 2015/0322184 | A1 | 11/2015 | Hlavinka et al. | C08F 210/14 |
| 2016/0244535 | A1 | 8/2016 | Canich et al. | C08F 4/76 |
| 2017/0342175 | A1* | 11/2017 | Hagadorn | C08F 210/16 |
| 2018/0162964 | A1 | 6/2018 | Yang et al. | C08F 10/06 |
| 2019/0119418 | A1 | 4/2019 | Yang et al. | C08F 210/14 |
| 2019/0119427 | A1 | 4/2019 | Chae et al. | C08F 236/06 |
| 2019/0292282 | A1 | 9/2019 | Yang et al. | C08F 210/16 |
| 2019/0330139 | A1 | 10/2019 | Faler et al. | C07C 211/64 |
| 2019/0330392 | A1 | 10/2019 | Faler et al. | C08F 10/02 |
| 2022/0185916 | A1* | 6/2022 | Kim | C08F 4/65916 |

FOREIGN PATENT DOCUMENTS

| | | | |
|---|---|---|---|
| EP | 2402353 | 4/2018 | C07F 17/00 |
| EP | 6402660 | 10/2018 | C07F 17/00 |
| EP | 3441407 | 2/2019 | C08F 10/06 |
| JP | 2003-199282 | 7/2003 | H02K 5/124 |
| JP | 2012-121882 | 6/2012 | C07F 17/00 |
| KR | 10-20170009596 | 1/2017 | C08F 4/6592 |
| KR | 10-20180055601 | 5/2018 | C07F 17/00 |
| WO | WO1994/007928 | 4/1994 | C08F 10/02 |
| WO | WO1995/014044 | 5/1995 | C08F 4/02 |
| WO | WO2000/009255 | 2/2000 | B01J 19/00 |
| WO | WO2001/048034 | 7/2001 | C08F 210/06 |
| WO | WO2002/002575 | 1/2002 | C07F 17/00 |
| WO | WO2005/058916 | 6/2005 | C07C 13/553 |
| WO | WO2006/097497 | 9/2006 | C07F 17/00 |
| WO | WO2011/012245 | 2/2011 | C08F 10/00 |
| WO | WO2015/009471 | 1/2015 | C08F 4/6592 |
| WO | WO2015/158790 | 10/2015 | C08F 210/16 |
| WO | WO2017/196331 | 11/2017 | B29C 67/00 |
| WO | WO2017/204830 | 11/2017 | C08F 4/659 |
| WO | WO2018/122134 | 7/2018 | C07F 17/00 |
| WO | WO2019/093630 | 5/2019 | C08F 10/06 |
| WO | WO2020/002654 | 1/2020 | C08F 11/06 |

OTHER PUBLICATIONS

Girolami, G. S., "A Simple "Back of the Envelope" Method for Estimating the Densities and Molecular Volumes of Liquids and Solids," *Journal of Chemical Education*, v.71(11), Nov. 1994, pp. 962-964.

Langston, J. A. et al. (2007) "Synthesis and Characterization of Long Chain Branched Isotactic Polypropylene via Metallocene Catalyst and T-Reagent," *Macromolecules*, v.40(8), pp. 2712-2720.

Murphy et al. (2003) "A Fully Integrated High-Throughput Screening Methodology for the Discovery of New Polyolefin Catalysts: Discovery of a New Class of High Temperature Single-Site Group (IV) Copolymerization Catalysts," *J. Am. Chem. Soc.*, v.125, pp. 4306-4317.

Nifant'ev, I. E. et al. (2011) "Asymmetric ansa-Zirconocenes Containing a 2-Methyl-4-aryltetrahydroindacene Fragment: Synthesis, Structure, and Catalytic Activity in Propylene Polymerization and Copolymerization," *Organometallics*, v.30(21), pp. 5744-5752.

Rieger, B. and Kukral, J. et al. (2000) "Dual-Side ansa-Zirconocene Dichlorides for High Molecular Weight Isotactic Polypropene Elastomers," *Organometallics*, v.19(19), pp. 3767-3775.

Rieger, B. and Schobel, A. et al. (2013) "Polymerization Behavior of C1-Symmetric Metallocenes (M=Zr, Hf): from Ultrahigh Molecular Weight Elastic Polypropylene to Useful Macromonomers," *Organometallics*, v.32(2), pp. 427-437.

Sentmanat, M. et al. (2005) "Measuring the Transient Extensional Rheology of Polyethylene Melts using the SER Universal Testing Platform," *Soc. of Rheology—J. Rheol.*, v.49(3), pp. 585-606.

Sun, T. et al. (2001) "Effect of Short Chain Branching on the Coil Dimensions of Polyolefins in Dulute Solution," *Macromolecules*, v.34, p. 6812.

Walter, P. et al. (2001) "Long Chain Branched Polypropene Prepared by Means of Propene Copolymerization with 1,7-Octadiene Using MAO-Activated rac-$Me_2Si(2\text{-}Me\text{-}4\text{-}Phenyl\text{-}Ind)_2ZrCl_2$," *Macromol. Mater. Eng.*, v.286(5), pp. 309-315.

Ye, Z. et al. (2004) "Synthesis and Rheological Properties of Long-Chain-Branched Isotactic Polypropylenes Prepared by Copolymerization of Propylene and Nonconjugated Dienes," *Ind. Eng. Chem. Res.*, v.43(11), pp. 2860-2870.

* cited by examiner

ISOTACTIC PROPYLENE HOMOPOLYMERS AND COPOLYMERS PRODUCED WITH C1 SYMMETRIC METALLOCENE CATALYSTS

CROSS-REFERENCE TO RELATED APPLICATIONS

This application is a national stage filing of Patent Cooperation Treaty Application No. PCT/US2020/043758 filed Jul. 27, 2020, which claims priority to and the benefit of U.S. Provisional Patent Application Ser. No. 62/890,410, filed Aug. 22, 2019, and EP 20157983.6 filed Feb. 18, 2020, the disclosures of the Provisional and EP applications are herein incorporated by reference.

FIELD

The present disclosure generally relates to catalyst compounds comprising asymmetric bridged metallocenes containing indacenyl ligands, catalyst systems including such, and uses thereof.

BACKGROUND

Isotactic polypropylene having high melting temperature ($T_m$) and high melt strength is useful for a variety of applications, e.g., for the production of polypropylene foams and blown films, and for thermoforming. Common catalysts for high crystallinity polypropylene (PP) are racemic isomers of bis-indenyl zirconocenes. Although these catalysts are attractive due to their high activity and molecular weight capability, the catalysts generally suffer from deactivation in the presence of higher alpha olefins and higher dienes, particularly at high concentrations thereof. Furthermore, the preparation of such catalysts often requires a separation of the racemic isomer from the mixture, thereby increasing their production costs.

In addition, conventional catalyst systems and uses thereof in polymerization processes typically produce highly linear polypropylene with insufficient melt strength for applications such as foams, blown films, and thermoforming. In order to increase the melt strength of the polypropylene, post-reactor modifications to increase branching in the polymer are often performed. Post-reactor processes, e.g., reacting the polypropylene with a peroxydicarbonate, further increase the production costs of high melt strength polypropylene.

Therefore, there is still a need for new and improved catalyst systems for the polymerization of olefins in order to achieve specific polymer properties such as high melting point, high melt strength, and high molecular weight, and to increase conversion and/or comonomer incorporation without catalyst deactivation at high comonomer (such as diene) concentrations. Achieving these catalyst system and polymer properties at reduced costs relative to conventional systems remains a need.

References of interest include: U.S. Pat. Nos. 9,309,340; 9,266,910; 7,005,491; 6,977,287; 6,780,936; 5,504,171; 9,266,910; 9,458,254; 9,803,037; 10,280,240; US 2001/0007896; US 2002/0013440; US 2004/0087750; US 2015/0322184; US 2016/0244535; US 2018/0162964; US 2019/0119418; US 2019/0119427; US 2019/0292282; EP 3441407; EP 2402353; WO 2002/02575; WO 2005/058916; WO 2006/097497; WO 2011/012245; WO 2015/009471; WO 2015/158790; WO 2017/204830; WO 2019/093630, Nifant'ev, I. E. et al. (2011) "Asymmetric ansa-Zirconocenes Containing a 2-Methyl-4-aryltetrahydroindacene Fragment: Synthesis, Structure, and Catalytic Activity in Propylene Polymerization and Copolymerization" *Organometallics*, v. 30, pp. 5744-5752; Rieger, B. et al. (2000) "Dual-Side ansa-Zirconocene Dichlorides for High Molecular Weight Isotactic Polypropene Elastomers," *Organometallics*, v. 19(19), pp. 3767-3775; Rieger, B. et al. (2013) "Polymerization Behavior of $C_1$-Symmetric Metallocenes (M=Zr, Hf): from Ultrahigh Molecular Weight Elastic Polypropylene to Useful Macromonomers," *Organometallics*, v. 32, pp. 427-437; Peacock, A. et al. (2006) "Molecular Characterization of Polymers," *Polymer Chemistry*, Chap. 5, pp. 77-87; Walter, P. et al. (2001) "Long Chain Branched Polypropene Prepared by Means of Propene Copolymerization with 1,7-Octadiene Using MAO-Activated rac-$Me_2Si$(2-Me-4-Phenyl-Ind)$_2ZrCl_2$," *Macromol. Mater. Eng.* v. 286 (5), pp. 309-315; Langston, J. A. et al. (2007) "Synthesis and Characterization of Long Chain Branched Isotactic Polypropylene via Metallocene Catalyst and T-Reagent," *Macromolecules*, v. 40(8), pp. 2712-2720; and Ye, Z. et al. (2004) "Synthesis and Rheological Properties of Long-Chain-Branched Isotactic Polypropylenes Prepared by Copolymerization of Propylene and Nonconjugated Dienes," *Ind. Eng. Chem. Res., v.* 43(11), pp. 2860-2870.

SUMMARY

This disclosure relates to catalyst compounds represented by Formula (I):

(I)

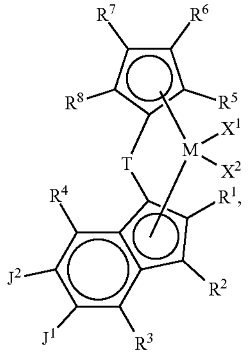

wherein:

M is a Group 4 metal;

T is a bridging group;

each of $X^1$ and $X^2$ is a univalent anionic ligand, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R''—SiR'$_3$, where R'' is $C_1$-$C_{10}$ alkyl and each R' is hydrogen, halogen, $C_1$-$C_{10}$ alkyl, or $C_6$-$C_{10}$ aryl;

$R^3$ is an unsubstituted $C_4$-$C_{62}$ cycloalkyl, a substituted $C_4$-$C_{62}$ cycloalkyl, an unsubstituted $C_4$-$C_{62}$ aryl, a substituted $C_4$-$C_{62}$ aryl, an unsubstituted $C_4$-$C_{62}$ heteroaryl, or a substituted $C_4$-$C_{62}$ heteroaryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof; and $J^1$ and $J^2$ are joined to form a substituted or unsubstituted $C_4$-$C_{62}$ saturated or unsaturated cyclic or polycyclic ring structure, or a combination thereof, provided that $J^1$ and $J^2$ together with the two carbons they are bound to on the indenyl group form at least one saturated ring.

In another embodiment, the present disclosure provides a catalyst system including an activator and a catalyst of the present disclosure.

In another embodiment, the present disclosure provides a process to prepare an olefin polymer. The process includes introducing olefin monomers to a catalyst system in a reactor, typically at a reactor pressure of from 0.7 bar to 70 bar and a reactor temperature of from 20° C. to 150° C.; and obtaining an olefin polymer.

In another embodiment, the present disclosure provides a process to prepare a propylene homopolymer or copolymer. The process includes introducing propylene and, optionally, one or more of a $C_2$ or $C_4$ to $C_{40}$ olefin comonomer to a catalyst system in a reactor, typically at a reactor pressure of from 0.7 bar to 70 bar and reactor temperature of from 20° C. to 150° C.; and obtaining a propylene homopolymer or copolymer.

DETAILED DESCRIPTION

Figure 1A:
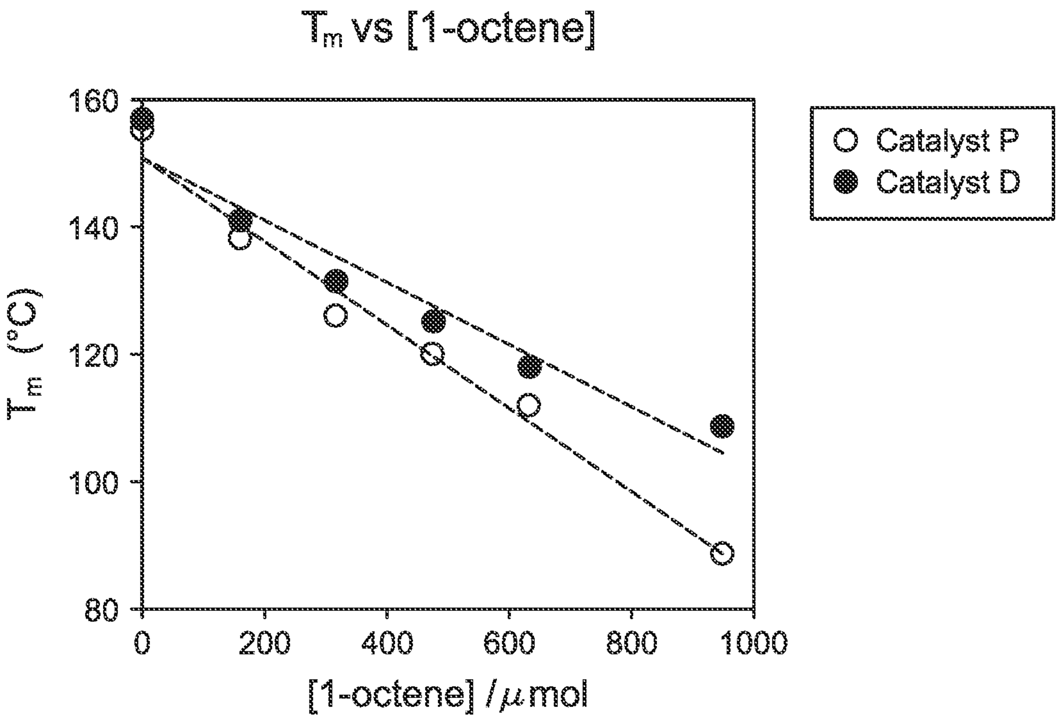
FIG. 1A (FIG. 1A) is a plot of $T_m$ versus 1-octene concentration for polymers prepared with example catalysts of the present disclosure and with comparative catalysts.

The present disclosure provides catalyst compounds comprising asymmetric bridged metallocenes. In some examples, these asymmetric bridged metallocenes contain indacenyl-type ligands. Catalyst systems comprising such catalyst compounds can be used for olefin polymerization processes. The catalyst systems described herein can achieve increased activity, can produce polymers having enhanced properties, and can increase conversion and/or comonomer incorporation. Catalyst systems and processes described herein can provide polymers useful for, e.g., foams, blown films, and thermoforming, among other things.

The catalyst systems and processes described herein rival and/or surpass other catalyst systems in producing polymers having, e.g., high molecular weight capability and high crystallinity, while displaying high catalyst activities and high comonomer (e.g., alpha-olefin and diene) incorporation. These high activities can be retained even when the comonomer is a higher alpha olefin or a higher diene (e.g., carbon numbers from about 4 to about 25), and even at high comonomer concentration.

The inventors have found that the instant catalyst systems incorporating the asymmetric bridged metallocenes of the present disclosure produce propylene homopolymers with improved $T_m$ (higher crystallinity, e.g., the $T_m$ of from about 155° C. to about 160° C. or more) and at activities comparable to or higher than activities of known asymmetric catalysts and $C_2$ symmetric catalysts.

In another example, the inventors have found that the catalyst systems of the present disclosure produce propylene-octene copolymers via copolymerization of 1-octene with propylene. Thus, the catalyst systems disclosed herein are found to be tolerant of higher alpha olefins. The catalyst systems can retain high activities even at high alpha olefin concentration. Conventional asymmetric catalysts and $C_2$ symmetric catalysts, in contrast, show rapid deactivation under similar conditions.

The inventors have also found that the catalyst systems of the present disclosure can produce long chain branched (LCB) propylene copolymers by in-reactor diene incorporation. The catalyst systems described herein can retain high activity even at high reactor diene concentrations, while $C_2$ symmetric catalysts have very low activity.

The inventors have found an approach to eliminate the need for post-polymerization processing. This approach includes polymerizing propylene with comonomers (e.g., diene, alpha olefin) using the catalyst systems disclosed herein. The catalyst systems and polymerization processes provide for in-situ production of short chain branched (SCB) or long chain branched copolymers. In some embodiments, the polymerization process can be carried out in e.g., solution, slurry, bulk, or gas-phase polymerization processes.

New catalyst compositions are provided as well as catalyst systems and their use in producing polymers, such as isotactic propylene homopolymers. The catalysts described herein are asymmetric, having $C_1$ symmetry. That is, the catalysts have no planes of symmetry about any axis. This asymmetry is advantageous as no isomers (rac/meso) are formed, providing yield of catalyst compositions much higher than those catalysts that are symmetric. Additionally, the catalysts provide isotactic propylene homopolymers which is surprising since the catalyst is asymmetric. An additional advantage is that the catalyst and catalyst systems described herein can be used to produce in-reactor long chain branched copolymers. Generally, metallocene catalysts have very low activity for in-reactor diene incorporation.

For the purposes of this present disclosure and the claims thereto, and unless otherwise specified, a "catalyst system" is a combination of at least one catalyst compound, at least one activator, an optional co-activator, and an optional support material. When "catalyst system" is used to describe such a pair before activation, it refers to the unactivated catalyst complex (precatalyst) together with an activator and, optionally, a co-activator. When it is used to describe such a pair after activation, it refers to the activated complex and the activator or other charge-balancing moiety. The transition metal compound may be neutral as in a precatalyst, or a charged species with a counter ion as in an activated catalyst system. For the purposes of this present disclosure and the claims thereto, and unless otherwise specified, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein embrace both neutral and ionic forms of the catalyst compounds and activators.

For the purposes of this present disclosure and the claims thereto, the new numbering scheme for the Periodic Table Groups is used as described in *Chemical and Engineering News*, v. 63(5), pg. 27 (1985). Therefore, a "group 4 metal" is an element from group 4 of the Periodic Table, e.g. Hf, Ti, or Zr.

For the purposes of this present disclosure and the claims thereto, and unless otherwise specified, an "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers. "Different" as used to refer to mer units indicates that the mer units differ from each other by at least one atom or are different isomerically. A "propylene polymer" or "propylene copolymer" is a polymer or copolymer comprising at least 50 mole % propylene derived units, and so on.

For the purposes of this present disclosure and the claims thereto, and unless otherwise specified, the term "$C_n$" refers to hydrocarbon(s) having n carbon atom(s) per molecule, wherein n is a positive integer. The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

For the purposes of this present disclosure and the claims thereto, and unless otherwise specified, the terms "group," "radical," and "substituent" may be used interchangeably.

For the purposes of this present disclosure and the claims thereto, and unless otherwise specified, the terms "hydrocarbyl radical," "hydrocarbyl group," or "hydrocarbyl" may be used interchangeably and are defined to mean a group consisting of hydrogen and carbon atoms only. Suitable hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, aryl groups, such as phenyl, benzyl, naphthyl.

For the purposes of this present disclosure and the claims thereto, and unless otherwise specified, the terms "alkyl radical," and "alkyl" are used interchangeably throughout this disclosure. For purposes of this disclosure, "alkyl radical" is defined to be $C_1$-$C_{100}$ alkyls, that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like including their substituted analogues.

The term "alpha-olefin" refers to an olefin having a terminal carbon-to-carbon double bond in the structure thereof $((R^1R^2)—C{=}CH_2$, where $R^1$ and $R^2$ can be independently hydrogen or any hydrocarbyl group; preferably R is hydrogen and $R^2$ is an alkyl group). A "linear alpha-olefin" is an alpha-olefin defined in this paragraph wherein $R^1$ is hydrogen, and $R^2$ is hydrogen or a linear alkyl group.

For the purposes of this present disclosure and the claims thereto, and unless otherwise specified, ethylene shall be considered an α-olefin.

For the purposes of this present disclosure and the claims thereto, and unless otherwise specified, the terms "alkoxy" and "alkoxide" mean an alkyl or aryl group bound to an oxygen atom, such as an alkyl ether or aryl ether group/radical connected to an oxygen atom and can include those where the alkyl/aryl group is a $C_1$-$C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl.

For the purposes of this present disclosure and the claims thereto, and unless otherwise specified (such as for "substituted hydrocarbyl", etc.), the term "substituted" refers to that at least one hydrogen atom has been replaced with at least one non-hydrogen group, such as a hydrocarbyl group, a heteroatom, or a heteroatom containing group, such as halogen (such as Br, Cl, F or I) or at least one functional group such as $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*_3$, $-GeR^*_3$, $-SnR^*_3$, $-PbR^*_3$, $-(CH_2)q-SiR^*_3$, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*_3$, $-GeR^*_3$, $-SnR^*_3$, $-PbR^*_3$, $-(CH_2)q-SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

For the purposes of this present disclosure and the claims thereto, and unless otherwise specified, the term "ring atom" refers to an atom that is part of a cyclic ring structure. By this definition, a benzyl group has six ring atoms and tetrahydrofuran has 5 ring atoms.

For the purposes of this present disclosure and the claims thereto, and unless otherwise specified, the term "aryl" or "aryl group" refers to an aromatic ring such as phenyl, naphthyl, xylyl, etc. Likewise, heteroaryl refers to an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

The term "substituted aryl," means an aryl group having one or more hydrogen groups replaced by a hydrocarbyl, substituted hydrocarbyl, heteroatom or heteroatom containing group.

The term "substituted heteroaryl," means a heteroaryl group having one or more hydrogen groups replaced by a hydrocarbyl, substituted hydrocarbyl, heteroatom or heteroatom containing group.

A "halocarbyl" is a halogen substituted hydrocarbyl group that may be bound to another substituent via a carbon atom or a halogen atom.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g $mol^{-1}$).

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, MAO is methylalumoxane, dme is 1,2-dimethoxyethane, p-tBu is para-tertiary butyl, TMS is trimethylsilyl, TIBAL is triisobutylaluminum, TNOAL is tri(n-octyl)aluminum, p-Me is para-methyl, Bz and Bn are benzyl (i.e., $CH_2Ph$), THF (also referred to as thf) is tetrahydrofuran, RT is room temperature (and is 23° C. unless otherwise indicated), tol is toluene, EtOAc is ethyl acetate, Cbz is Carbazole, and Cy is cyclohexyl.

In the description herein, the catalyst may be described as a catalyst, a catalyst precursor, a pre-catalyst compound, catalyst compound or a transition metal compound, and these terms are used interchangeably.

For the purposes of this present disclosure and the claims thereto, and unless otherwise specified, an "anionic ligand" is a negatively charged ligand which donates one or more pairs of electrons to a metal ion. A "neutral donor ligand" is a neutrally charged ligand which donates one or more pairs of electrons to a metal ion.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In at least one embodiment a co-activator can be pre-mixed with the transition metal compound to form an alkylated transition metal compound.

A "metallocene" catalyst compound is a transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands include substituted or unsubstituted indenyl, fluorenyl, indacenyl, benzindenyl, and the like.

The term "continuous" refers to a system that operates without interruption or cessation. For example a continuous process to produce a polymer would be one where the reactants are continually introduced into one or more reactors and polymer product is continually withdrawn.

Catalyst Compounds

In some embodiments, catalyst compounds are represented by Formula (I):

(I)

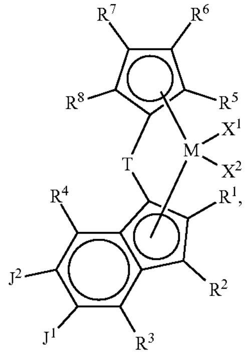

wherein:

M is a transition metal atom;

T is a bridging group;

each of $X^1$ and $X^2$ is a univalent anionic ligand, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;

$R^3$ is an unsubstituted $C_4$-$C_{62}$ cycloalkyl, a substituted $C_4$-$C_{62}$ cycloalkyl, an unsubstituted $C_4$-$C_{62}$ aryl, a substituted $C_4$-$C_{62}$ aryl, an unsubstituted $C_4$-$C_{62}$ heteroaryl, or a substituted $C_4$-$C_{62}$ heteroaryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof; and each of $J^1$ and $J^2$ is joined to form a substituted or unsubstituted $C_4$-$C_{62}$ (alternately $C_5$-$C_{62}$, alternately $C_5$-$C_{40}$, alternately $C_6$ to $C_{30}$, alternately $C_6$ to $C_{20}$) unsaturated cyclic or polycyclic ring structure, or a combination thereof, provided that $J^1$ and $J^2$ together with the two carbons they are bound to on the indenyl group form at least one saturated ring. Preferably $J^1$ and $J^2$ together with the two carbons they are bound to on the indenyl group form at least one 5 or 6 membered saturated ring.

As a non-limiting illustration, in Formula (I) the phrase "$J^1$ and $J^2$ together with the two carbons they are bound on the indenyl group" means that the $J^1$ and $J^2$ groups and the carbon atoms in the box in the formula below. Preferably the atoms in the box form a 5 or 6 membered saturated ring. For example an indacenyl ligand contains such a saturated 5 membered ring and a hexahydrobenz[f]indenyl ligand contains such a saturated 6 membered ring.

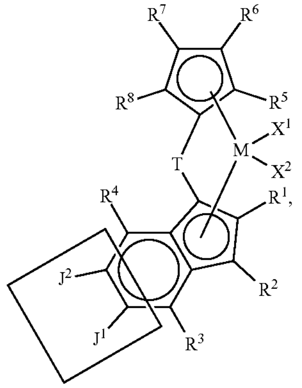

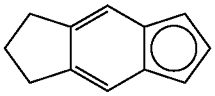

Indacenyl ligand

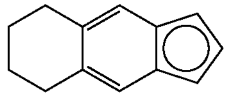

hexahydrobenz[f]indenyl ligand

The unsaturated ring in the indacenyl ligand and the hexahydrobenz[f]indenyl ligand can be substituted or unsubstituted and can be part of multi-cyclic groups where the additional cyclic groups may be saturated or unsaturated, and substituted or unsubstituted. Typical substituents on the unsaturated ring include $C_1$ to $C_{40}$ hydrocarbyls (which may be substituted or unsubstituted), heteroatoms (such as halogens, such as Br, F, $C_1$), heteroatom-containing groups (such as a halocarbyl), or two or more substituents are joined together to form a cyclic or polycyclic ring structure (which may contain saturated and or unsaturated rings), or a combination thereof.

In some embodiments of the present disclosure, each of $J^1$ and $J^2$ is joined form an unsubstituted $C_4$-$C_{30}$ (alternately $C_6$-$C_{30}$, alternately $C_6$-$C_{20}$) cyclic or polycyclic ring, either of which may be saturated, partially saturated, or unsaturated. In some embodiments each J joins to form a substituted $C_4$-$C_{20}$ cyclic or polycyclic ring, either of which may be saturated or unsaturated. Examples include:

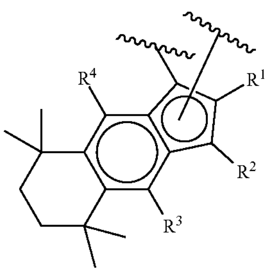

-continued

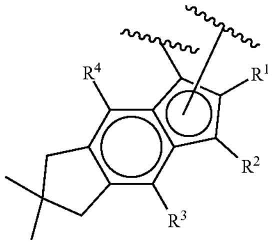

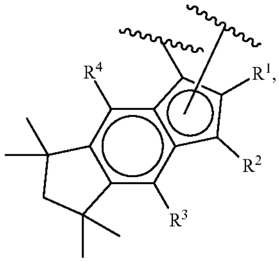

where $R^1$, $R^2$, $R^3$ and $R^4$ are as defined in Formula (I) above, and the wavy lines indicate connection to M (such as Hf or Zr) and T (such as $Me_2Si$).

In some embodiments of the present disclosure, M is a transition metal such as a transition metal of Group 3, 4, or 5 of the Periodic Table of Elements, such as a Group 4 metal, for example Zr, Hf, or Ti.

In some embodiments of the present disclosure, each of $X^1$ and $X^2$ is independently an unsubstituted $C_1$-$C_{40}$ hydrocarbyl (such as an unsubstituted $C_2$-$C_{20}$ hydrocarbyl), a substituted $C_1$-$C_{40}$ hydrocarbyl (such as a substituted $C_2$-$C_{20}$ hydrocarbyl), an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, hydride, amide, alkoxide, sulfide, phosphide, halide, diene, amine, phosphine, ether, and a combination thereof, for example each of $X^1$ and $X^2$ is independently a halide or a $C_1$-$C_5$ alkyl, such as methyl. In some embodiments, each of $X^1$ and $X^2$ is independently chloro, bromo, methyl, ethyl, propyl, butyl, pentyl, hexyl, heptyl, octyl, nonyl, decyl, undecyl, or dodecyl. In some embodiments of the present disclosure, $X^1$ and $X^2$ form a part of a fused ring or a ring system.

In some embodiments, T is represented by the formula, $(R^*_2G)_g$, wherein each G is C, Si, or Ge, g is 1 or 2, and each R* is, independently, hydrogen, halogen, an unsubstituted $C_1$-$C_{20}$ hydrocarbyl (such as methyl, ethyl, propyl, butyl, pentyl, hexyl, heptyl, octyl, nonyl, decyl, undecyl, or dodecyl), a substituted $C_1$-$C_{20}$ hydrocarbyl, or the two or more R* may join to form a substituted or unsubstituted, saturated, partially unsaturated or aromatic, cyclic or polycyclic substituent. In some embodiments of the present disclosure, T is a bridging group and is represented by $R'_2C$, $R'_2Si$, $R'_2Ge$, $R'_2CCR'_2$, $R'_2CCR'_2CR'_2$, $R'_2CCR'_2CR'_2CR'_2$, $R'C{=}CR'$, $R'C{=}CR'CR'_2$, $R'_2CCR'{=}CR'CR'_2$, $R'C{=}CR'CR'{=}CR'$, $R'C{=}CR'CR'_2CR'_2$, $R'_2CSiR'_2$, $R'_2SiSiR'_2$, $R_2CSiR'_2CR'_2$, $R'_2SiCR'_2SiR'_2$, $R'C{=}CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C{=}CR'GeR'_2$, $R'B$, $R'_2C{-}BR'$, $R'_2C{-}BR'{-}CR'_2$, $R'_2C{-}O{-}CR'_2$, $R'_2CR'_2C{-}O{-}CR'_2CR'_2$, $R'_2C{-}O{-}CR'_2CR'_2$, $R'_2C{-}O{-}CR'{=}CR'$, $R'_2C{-}S{-}CR'_2$, $R'_2CR'_2C{-}S{-}CR'_2CR'_2$, $R'_2C{-}S{-}CR'_2CR'_2$, $R'_2C{-}S{-}CR'{=}CR'$, $R'_2C{-}Se{-}CR'_2$, $R'_2CR'_2C{-}Se{-}CR'_2CR'_2$, $R'_2C{-}Se{-}CR_2CR'_2$, $R'_2C{-}Se{-}CR'{=}CR'$, $R'_2C{-}N{=}CR'$, $R'_2C{-}NR'{-}CR'_2$, $R'_2C{-}NR'{-}CR'_2CR'_2$, $R'_2C{-}NR'{-}CR'{=}CR'$, $R'_2CR'_2C{-}NR'{-}CR'_2CR'_2$, $R'_2C{-}P{=}CR'$, or $R'_2C{-}PR'{-}CR'_2$ where each R' is independently hydrogen or an unsubstituted $C_1$-$C_{20}$ hydrocarbyl (such as methyl, ethyl, propyl, butyl, pentyl, hexyl, heptyl, octyl, nonyl, decyl, undecyl, or dodecyl), a substituted $C_1$-$C_{20}$ hydrocarbyl, a $C_1$-$C_{20}$ halocarbyl, a $C_1$-$C_{20}$ silylcarbyl, or a $C_1$-$C_{20}$ germylcarbyl substituent, or two or more adjacent R' join to form a substituted or unsubstituted, saturated, partially unsaturated or aromatic, cyclic or polycyclic substituent. In some embodiments of the present disclosure, T is a bridging group that includes carbon or silicon, such as dialkylsilyl, for example T is a $CH_2$, $CH_2CH_2$, $C(CH_3)_2$, $(Ph)_2C$, $(p\text{-}(Et)_3SiPh)_2C$, $SiMe_2$, $SiPh_2$, SiMePh, $Si(CH_2)_3$, $Si(CH_2)_4$, or $Si(CH_2)_4$.

In some embodiments, $R^1$ is hydrogen, a substituted $C_1$-$C_{20}$ hydrocarbyl, or an unsubstituted $C_1$-$C_{20}$ hydrocarbyl, such as a substituted $C_1$-$C_{12}$ hydrocarbyl or an unsubstituted $C_1$-$C_{12}$ hydrocarbyl (such as methyl, ethyl, propyl, butyl, pentyl, hexyl, heptyl, octyl, nonyl, decyl, undecyl, or dodecyl), for example hydrogen, a substituted $C_1$-$C_6$ hydrocarbyl, or an unsubstituted $C_1$-$C_6$ hydrocarbyl.

In some embodiments, each of $R^2$ and $R^4$ is independently hydrogen, a substituted $C_1$-$C_{20}$ hydrocarbyl, or an unsubstituted $C_1$-$C_{20}$ hydrocarbyl, such as a substituted $C_1$-$C_{12}$ hydrocarbyl or an unsubstituted $C_1$-$C_{12}$ hydrocarbyl (such as methyl, ethyl, propyl, butyl, pentyl, hexyl, heptyl, octyl, nonyl, decyl, undecyl, or dodecyl), for example hydrogen, a substituted $C_1$-$C_6$ hydrocarbyl, or an unsubstituted $C_1$-$C_6$ hydrocarbyl.

In some embodiments, each of $R^5$, $R^6$, $R^7$, and $R^8$ is independently hydrogen, a substituted $C_1$-$C_{20}$ hydrocarbyl, or an unsubstituted $C_1$-$C_{20}$ hydrocarbyl, such as a substituted $C_1$-$C_{12}$ hydrocarbyl or an unsubstituted $C_1$-$C_{12}$ hydrocarbyl (such as methyl, ethyl, propyl, butyl, pentyl, hexyl, heptyl, octyl, nonyl, decyl, undecyl, or dodecyl), such as a substituted $C_1$-$C_6$ hydrocarbyl, or an unsubstituted $C_1$-$C_6$ hydrocarbyl (such as methyl, ethyl, propyl, butyl, pentyl, or hexyl), or one or more of $R^5$ and $R^6$, $R^6$ and $R^7$, or $R^7$ and $R^8$ can be joined to form a substituted or unsubstituted $C_4$-$C_{20}$ saturated or unsaturated cyclic or polycyclic ring structure, or a combination thereof.

In some embodiments, one or more of $R^5$ and $R^6$, $R^6$ and $R^7$, or $R^7$ and $R^8$ can be joined to form a substituted or unsubstituted $C_5$-$C_8$ saturated or unsaturated cyclic or polycyclic ring structure, or a combination thereof.

In some embodiments, $R^3$ is an unsubstituted $C_4$-$C_{20}$ cycloalkyl (e.g., cyclohexane, cyclypentane, cyclooctane, adamantane), or a substituted $C_4$-$C_{20}$ cycloalkyl.

In some embodiments, $R^3$ is a substituted or unsubstituted phenyl, benzyl, carbazolyl, naphthyl, or fluorenyl.

In some embodiments, $R^3$ is a substituted or unsubstituted aryl group represented by the Formula (X):

(X)

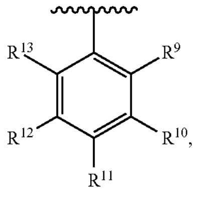

wherein each of $R^9$, $R^{10}$, R, $R^{12}$, and $R^{13}$ is independently hydrogen, an unsubstituted $C_1$-$C_{40}$ hydrocarbyl, a substituted $C_1$-$C_{40}$ hydrocarbyl, a heteroatom, a heteroatom-containing group, or two or more of $R^9$, $R^{10}$, R, $R^{12}$, and $R^{13}$ are joined together to form a $C_4$-$C_{62}$ cyclic or polycyclic ring structure, or a combination thereof.

In some embodiments of the present disclosure, each of $R^9$, $R^{10}$, $R^{11}$, $R^1$, and $R^{13}$ is independently hydrogen, a halogen, an unsubstituted $C_1$-$C_{40}$ hydrocarbyl, a substituted $C_1$-$C_{40}$ hydrocarbyl, an unsubstituted $C_4$-$C_{62}$ aryl (such as an unsubstituted $C_4$-$C_{20}$ aryl, such as a phenyl), a substituted $C_4$-$C_{62}$ aryl (such as a substituted $C_4$-$C_{20}$ aryl), an unsubstituted $C_4$-$C_{62}$ heteroaryl (such as an unsubstituted $C_4$-$C_{20}$ heteroaryl), a substituted $C_4$-$C_{62}$ heteroaryl (such as a substituted $C_4$-$C_{20}$ heteroaryl), —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl. For example, each of $R^9$, $R^{10}$, R, $R^{12}$, and $R^{13}$ is independently hydrogen, a substituted $C_1$-$C_{20}$ hydrocarbyl, or an unsubstituted $C_1$-$C_{20}$ hydrocarbyl, such as a substituted $C_1$-$C_{12}$ hydrocarbyl or an unsubstituted $C_1$-$C_{12}$ hydrocarbyl (such as methyl, ethyl, propyl, butyl, pentyl, hexyl, heptyl, octyl, nonyl, decyl, undecyl, or dodecyl), such as a substituted $C_1$-$C_6$ hydrocarbyl, or an unsubstituted $C_1$-$C_6$ hydrocarbyl (such as methyl, ethyl, propyl, butyl, pentyl, or hexyl), or two or more of $R^9$, $R^{10}$, R, $R^{12}$, and $R^{13}$ can be joined to form a substituted or unsubstituted $C_4$-$C_{20}$ saturated or unsaturated cyclic or polycyclic ring structure, or a combination thereof.

In some embodiments of the present disclosure, at least one of $R^9$, $R^{10}$, R, $R^{12}$, and $R^{13}$ is a phenyl.

In some embodiments of the present disclosure, the catalyst compounds are represented by Formula (II):

(II)

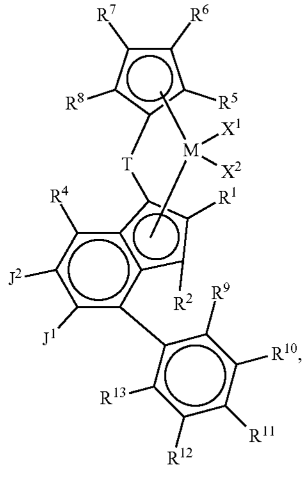

wherein M, T, $J^1$, $J^2$, $X^1$, $X^2$, $R^1$, $R^2$, $R^4$, $R^5$, $R^6$, $R^7$, and $R^8$ are as described in Formula (I) and $R^9$, $R^{10}$, $R^{11}$, $R^{12}$, and $R^{13}$ are as described in Formula (X).

In some embodiments of the present disclosure, the catalyst compounds are represented by Formula (III):

(III)

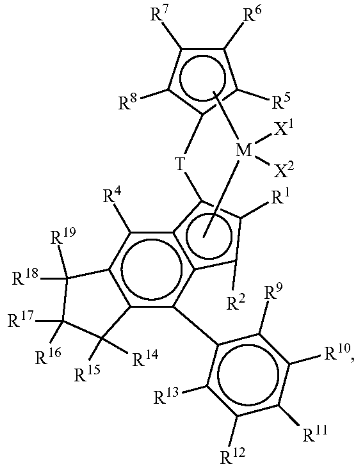

wherein:

each of $R^{14}$, $R^{15}$, $R^{16}$, $R^{17}$, $R^{18}$, and $R^{19}$ is independently hydrogen, an unsubstituted $C_1$-$C_{40}$ hydrocarbyl, a substituted $C_1$-$C_{40}$ hydrocarbyl, a heteroatom, a heteroatom-containing group, or two or more of $R^{14}$, $R^{15}$, $R^{16}$, $R^{17}$, $R^{18}$, and $R^{19}$ are joined together to form a cyclic or polycyclic ring structure, or a combination thereof; and wherein M, T, $J^1$, $J^2$, $X^1$, $X^2$, $R^1$, $R^2$, $R^4$, $R^5$, $R^6$, $R^7$, and $R^8$ are as described in Formula (I) and $R^9$, $R^{10}$, $R^{11}$, $R^{12}$, and $R^{13}$ are as described in Formula (X).

In some embodiments, each of $R^{14}$, $R^{15}$, $R^{16}$, $R^{17}$, $R^{18}$, and $R^{19}$ is independently hydrogen, a halogen, an unsubstituted $C_1$-$C_{40}$ hydrocarbyl, a substituted $C_1$-$C_{40}$ hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl. For example, each of $R^{14}$, $R^{15}$, $R^{16}$, $R^{17}$, $R^{18}$, and $R^{19}$ is independently hydrogen, a substituted $C_1$-$C_{20}$ hydrocarbyl, or an unsubstituted $C_1$-$C_{20}$ hydrocarbyl, such as a substituted $C_1$-$C_{12}$ hydrocarbyl or an unsubstituted $C_1$-$C_{12}$ hydrocarbyl (such as methyl, ethyl, propyl, butyl, pentyl, hexyl, heptyl, octyl, nonyl, decyl, undecyl, or dodecyl), such as a substituted $C_1$-$C_6$ hydrocarbyl, or an unsubstituted $C_1$-$C_6$ hydrocarbyl (such as methyl, ethyl, propyl, butyl, pentyl, or hexyl), or two or more of $R^{14}$, $R^{15}$, $R^{16}$, $R^{17}$, $R^{18}$, and $R^{19}$ can be joined to form a substituted or unsubstituted $C_4$-$C_{20}$ saturated or unsaturated cyclic or polycyclic ring structure, or a combination thereof.

In some embodiments of the present disclosure, catalyst compounds are represented by Formula (IV):

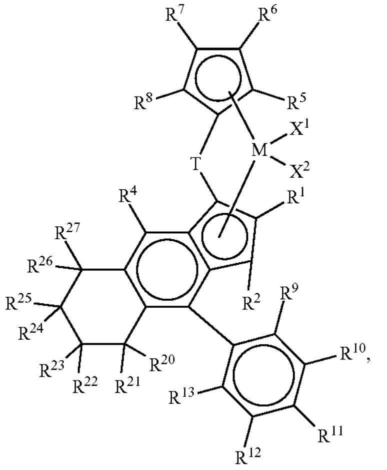

(IV)

wherein:

each of $R^{20}$, $R^{21}$, $R^{22}$, $R^{23}$, $R^{24}$, $R^{25}$, $R^{26}$, $R^{27}$ is independently hydrogen, an unsubstituted $C_1$-$C_{40}$ hydrocarbyl, a substituted $C_1$-$C_{40}$ hydrocarbyl, a heteroatom, a heteroatom-containing group, or two or more of $R^{20}$, $R^{21}$, $R^{22}$, $R^{23}$, $R^{24}$, $R^{25}$, $R^{26}$, $R^{27}$ are joined together to form a cyclic or polycyclic ring structure, or a combination thereof; and wherein M, T, $J^1$, $J^2$, $X^1$, $X^2$, $R^1$, $R^2$, $R^4$, $R^5$, $R^6$, $R^7$, and $R^8$ are as described in Formula (I) and $R^9$, $R^{10}$, $R^{11}$, $R^{12}$, and $R^{13}$ are as described in Formula (X).

In some embodiments, each of $R^{20}$, $R^{21}$, $R^{22}$, $R^{23}$, $R^{24}$, $R^{25}$, $R^{26}$, $R^{27}$ is independently hydrogen, a halogen, an unsubstituted $C_1$-$C_{40}$ hydrocarbyl, a substituted $C_1$-$C_{40}$ hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl. For example, each of $R^{20}$, $R^{21}$, $R^{22}$, $R^{23}$, $R^{24}$, $R^{25}$, $R^{26}$, $R^{27}$ is independently hydrogen, a substituted $C_1$-$C_{20}$ hydrocarbyl, or an unsubstituted $C_1$-$C_{20}$ hydrocarbyl, such as a substituted $C_1$-$C_{12}$ hydrocarbyl or an unsubstituted $C_1$-$C_{12}$ hydrocarbyl (such as methyl, ethyl, propyl, butyl, pentyl, hexyl, heptyl, octyl, nonyl, decyl, undecyl, or dodecyl), such as a substituted $C_1$-$C_6$ hydrocarbyl, or an unsubstituted $C_1$-$C_6$ hydrocarbyl (such as methyl, ethyl, propyl, butyl, pentyl, or hexyl), or two or more $R^{20}$, $R^{21}$, $R^{22}$, $R^{23}$, $R^{24}$, $R^{25}$, $R^{26}$, $R^{27}$ can be joined to form a substituted or unsubstituted $C_4$-$C_{20}$ saturated or unsaturated cyclic or polycyclic ring structure, or a combination thereof.

Catalyst compounds useful herein are represented by the formula:

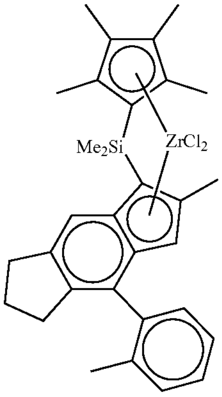

1

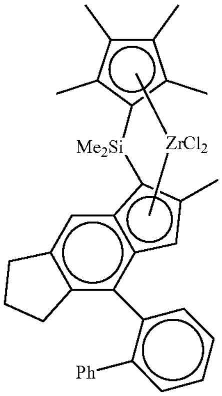

2

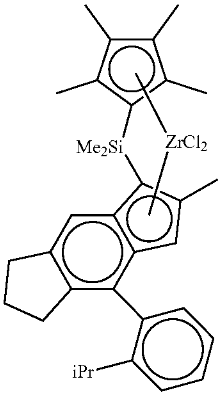

3

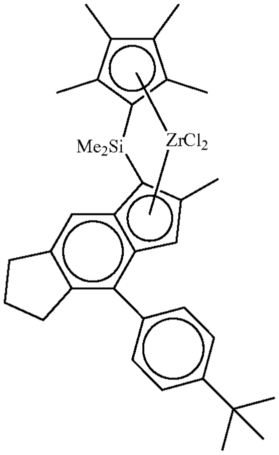

4

-continued
5
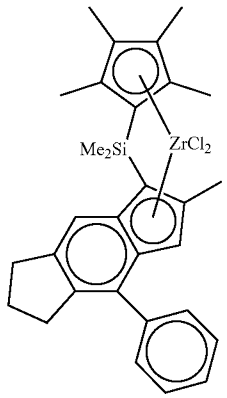
6
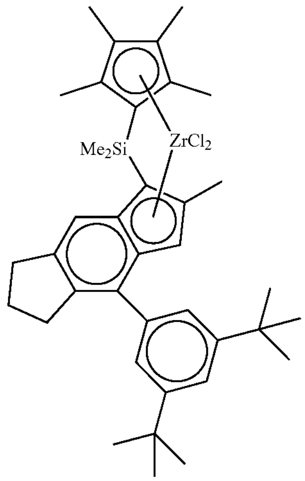
7
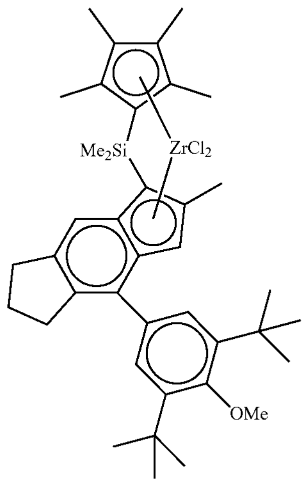
-continued
8
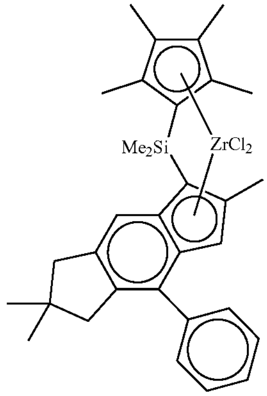
9
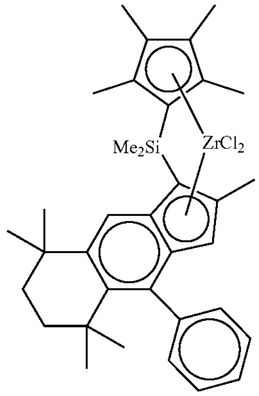
10
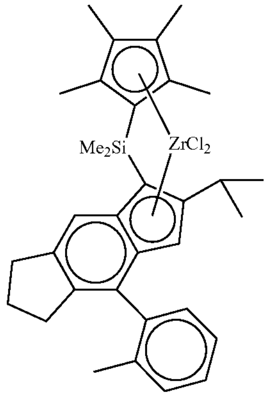
11
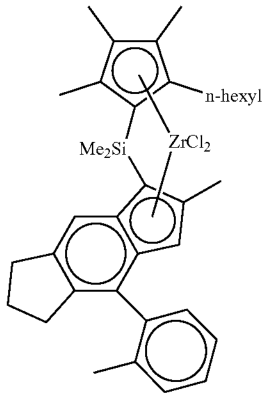

-continued
12
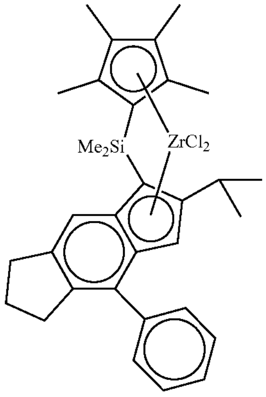
13
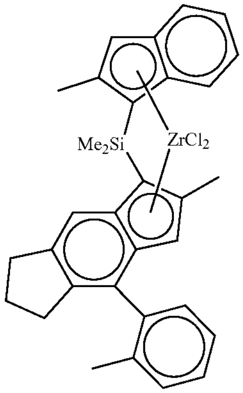
14
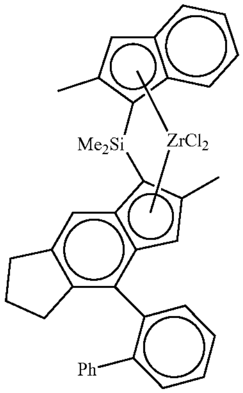
15
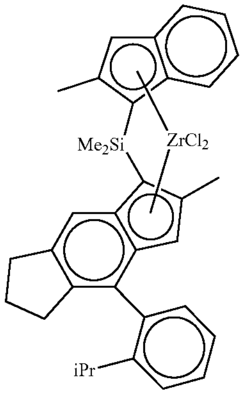
-continued
16
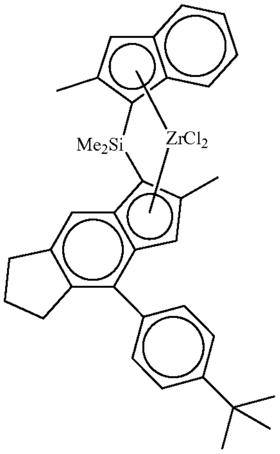
17
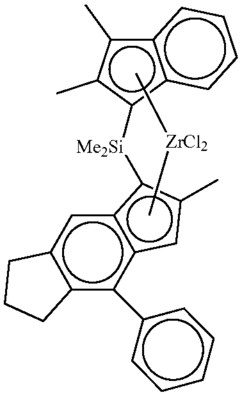
18
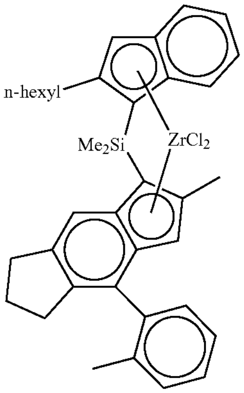
19
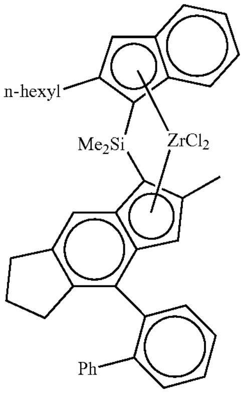

-continued
20
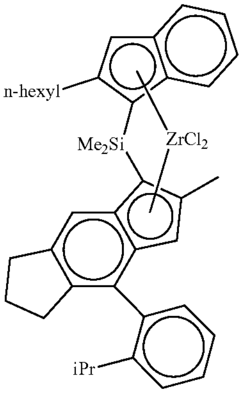
21
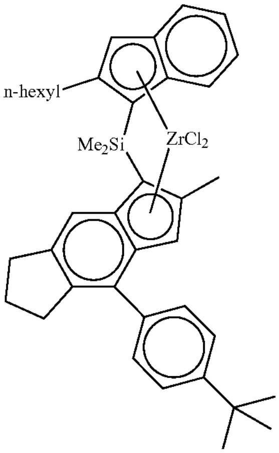
22
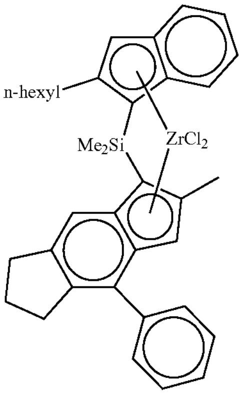
23
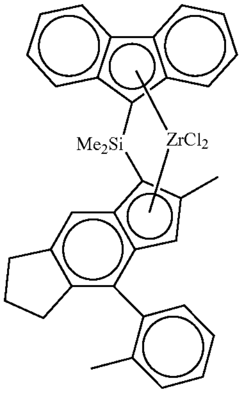
-continued
24
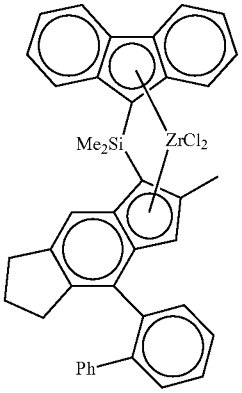
25
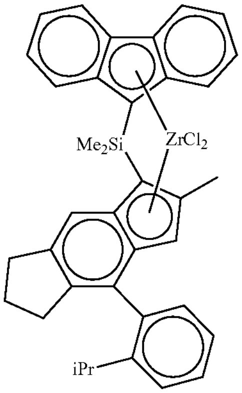
26
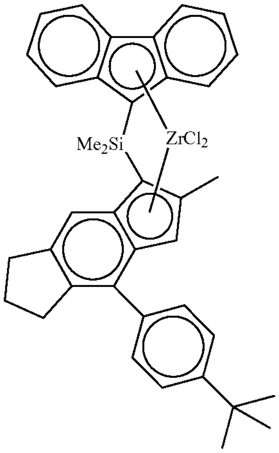

-continued

27

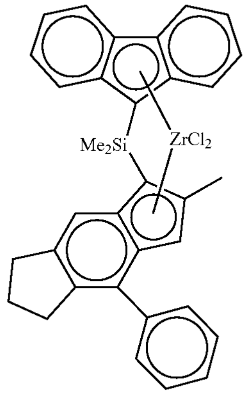

Catalyst compounds useful herein are represented by the formula:

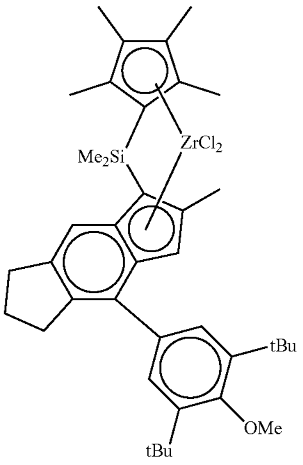

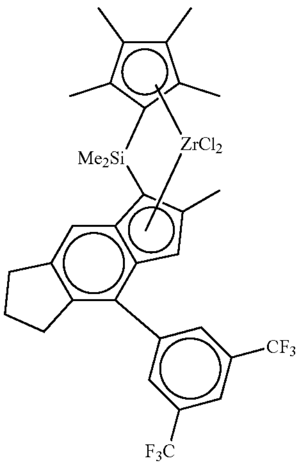

-continued

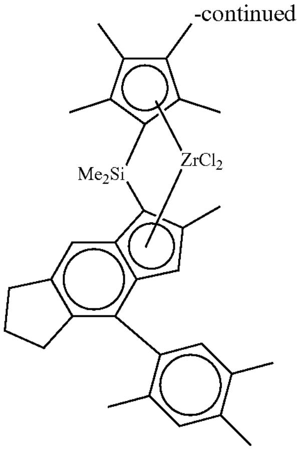

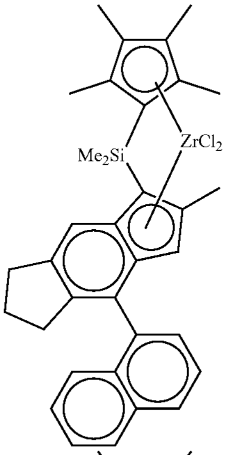

or

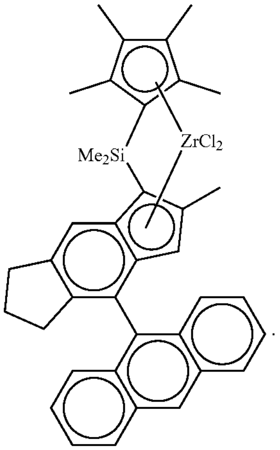

Activators

The terms "cocatalyst" and "activator" are used herein interchangeably.

The catalyst systems described herein may comprise a catalyst as described above and an activator such as alumoxane or a non-coordinating anion and may be formed by combining the catalyst components described herein with activators in any suitable manner, including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, may include alumoxanes, aluminum alkyls, ionizing activators, which may be neutral or ionic, and conventional-type cocatalysts. Suitable activators may include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g., a non-coordinating anion.

In at least one embodiment, the catalyst system can include an activator and the catalyst compound of Formula (I), Formula (II), Formula (III), or Formula (IV).

Alumoxane Activators

Alumoxane activators are utilized as activators in the catalyst systems described herein. Alumoxanes are generally oligomeric compounds containing —Al($R^{a'''}$)—O— sub-units, where $R^{a'''}$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, such as when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584, which is incorporated by reference herein). Another useful alumoxane is solid polymethylaluminoxane as described in U.S. Pat. Nos. 9,340,630, 8,404, 880, and 8,975,209, which are incorporated by reference herein.

When the activator is an alumoxane (modified or unmodified), at least one embodiment selects the maximum amount of activator at up to a 5,000-fold molar excess Al/M over the catalyst compound (per metal catalytic site). The minimum activator-to-catalyst-compound can be a 1:1 molar ratio. Alternative ranges may include from 1:1 to 500:1, alternatively from 1:1 to 200:1, alternatively from 1:1 to 100:1, or alternatively from 1:1 to 50:1.

In an alternative embodiment, little or no alumoxane is used in the polymerization processes described herein. For example, alumoxane can be present at zero mol %, alternatively the alumoxane can be present at a molar ratio of aluminum to catalyst compound transition metal less than 500:1, such as less than 300:1, such as less than 100:1, such as less than 1:1.

Ionizing/Non-Coordinating Anion Activators

The term "non-coordinating anion" (NCA) means an anion which either does not coordinate to a cation or which is only weakly coordinated to a cation thereby remaining sufficiently labile to be displaced by a Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization. Suitable ionizing activators may include an NCA, such as a compatible NCA.

It is within the scope of the present disclosure to use an ionizing activator, neutral or ionic. It is also within the scope of the present disclosure to use neutral or ionic activators alone or in combination with alumoxane or modified alumoxane activators. For descriptions of suitable activators please see U.S. Pat. Nos. 8,658,556 and 6,211,105.

The catalyst systems of the present disclosure can include at least one non-coordinating anion (NCA) activator. In at least one embodiment, boron containing NCA activators represented by the formula below can be used:

$$Z_d^+(A^{d-})$$

where:

- Z is (L-H) or a reducible Lewis acid; L is a Lewis base; H is hydrogen;
- (L-H) is a Bronsted acid;
- $A^{d-}$ is a boron containing non-coordinating anion having the charge d−; and
- d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand transition metal catalyst precursor, resulting in a cationic transition metal species.

The activating cation $Z_d^+$ may also be a moiety such as silver, tropylium, carbeniums, ferroceniums and mixtures, such as carbeniums and ferroceniums. $Z_d^+$ can be triphenyl carbenium. Reducible Lewis acids can be a triaryl carbenium (where the aryl can be substituted or unsubstituted, such as those represented by the formula: ($Ar_3C$+), where Ar is aryl or aryl substituted with a heteroatom, a $C_1$ to $C_{40}$ hydrocarbyl, or a substituted $C_1$ to $C_{40}$ hydrocarbyl), such as the reducible Lewis acids "Z" may include those represented by the formula: ($Ph_3C$), where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbenium.

When $Z_d^+$ is the activating cation $(L\text{-}H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q^n]^{d-}$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 50 (such as up to 20) carbon atoms with the optional proviso that in not more than 1 occurrence is Q a halide. Each Q can be a fluorinated hydrocarbyl group having 1 to 50 (such as 1 to 20) carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as activators in U.S. Pat. No. 8,658,556, which is incorporated by reference herein.

The ionic stoichiometric activator $Z_d^+$ ($A^{d-}$) can be one or more of N,N-dimethylanilinium tetrakis(perfluorophenyl) borate, N,N-dimethylanilinium tetrakis(perfluoronaphthyl) borate, dioctadecylmethylammonium tetrakis(perfluorophenyl)borate,N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

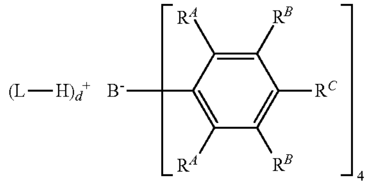

or

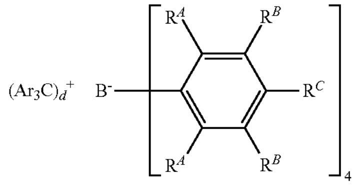

where:

each $R^A$ is independently a halide, such as a fluoride;

Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;

each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);

each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);

L is a Lewis base; $(L-H)^+$ is a Bronsted acid; d is 1, 2, or 3;

where the anion has a molecular weight of greater than 1,020 g/mol; and where at least three of the substituents on the B atom each have a molecular volume of greater than 250 cubic A, alternatively greater than 300 cubic A, or alternatively greater than 500 cubic A.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in Girolami, G. S., "A Simple "Back of the Envelope" Method for Estimating the Densities and Molecular Volumes of Liquids and Solids," *Journal of Chemical Education*, v. 71(11), November 1994, pp. 962-964, which is incorporated by reference herein. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

For a list of suitable bulky activators please see U.S. Pat. No. 8,658,556, which is incorporated by reference herein.

In another embodiment, one or more of the NCA activators is chosen from the activators described in U.S. Pat. No. 6,211,105.

In a at least one embodiment, the activator is selected from one or more of a triaryl carbenium (such as triphenylcarbenium tetraphenylborate, triphenylcarbenium tetrakis (pentafluorophenyl)borate, triphenylcarbenium tetrakis-(2,3,4,6-tetrafluorophenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate).

In another embodiment, the activator is selected from one or more of trialkylammonium tetrakis(pentafluorophenyl) borate, N,N-dialkylanilinium tetrakis(pentafluorophenyl) borate, dioctadecylmethylammonium tetrakis(pentafluorophenyl)borate, dioctadecylmethylammonium tetrakis (perfluoronaphthyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl) borate, trialkylammonium tetrakis(perfluorobiphenyl) borate, N,N-dialkylanilinium tetrakis(perfluorobiphenyl)

borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane and or a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

$$[R^{1'}R^{2'}R^{3'}EH]_d^{+}[Mt^{k+}Q_n]^{d-} \quad (V)$$

wherein:

E is nitrogen or phosphorous; d is 1, 2 or 3; k is 1, 2, or 3; n is 1, 2, 3, 4, 5, or 6; n−k=d (preferably d is 1, 2 or 3; k is 3; n is 4, 5, or 6); R'', $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms; Mt is an element selected from group 13 of the Periodic Table of the Elements, such as B or Al, preferably boron; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

(VII)

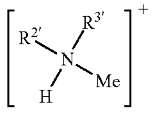

$[Br^{4'}R^{5'}R^{6'}R^{7'}]^-$ and (VIII)

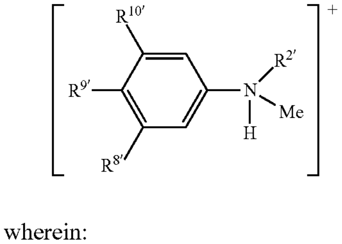

$[Br^{4'}R^{5'}R^{6'}R^{7'}]^-$ wherein:

N is nitrogen; $R^{2'}$ and $R^{3'}$ are independently is $C_6$-$C_{40}$ hydrocarbyl group optionally substituted with one or more alkoxy groups, silyl groups, a halogen atoms, or halogen containing groups wherein $R^{2'}$ and $R^{3'}$ (if present) together comprise 14 or more carbon atoms; $R^{8'}$, $R^{9'}$, and $R^{10'}$ are independently a $C_4$-$C_{30}$ hydrocarbyl or substituted $C_4$-$C_{30}$ hydrocarbyl group; B is boron; and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VII), or (VIII) herein, $R^{4'}$, $R^{5'}$, $R^{6'}$, and $R^{7'}$ are pentafluorophenyl.

Optionally, in any of Formulas (V), (VII), or (VIII) herein, $R^{4'}$, $R^{5'}$, $R^{6'}$, and $R^{7'}$ are pentafluoronaphthalenyl.

Optionally, in any embodiment of Formula (VIII) herein, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_8$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternately $R^{2'}$ is not an optionally substituted $C_1$-$C_{40}$ linear alkyl group).

Optionally, each of $R^{4'}$, $R^{5'}$, $R^{6'}$, and $R^{7'}$ is an aryl group (such as phenyl or naphthalenyl), wherein at least one of $R^{4'}$, $R^{5'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalenyl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalenyl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{3'}$ is independently unsubstituted or substituted with at least one of halide, $C_1$-$C_{35}$ alkyl, $C_6$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably $R^{2'}$ is not an optionally substituted $C_1$-$C_{40}$ linear alkyl group (alternately when Q is a substituted phenyl group, then $R^{2'}$ is not a $C_1$-$C_{40}$ linear alkyl group, preferably $R^2$ is not an optionally substituted $C_1$-$C_{40}$ linear alkyl group). Optionally, when Q is a fluorophenyl group (alternately when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, R" is not methyl, $R^{2'}$ is not Cis alkyl and $R^{3'}$ is not $C_{18}$ alkyl, alternately R" is not methyl, $R^{2'}$ is not $C_{18}$ alkyl and $R^{3'}$ is not $C_{18}$ alkyl and at least one Q is not substituted phenyl, optionally all Q are not substituted phenyl.

Useful cation components in Formulas (III) and (V) to (VIII) include those represented by the formula:

10

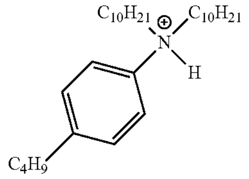

11

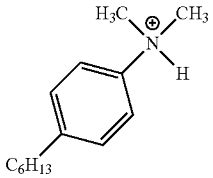

12

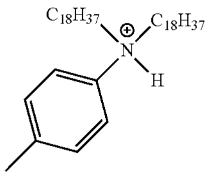

13

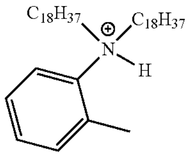

-continued

14

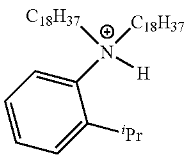

15

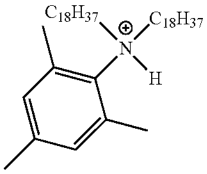

16

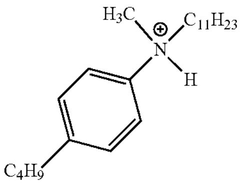

17

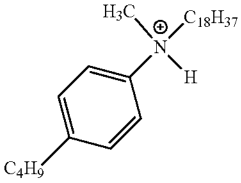

18

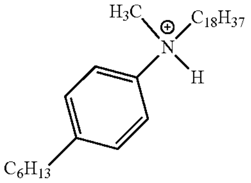

19

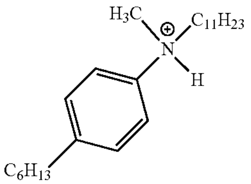

20

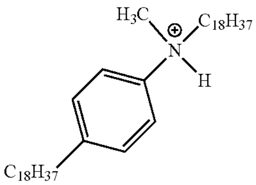

21

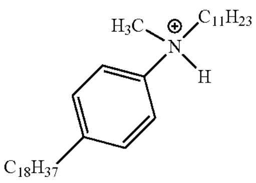

-continued

22

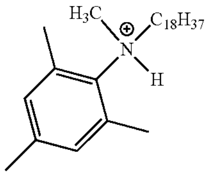

23

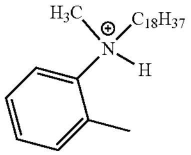

24

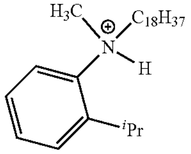

25

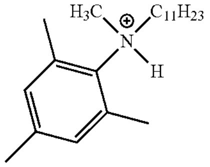

26

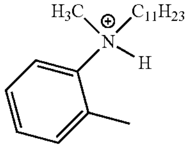

27

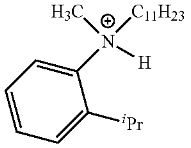

28

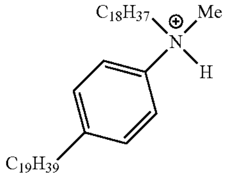

29

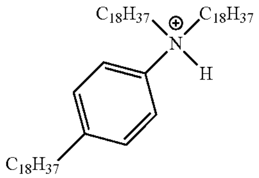

30

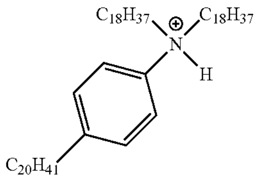

-continued

31

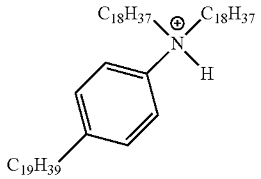

32

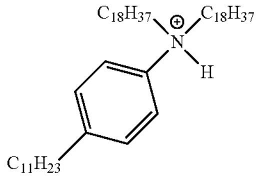

33

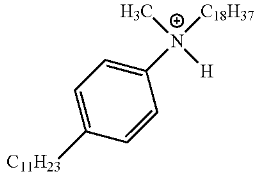

34

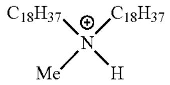

35

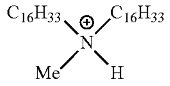

36

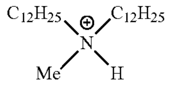

Useful caution components in Formulas (III) and (V) to (VIII) include those represented by the formulas:

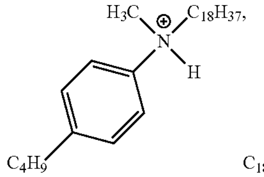

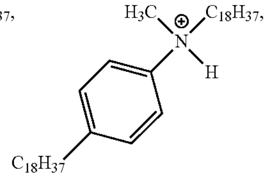

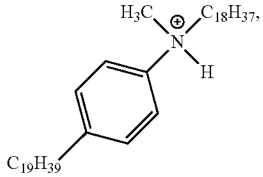

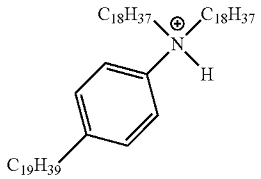

and

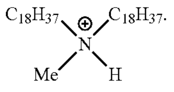

The anion component of the activators described herein preferably includes those represented by the formula $[Mt^{k+}Q_n]^-$ wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the provision that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

Particularly useful activators include N-methyl-4-nonadecyl-N-octadecylbenzenaminium tetrakis(pentafluorophenyl)borate, N-methyl-4-nonadecyl-N-octadecylbenzenaminium tetrakis(perfluoronaphthalenyl)borate, and those disclosed in US 2019/0330139 and US 2019/0330392.

Suitable activator-to-catalyst ratio, e.g., all NCA activators-to-catalyst ratio may be about a 1:1 molar ratio. Alternative ranges include from 0.1:1 to 100:1, alternatively from 0.5:1 to 200:1, alternatively from 1:1 to 500:1, alternatively from 1:1 to 1000:1. Suitable ranges can be from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0573120 B1; WO 1994/007928; and WO 1995/014044 which discuss the use of an alumoxane in combination with an ionizing activator).

Useful chain transfer agents can be hydrogen, alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Furthermore, a catalyst system of the present disclosure may include a metal hydrocarbenyl chain transfer agent represented by the formula:

$$Al(R')_{3-v}(R'')_v$$

where each R' can be independently a $C_1$-$C_{30}$ hydrocarbyl group, and/or each R", can be independently a $C_4$-$C_{20}$ hydrocarbenyl group having an end-vinyl group; and v can be from 0.1 to 3.

Optional Scavengers or Coactivators

In addition to these activator compounds, scavengers or coactivators may be used. Aluminum alkyl or alumoxane compounds which may be utilized as scavengers or coactivators may include, for example, trimethylaluminum, triethylaluminum, triisobutylaluminum, tri-n-hexylaluminum, tri-n-octylaluminum, diisobutylaluminum hydride, methylalumoxane (MAO), modified methylalumoxane (MMAO), MMAO-3A, and diethyl zinc.

Optional Support Materials

In embodiments herein, the catalyst system may include an inert support material. The supported material can be a porous support material, for example, talc, and inorganic oxides. Other support materials include zeolites, clays, organoclays, or another organic or inorganic support material, or mixtures thereof.

The support material can be an inorganic oxide in a finely divided form. Suitable inorganic oxide materials for use in catalyst systems herein may include groups 2, 4, 13, and 14 metal oxides, such as silica, alumina, and mixtures thereof. Other inorganic oxides that may be employed either alone or in combination with the silica, or alumina can be magnesia, titania, zirconia. Other suitable support materials, however, can be employed, for example, finely divided functionalized polyolefins, such as finely divided polyethylene. Examples of suitable supports may include magnesia, titania, zirconia, montmorillonite, phyllosilicate, zeolites, talc, clays. Also, combinations of these support materials may be used, for example, silica-chromium, silica-alumina, silica-titania. In at least one embodiment, the support material is selected from $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area of from about 10 $m^2/g$ to about 700 $m^2/g$, pore volume of from about 0.1 $cm^3/g$ to about 4.0 $cm^3/g$ and average particle size of from about 5 μm to about 500 μm. The surface area of the support material can be of from about 50 $m^2/g$ to about 500 $m^2/g$, pore volume of from about 0.5 $cm^3/g$ to about 3.5 $cm^3/g$ and average particle size of from about 10 μm to about 200 μm. For example, the surface area of the support material can be from about 100 $m^2/g$ to about 400 $m^2/g$, pore volume from about 0.8 $cm^3/g$ to about 3.0 $cm^3/g$ and average particle size can be from about 5 μm to about 100 m. The average pore size of the support material useful in the present disclosure can be of from 10 Å to 1000 Å, such as 50 Å to about 500 Å, and such as 75 Å to about 350 Å. In at least one embodiment, the support material is a high surface area, amorphous silica (surface area=300 $m^2/gm$; pore volume of 1.65 $cm^3/gm$). For example, suitable silicas can be the silicas marketed under the tradenames of DAVISON™ 952 or DAVISON™ 955 by the Davison Chemical Division of W.R. Grace and Company. In other embodiments, DAVISON™ 948 is used. Alternatively, a silica can be ES-70™ silica (PQ Corporation, Malvern, Pennsylvania) that has been calcined, for example (such as at 875° C.).

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst including at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time of from about 0.5 hours to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In an alternative embodiment, the slurry of the support material is first contacted with the catalyst compound for a period of time of from about 0.5 hour to about 24 hours, from about 2 hours to about 16 hours, or from about 4 hours to about 8 hours. The slurry of the supported catalyst compound is then contacted with the activator solution.

The mixture of the catalyst, activator and support is heated from about 0° C. to about 70° C., such as from about 23° C. to about 60° C., such as at room temperature. Contact times can be from about 0.5 hours to about 24 hours, such as from about 2 hours to about 16 hours, or from about 4 hours to about 8 hours.

Suitable non-polar solvents are materials in which all of the reactants used herein, e.g., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In some embodiments herein, the present disclosure relates to polymerization processes where a monomer (such as propylene), and, optionally, a comonomer (such as 1-octene, or 1,7-octadiene), are introduced to (or contacted with) a catalyst system including an activator and at least one catalyst compound. The catalyst compound and activator may be combined prior to contacting with the monomer. Alternatively the catalyst compound and activator may be introduced into the polymerization reactor separately, wherein they subsequently react to form the active catalyst.

Monomers may include substituted or unsubstituted $C_2$-$C_{40}$ alpha olefins, such as $C_2$-$C_{20}$ alpha olefins, such as $C_2$-$C_{12}$ alpha olefins, such as ethylene, propylene, butene, pentene, hexene, heptene, octene, nonene, decene, undecene, dodecene and isomers thereof. In at least one embodiment, the monomer includes ethylene and an optional comonomer including one or more $C_3$-$C_{40}$ olefins, such as $C_4$-$C_{20}$ olefins, such as $C_6$-$C_{12}$ olefins. The $C_3$-$C_{40}$ olefin monomers may be linear, branched, or cyclic. The $C_3$-$C_{40}$ cyclic olefins may be strained or unstrained, monocyclic or polycyclic, and may optionally include heteroatoms and/or one or more functional groups. In another embodiment, the monomer includes propylene and an optional comonomer including one or more ethylene or $C_4$-$C_{40}$ olefins, such as $C_4$-$C_{20}$ olefins, such as $C_6$-$C_{12}$ olefins. The $C_4$-$C_{40}$ olefins may be linear, branched, or cyclic. The $C_4$-$C_{40}$ cyclic olefins may be strained or unstrained, monocyclic or polycyclic, and may optionally include heteroatoms and/or one or more functional groups.

Exemplary $C_2$-$C_{40}$ olefin monomers and optional comonomers may include ethylene, propylene, butene, pentene, hexene, heptene, octene, nonene, decene, undecene, dodecene, norbornene, ethylidenenorbornene, vinylnorbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, butadiene, hexadiene, heptadiene, octadiene, nonadiene, decadiene, undecadiene, dodecadiene, and their respective homologs and derivatives, such as norbornene, norbornadiene, and dicyclopentadiene.

In at least one embodiment, one or more dienes are present in the polymer produced herein at up to 10 weight %, such as at 0.00001 to 1.0 weight %, such as 0.002 to 0.5 weight %, such as 0.003 to 0.2 weight %, based upon the total weight of the composition. In at least one embodiment 500 ppm or less of diene is added to the polymerization, such as 400 ppm or less, such as 300 ppm or less. In other embodiments at least 50 ppm of diene is added to the polymerization, or 100 ppm or more, or 150 ppm or more. Alternately, one or more dienes are present at 0.1 to 1 mol %, such as 0.5 mol %.

Suitable diolefin monomers useful in this present disclosure include any hydrocarbon structure, such as $C_4$-$C_{30}$, having at least two unsaturated bonds, wherein at least two of the unsaturated bonds are readily incorporated into a polymer by either a stereospecific or a non-stereospecific catalyst(s). The diolefin monomers can be an alpha, omega-diene monomer (e.g., a di-vinyl monomer). The diolefin monomers can be linear di-vinyl monomers, such as those containing from 4 to 30 carbon atoms. Examples of suitable dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and low molecular weight polybutadienes (Mw less than 1000 g/mol). Suitable cyclic dienes include cyclopentadiene, vinylnorbornene, norbornadiene, ethylidene norbornene, divinylbenzene, dicyclopentadiene or higher ring containing diolefins with or without substituents at various ring positions.

Specific examples of alpha, omega-dienes ($\alpha,\omega$-dienes) include 1,4-heptadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 2-methyl-1,6-heptadiene, 2-methyl-1,7-octadiene, 2-methyl-1,8-nonadiene, 2-methyl-1,9-decadiene, 2-methyl-1,10-undecadiene, 2-methyl-1,11-dodecadiene, 2-methyl-1,12-tridecadiene, and 2-methyl-1,13-tetradecadiene.

Polymerization processes of this present disclosure can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes can be employed. (A homogeneous polymerization process refers to a process where at least 90 wt % of the product is soluble in the reaction media.) A homogeneous polymerization process can be a bulk homogeneous process. (A bulk process refers to a process where monomer concentration in all feeds to the reactor is 70 volume % or more.) Alternatively, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" refers to a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Suitable polymerizations can be run at any temperature and/or pressure suitable to obtain the desired ethylene polymers. Suitable temperatures and/or pressures may include a temperature in the range of from about 0° C. to about 300° C., such as about 20° C. to about 200° C., such as about 35° C. to about 150° C., such as from about 40° C. to about 120° C., such as from about 45° C. to about 80° C.; and at a pressure in the range of from about 0.35 MPa to about 10 MPa, such as from about 0.45 MPa to about 6 MPa, such as from about 0.5 MPa to about 4 MPa.

In a suitable polymerization, the run time of the reaction can be up to 300 minutes, such as in the range of from about 5 to 250 minutes, such as from about 10 to 120 minutes. In a continuous process the run time may be the average residence time of the reactor.

In a at least one embodiment hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In some embodiments, the activity of the catalyst is at least 50 g/mmol/hour, such as 1,000 or more g/mmol/hour, such as 5,000 or more g/mmol/hr, such as 50,000 or more g/mmol/hr, such as 100,000 or more g/mmol/hr, such as 500,000 or more g/mmol/hr. In an alternative embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. Alumoxane can be present at zero mol %, alternatively the alumoxane can be present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as trialkyl aluminum) can be present at zero mol %, alternatively the scavenger can be present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 45 to 80° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics can be present in the solvent at less than 1 wt %, such as less than 0.5 wt %, such as at 0 wt % based upon the weight of the solvents); 4) wherein the catalyst system used in the polymerization comprises less than 0.5 mol %, such as 0 mol % alumoxane, alternatively the alumoxane is present at a molar ratio of aluminum to transition metal less than 500:1, such as less than 300:1, such as less than 100:1, such as less than 1:1; 5) the polymerization occurs in one reaction zone; 6) the productivity of the catalyst compound is at least 80,000 g/mmol/hr (such as at least 150,000 g/mmol/hr, such as at least 200,000 g/mmol/hr, such as at least 250,000 g/mmol/hr, such as at least 300,000 g/mmol/hr); 7) optionally scavengers (such as trialkyl aluminum compounds) are absent (e.g. present at zero mol %, alternatively the scavenger is present at a molar ratio of scavenger metal to transition metal of less than 100:1, such as less than 50:1, such as less than 15:1, such as less than 10:1); and/or 8) optionally hydrogen is present in the polymerization reactor at a partial pressure of 0.001 to 50 psig (0.007 to 345 kPa) (such as from 0.01 to 25 psig (0.07 to 172 kPa), such as 0.1 to 10 psig (0.7 to 70 kPa)). In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, as desired, such as one or more scavengers, promoters, modifiers, reducing agents, oxidizing agents, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

Polyolefin Products

This present disclosure also relates to compositions of matter produced by the methods described herein. The process described herein can produce olefin homopolymers or olefin copolymers.

The process described herein can produce propylene homopolymers or propylene copolymers, such as propylene-ethylene copolymers and/or propylene-alpha-olefin copolymers.

In at least one embodiment, the process described herein can produce propylene copolymers, such as propylene-diene copolymers.

Likewise, the process of this present disclosure can produce olefin polymers, such as polypropylene, such as propylene homopolymers and copolymers. In some embodiments, the polymers produced herein can be homopolymers of propylene or are copolymers of propylene having from about 0 wt % to about 50 wt % based on the total amount of polymer (such as from 1 wt % to 20 wt %) of one or more of $C_2$ or $C_4$ to $C_{20}$ olefin comonomer, based on a total amount of propylene copolymer, such as from about 0.5 wt % to about 18 wt %, such as from about 1 wt % to about 15 wt %, such as from about 3 wt % to about 10 wt %) of one or more of $C_2$ or $C_4$ to $C_{20}$ olefin comonomer (such as ethylene or $C_4$ to $C_{12}$ alpha-olefin, such as ethylene, butene, hexene, octene, decene, dodecene, such as ethylene, butene, hexene, octene, or $C_4$-$C_{14}$ α,ω-dienes such as butadiene, 1,5-hexadiene, 1,4-heptadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene).

In some embodiments, the polymer can have from about 50 wt % to about 100 wt % of propylene, such as from about 90 wt % to about 99.9 wt % of propylene, such as from about 90 wt % to about 99 wt % of propylene, such as from about 98 wt % to about 99 wt % of propylene.

In some embodiments, the polymer can have from about 90 wt % to about 99.9 wt % of propylene and 0.1 to 10 wt % diene, such as from about 95 wt % to about 99.5 wt % of propylene and 0.5 to 5 wt % diene, such as from about 99 wt % to about 99.5 wt % of propylene and 0.5 to 1 wt % diene.

In some embodiments, the polymers produced herein can have an Mw of from about 5,000 to about 1,000,000 g/mol (such as from about 25,000 to about 750,000 g/mol, such as from about 50,000 to about 500,000 g/mol, such as from about 80,000 to about 300,000 g/mol, such as from about 80,000 to about 200,000 g/mol) as determined by GPC-4D.

In some embodiments, the polymer can have a molecular weight distribution, MWD, (Mw/Mn) of greater than about 1, such as from about 1 to about 40, such as from about 1.5 to about 20, such as from about 2 to about 10 as determined by GPC-4D.

In some embodiments, the polymer can have a $g'_{vis}$ of 5.0 or more, such as greater than about 0.5, such as from about 0.5 to about 1, such as from 0.5 to 0.97, such as from about 0.51 to about 0.98, such as from about 0.6 to about 0.95, such as from about 0.7 to about 0.8 as determined by GPC-4D.

In some embodiments, the polymer can have a melt flow rate (MFR) of from about 0.1 dg/min to about 1,000 dg/min, such as from about 1 dg/min to about 100 dg/min, such as from about 5 to about 10 dg/min as determined by ASTM D1238 (230° C., 2.16 kg).

In some embodiments, the polymer can have a $T_m$ of greater than about 145° C., such as from about 150° C. to about 165° C., such as from about 155° C. to about 162° C., such as from about 158° C. to about 160° C. as determined by the differential scanning calorimetry procedure DSC-2 described below. In some embodiments, the polymer can have a $T_m$ of from 148° C. to 159° C.

In some embodiments the polymer can have a shear thinning ratio (STR) of about 0.15 to about 0.007 such as from about 0.1 to about 0.01, such as from about 0.075 to about 0.025, as measured as shear viscosity ratio between radial frequencies of 100 rad/s and 0.1 rad/s. Alternately, the polymer has a shear thinning ratio of about 0.007 to about 0.12.

Shear thinning can be described by the following parameters: Power Law Index (slope of the viscosity vs frequency in the power-law regime), transition index (parameter describing the transition between Newtonian plateau and power law region), consistency (characteristic relaxation time of the polymer, inverse to the frequency correspondent to the transition from Newtonian to power-law regime), infinite-rate viscosity, zero-shear viscosity as defined by fitting dependence of complex viscosity on angular frequency data by Carreau-Yasuda model. These parameters can be calculated using the following equation:

$$\frac{\eta*(\omega)-\eta_\infty}{\eta_0-\eta_\infty}=\frac{1}{[1+(k\omega)^a]^{(1-n)/a}}$$

wherein $\eta_o$ is the zero-shear viscosity, $\eta_\infty$ is the infinite viscosity, k is the consistency, η is the power law index, and a is the transition index.

In at least one embodiment, the propylene polymer produced herein, as measured at 190° C., and at radial frequencies between 0.1 and 628 rad/s) can have one or more of the following:

a) a power law index, $\eta_{CY}$, of from, about −1.0 to about 0.25, such as about −1.1 to about 0.23;
b) a transition index, $a_{CY}$, of from about 0.09 to about 0.3, such as about 0.1 to about 0.2;
c) a consistency, $k_{CY}$, of from such as about $1.0e^{-4}$ s to about 17.0, such as about $1.2e^{-4}$ s to about 16.3;
d) an infinite-rate viscosity, $\eta_{\infty CY}$, of from about −140 Pa·s to about 42 Pa·s, such as about −132.6 Pa·s to about 31.9 Pa·s; and/or
e) a zero-shear viscosity, $\eta_{oCY}$, of from about 14 kPa·s. to about 3,200 kPa·s, such as about 16 kPa·s. to about 3000 kPa·s, as defined by fitting dependence of complex viscosity on angular frequency data by Carreau-Yasuda model using TA Instruments Trios v3.3.1.4246 software with high quality of fits as indicated by high value of parameter $R^2$ (>0.9999).

In at least one embodiment, the polymer produced herein has a strain hardening ratio (SHR) of about 25 or less, such as 20 or less, such as 15 to 5 (determined using a first strain rate of 1 $sec^{-1}$ a second strain rate of 0.1 $sec^{-1}$, and a time of 2.5 seconds for both rates. Strain hardening ratio is determined as described below.

In at least one embodiment, the polymer produced herein has a complex viscosity as measured by oscillatory shear at a radial frequency of 100 rad/s of 140 Pa·s to 2,000 Pa·s, alternately of from 180 Pa·s to 1,600 Pa·s, alternately from about 240 Pa·s to about 1,400 Pa·s.

In at least one embodiment, the polymer produced herein has a complex viscosity as measured by oscillatory shear at a radial frequency of 0.1 rad/s of 1,000 Pa·s to 80,000 Pa·s, alternately of from 1,500 Pa·s to 70,000 Pa·s, alternately from about 2,000 Pa·s to about 60,000 Pa s.

In at least one embodiment, the polymer produced herein has a 1% Secant flexural modulus of about 1,300 MPa to about 2,300 MPa, alternately about 1,500 MPa to about 2,200 MPa, alternately 1,700 MPa to 2,130 MPa.

1% Secant flexural modulus is measured using an ISO 37-Type 3 bar, with a crosshead speed of 1.0 mm/min and a support span of 30.0 mm using an Instron machine according to ASTM D 790 (A, 1.0 mm/min).

In at least one embodiment, the polymer produced herein, at Hencky strain of 2.5 and at Hencky strain rate of 1.0 $s^{-1}$, has an extensional viscosity of about 700 kPa·s or less, measured at 190° C., alternately of from 400 kPa·s to 650 kPa·s, alternately of from 450 kPa·s to 600 kPa·s.

In at least one embodiment, the polymer produced herein can have a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In some embodiments, the polymers produced herein can have:

a) an Mw of from about 5,000 to about 1,000,000 g/mol (such as from about 25,000 to about 750,000 g/mol, such as from about 50,000 to about 500,000 g/mol, such as from about 80,000 to about 300,000 g/mol, such as from about 80,000 to about 200,000 g/mol) as determined by GPC-4D;

b) a molecular weight distribution, MWD, (Mw/Mn) of greater than about 1, such as from about 1 to about 40, such as from about 1.5 to about 20, such as from about 2 to about 10 as determined by GPC-4D;

c) a $g'_{vis}$ of 5.0 or more, such as greater than about 0.5, such as from about 0.5 to about 1, such as from 0.5 to 0.97, such as from about 0.51 to about 0.98, such as from about 0.6 to about 0.95, such as from about 0.7 to about 0.8 as determined by GPC-4D;

d) a melt flow rate (MFR) of from about 0.1 dg/min to about 1,000 dg/min, such as from about 1 dg/min to about 100 dg/min, such as from about 5 to about 10 dg/min as determined by ASTM D1238 (230° C., 2.16 kg);

e) a $T_m$ of greater than about 145° C., such as from about 150° C. to about 165° C., such as from about 155° C. to about 162° C., such as from about 158° C. to about 160° C. as determined by the differential scanning calorimetry procedure DSC-2 described below. In some embodiments, the polymer can have a $T_m$ of from 148° C. to 159° C.;

f) a shear thinning ratio (STR) of about 0.15 to about 0.007 such as from about 0.1 to about 0.01, such as from about 0.075 to about 0.025, as measured as shear viscosity ratio between radial frequencies of 100 rad/s and 0.1 rad/s (alternately, the polymer has a shear thinning ratio of about 0.007 to about 0.12;

g) a strain hardening ratio (SHR) of about 25 or less, such as 20 or less, such as 15 to 5 (determined using a first strain rate of 1 $sec^{-1}$ a second strain rate of 0.1 $sec^{-1}$, and a time of 2.5 seconds for both rates;

h) a complex viscosity as measured by oscillatory shear at a radial frequency of 100 rad/s of 140 Pa·s to 2,000 Pa·s, alternately of from 180 Pa·s to 1,600 Pa·s, alternately from about 240 Pa·s to about 1,400 Pa·s;

i) a complex viscosity as measured by oscillatory shear at a radial frequency of 0.1 rad/s of 1,000 Pa·s to 80,000 Pa·s, alternately of from 1,500 Pa·s to 70,000 Pa·s, alternately from about 2,000 Pa·s to about 60,000 Pa·s; and/or j) a 1% Secant flexural modulus of about 1,300 MPa to about 2,300 MPa, alternately about 1,500 MPa to about 2,200 MPa, alternately 1,700 MPa to 2,130 MPa.

In some embodiments, the polymers produced herein can have:

a) an Mw of from about 5,000 to about 1,000,000 g/mol (such as from about 25,000 to about 750,000 g/mol, such as from about 50,000 to about 500,000 g/mol, such as from about 80,000 to about 300,000 g/mol, such as from about 80,000 to about 200,000 g/mol) as determined by GPC-4D;

b) a molecular weight distribution, MWD, (Mw/Mn) of greater than about 1, such as from about 1 to about 40, such as from about 1.5 to about 20, such as from about 2 to about 10 as determined by GPC-4D;

c) a g'vis of 5.0 or more, such as greater than about 0.5, such as from about 0.5 to about 1, such as from 0.5 to 0.97, such as from about 0.51 to about 0.98, such as from about 0.6 to about 0.95, such as from about 0.7 to about 0.8 as determined by GPC-4D; d) a melt flow rate (MFR) of from about 0.1 dg/min to about 1,000 dg/min, such as from about 1 dg/min to about 100 dg/min, such as from about 5 to about 10 dg/min as determined by ASTM D1238 (230° C., 2.16 kg);

e) a $T_m$ of greater than about 145° C., such as from about 150° C. to about 165° C., such as from about 155° C. to about 162° C., such as from about 158° C. to about 160° C. as determined by the differential scanning calorimetry procedure DSC-2 described below. In some embodiments, the polymer can have a $T_m$ of from 148° C. to 159° C.; and j) a 1% Secant flexural modulus of about 1,300 MPa to about 2,300 MPa, alternately about 1,500 MPa to about 2,200 MPa, alternately 1,700 MPa to 2,130 MPa.

In some embodiments, the polymers produced herein can have:

i) a g'vis of 5.0 or more, such as greater than about 0.5, such as from about 0.5 to about 1, such as from 0.5 to 0.97, such as from about 0.51 to about 0.98, such as from about 0.6 to about 0.95, such as from about 0.7 to about 0.8 as determined by GPC-4D; and ii) a melt flow rate (MFR) of from about 0.1 dg/min to about 1,000 dg/min, such as from about 1 dg/min to about 100 dg/min, such as from about 5 to about 10 dg/min as determined by ASTM D1238 (230° C., 2.16 kg); and iii) a $T_m$ of greater than about 145° C., such as from about 150° C. to about 165° C., such as from about 155° C. to about 162° C., such as from about 158° C. to about 160° C. as determined by the differential scanning calorimetry procedure DSC-2 described below (in some embodiments, the polymer can have a $T_m$ of from 148° C. to 159° C.); and iv) a 1% Secant flexural modulus of about 1,300 MPa to about 2,300 MPa, alternately about 1,500 MPa to about 2,200 MPa, alternately 1,700 MPa to 2,130 MPa.

In some embodiments, the polymers produced herein can have:

c) a $g'_{vis}$ of 5.0 or more, such as greater than about 0.5, such as from about 0.5 to about 1, such as from 0.5 to 0.97, such as from about 0.51 to about 0.98, such as from about 0.6 to about 0.95, such as from about 0.7 to about 0.8 as determined by GPC-4D; and e) a $T_m$ of greater than about 145° C., such as from about 150° C. to about 165° C., such as from about 155° C. to about 162° C., such as from about 158° C. to about 160° C. as determined by the differential scanning calorimetry procedure DSC-2 described below (in some embodiments, the polymer can have a $T_m$ of from 148° C. to 159° C.); and j) a 1% Secant flexural modulus of about 1,300 MPa to about 2,300 MPa, alternately about 1,500 MPa to about 2,200 MPa, alternately 1,700 MPa to 2,130 MPa.

In some embodiments, the polymers produced can be isotactic polypropylene, atactic polypropylene and random, block or impact copolymers.

The propylene homopolymer or propylene copolymer produced herein may have some level of isotacticity, and can be isotactic or highly isotactic. As used herein, "isotactic" is defined as having at least 10% isotactic pentads according to analysis by $^{13}C$ NMR as described in US 2008/0045638 at paragraph [0613] et seq. As used herein, "highly isotactic"

is defined as having at least 60% isotactic pentads according to analysis by $^{13}C$ NMR. In at least one embodiment, a propylene homopolymer having at least about 85% isotacticity, such as at least about 90% isotacticity can be produced herein. In another embodiment, the propylene polymer produced can be atactic. Atactic polypropylene is defined to be less than 10% isotactic or syndiotactic pentads according to analysis by $^{13}C$ NMR.

GPC 4-D

Unless otherwise indicated, the distribution and the moments of molecular weight (Mw, Mn, Mz, Mw/Mn, etc.), the comonomer content, and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 $cm^{-1}$ to about 3,000 $cm^{-1}$ (representing saturated C—H stretching vibration), an 18-angle light scattering detector and a viscometer. Three Agilent PLgel 10-µm Mixed-B LS columns are used to provide polymer separation. Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 µL. The whole system including transfer lines, columns, and detectors can be contained in an oven maintained at ~145° C. A given amount of sample can be weighed and sealed in a standard vial with ~10 µL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IR5 broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \log\frac{(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175, α and K for other materials are as calculated as described in the published in literature (e.g., Sun, T. et al. (2001) *Macromolecules*, v. 34, pg. 6812), except that for purposes of this present disclosure and claims thereto, α=0.705 and K=0.0000229 for ethylene-propylene copolymers and ethylene-propylene-diene terpolymers, α=0.695 and K=0.000579 for linear ethylene polymers, α=0.705 and K=0.0002288 for linear propylene polymers, and α=0.695 and K=0.000181 for linear butene polymers. Concentrations are expressed in g/$cm^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000 TC) as a function of molecular weight. The short-chain branch (SCB) content per 1,000 TC (SCB/1000 TC) is then computed as a function of molecular weight by applying a chain-end correction to the CH3/1000 TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f^{*}\text{SCB/1000 TC}.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000 TC as a function of molecular weight, is applied to obtain the bulk CH3/1000 TC. A bulk methyl chain ends per 1,000 TC (bulk CH3end/1000 TC) is obtained by weight-averaging the chain-end correction over the molecular-weight range. Then $$w2b = f^{*}\text{bulk } CH3/1000 \text{ TC}$$

$$\text{bulk SCB/1000 TC} = \text{bulk } CH3/1000 \text{ TC} - \text{bulk } CH3\text{end}/1000 \text{ TC}$$

and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the IR5 analysis, $A_2$ is the second virial coefficient, P(θ) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i[\eta]_i}{\sum c_i}$$

where the summations are over the chromatographic slices, i, between the integration limits. The branching index $g'_{vis}$ is defined as:

$$g'_{vis} = \frac{[\eta]_{avg}}{KM_v^{\alpha}},$$

where $M_V$ is the viscosity-average molecular weight based on molecular weights determined by LS analysis and the K and a are for the reference linear polymer, which are, for purposes of this present disclosure and claims thereto, α=0.705 and K=0.0000229 for ethylene-propylene copolymers and ethylene-propylene-diene terpolymers, α=0.695 and K=0.000579 for linear ethylene polymers, α=0.705 and K=0.0002288 for linear propylene polymers, α=0.695 and K=0.000181 for linear butene polymers. Concentrations are expressed in $g/cm^3$, molecular weight is expressed in g/mole, and intrinsic viscosity (hence K in the Mark-Houwink equation) is expressed in dL/g unless otherwise noted. Calculation of the w2b values is as discussed above.

Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in another embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 m. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

In some embodiments, the sample can have an extensional viscosity of from about $10^2$ Pascal-seconds (Pa·s) to about $10^8$ Pa·s, such as from about 104 Pa·s to about $10^6$ Pa·s as measured at 190° C. and at Hencky strains of 4.0 $sec^{-1}$ or lower according to *J. Rheol.*, v. 49(3), pp. 585-606 (2005). For purposes of the claims, the strain rate is 2.5 $sec^{-1}$.

In some embodiments, the film can have a viscosity modulus of from about $10^2$ Pascal-seconds (Pa·s) to about $10^8$ Pa·s, such as from about 104 Pa·s to about $10^6$ Pa·s at 190° C. and at Hencky strains of 4.0 or lower according to *J. Rheol.*, v. 49(3), pp. 585-606 (2005). For purposes of the claims, the strain rate is 2.5 $sec^{-1}$.

For purposes of the claims, GPC-4D shall be used for $M_w$, $M_n$, $M_z$ and $g'_{vis}$. For the high-throughput generated results, a rapid GPC system was used.

For purposes of the claims, $T_m$ is measured by TA-Q200 DSC for high-throughput samples by the differential scanning calorimetry procedure DSC-1 described below. All other samples use differential scanning calorimetry procedure DSC-2 described below.

1% Secant flexural modulus, also referred to as flexural modulus, is measured using an ISO 37-Type 3 bar, with a crosshead speed of 1.0 mm/min and a support span of 30.0 mm using an Instron machine according to ASTM D 790 (A, 1.0 mm/min).

EMBODIMENTS LISTING

The present disclosure provides, among others, the following embodiments, each of which may be considered as optionally including any alternate embodiments.

Clause 1. A catalyst compound represented by the Formula (I):

(I)

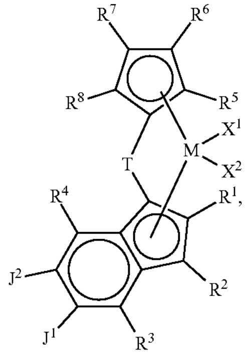

wherein:

M is a Group 4 metal;

T is a bridging group;

each of $X^1$ and $X^2$ is a univalent anionic ligand, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;

$R^3$ is an unsubstituted $C_4$-$C_{62}$ cycloalkyl, a substituted $C_4$-$C_{62}$ cycloalkyl, an unsubstituted $C_4$-$C_{62}$ aryl, a substituted $C_4$-$C_{62}$ aryl, an unsubstituted $C_4$-$C_{62}$ heteroaryl, or a substituted $C_4$-$C_{62}$ heteroaryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof; and $J^1$ and $J^2$ are joined to form a substituted or unsubstituted $C_4$-$C_{62}$ saturated or unsaturated cyclic or polycyclic ring structure, or a combination thereof, preferably provided that $J^1$ and $J^2$ together with the two carbons they are bound to on the indenyl group form at least one saturated ring.

Clause 2. The catalyst compound of Clause 1, wherein M is zirconium or hafnium.

Clause 3. The catalyst compound of Clause 1 or Clause 2, wherein T is represented by the formula:

$(R^*{}_2G)_g$, wherein each G is C, Si, or Ge, g is 1 or 2, and each R* is, independently, hydrogen, halogen, $C_1$-$C_{20}$ unsubstituted hydrocarbyl, a $C_1$-$C_{20}$ substituted hydrocarbyl, or the two or more R* may join to form a substituted or unsubstituted, saturated, partially unsaturated or aromatic, cyclic or polycyclic substituent.

Clause 4. The catalyst compound of any one of Clauses 1 to 3, wherein T is selected from the group consisting of $CH_2$, $CH_2CH_2$, $C(CH_3)_2$, $(Ph)_2C$, $(p\text{-}(Et)_3SiPh)_2C$, $SiMe_2$, $SiPh_2$, SiMePh, $Si(CH_2)_3$, $Si(CH_2)_4$, and $Si(CH_2)_4$.

Clause 5. The catalyst compound of any one of Clauses 1 to 4, wherein each of $X^1$ and $X^2$ is independently a halide or a $C_1$-$C_5$ hydrocarbyl.

Clause 6. The catalyst compound of any one of Clauses 1 to 5, wherein each of $R^5$, $R^6$, $R^7$, and $R^8$ is independently an unsubstituted $C_1$-$C_{20}$ (alternately $C_1$-$C_6$) hydrocarbyl or a $C_1$-$C_{20}$ (alternately $C_1$-$C_6$) substituted hydrocarbyl.

Clause 7. The catalyst compound of any one of Clauses 1 to 6, wherein each of $R^5$, $R^6$, $R^7$, and $R^8$ is independently an unsubstituted $C_1$-$C_6$ hydrocarbyl or a substituted $C_1$-$C_6$ hydrocarbyl.

Clause 8. The catalyst compound of any one of Clauses 1 to 7, wherein $R^1$ is hydrogen, a substituted $C_1$-$C_{20}$ hydrocarbyl, or an unsubstituted $C_1$-$C_{20}$ hydrocarbyl.

Clause 9. The catalyst compound of any one of Clauses 1 to 8, wherein $R^1$ is hydrogen, a substituted $C_1$-$C_6$ hydrocarbyl, or an unsubstituted $C_1$-$C_6$ hydrocarbyl.

Clause 10. The catalyst compound of any one of Clauses 1 to 9, wherein each of $R^2$ and $R^4$ is independently hydrogen, a substituted $C_1$-$C_{20}$ (alternately $C_1$-$C_6$) hydrocarbyl, or an unsubstituted $C_1$-$C_{20}$ (alternately $C_1$-$C_6$) hydrocarbyl.

Clause 11. The catalyst compound of any one of Clauses 1 to 10, wherein $R^3$ is represented by the formula:

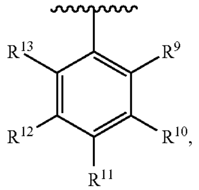

wherein each of $R^9$, $R^{10}$, $R^{11}$, $R^{12}$, and $R^{13}$ is independently hydrogen, $C_1$-$C_{40}$ hydrocarbyl or $C_1$-$C_{40}$ substituted hydrocarbyl, a heteroatom or a heteroatom-containing group, or two or more of $R^9$, $R^{10}$, $R^{11}$, $R^{12}$, and $R^{13}$ are joined together to form a $C_4$-$C_{20}$ cyclic or polycyclic ring structure.

Clause 12. The catalyst compound of Clause 11, wherein each of $R^9$, $R^{10}$, $R^{11}$, $R^{12}$, and $R^{13}$ is independently hydrogen, halogen, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl.

Clause 13. The catalyst compound of Clause 11, wherein each of $R^9$, $R^{10}$, $R^{11}$, $R^{12}$, and $R^{13}$ is independently hydrogen, a substituted $C_1$-$C_6$ hydrocarbyl, an unsubstituted $C_1$-$C_6$ hydrocarbyl, or a phenyl.

Clause 14. The catalyst compound of any one of Clauses 1 to 13, wherein $J^1$ and $J^2$ are joined to form an unsubstituted $C_4$-$C_{20}$ cyclic or polycyclic ring or a substituted $C_4$-$C_{20}$ cyclic or polycyclic ring, optionally provided that $J^1$ and $J^2$ together with the two carbons they are bound to on the indenyl group form at least one saturated ring.

Clause 15. The catalyst compound of any one of Clauses 1 to 13, wherein $J^1$ and $J^2$ are joined to form an unsubstituted $C_4$-$C_{20}$ cyclic or polycyclic ring or a substituted $C_4$-$C_{20}$ cyclic or polycyclic ring, optionally provided that $J^1$ and $J^2$ together with the two carbons they are bound to on the indenyl group form at least one 5 or 6 membered saturated ring.
Clause 16. The catalyst compound of any one of Clauses 1 to 15, wherein the catalyst compound is selected from the group consisting of:
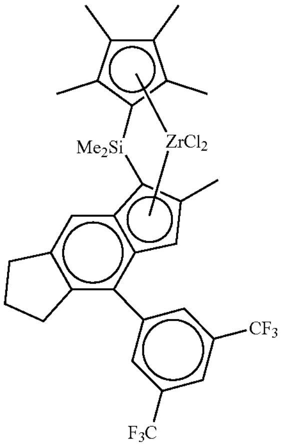
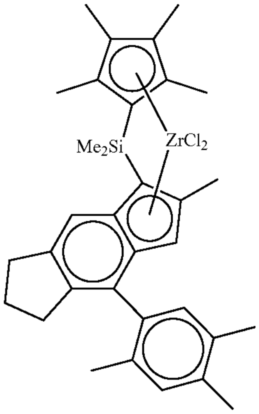
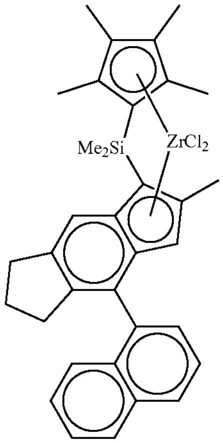
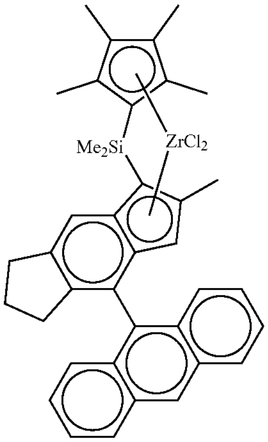
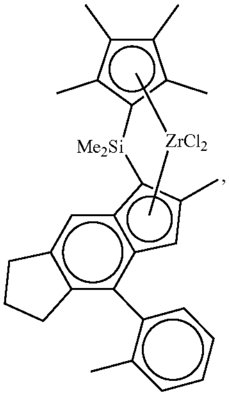
-continued
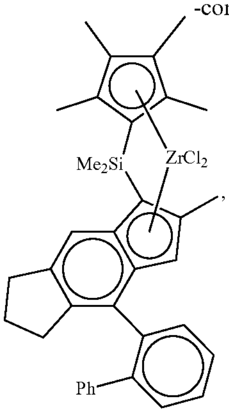
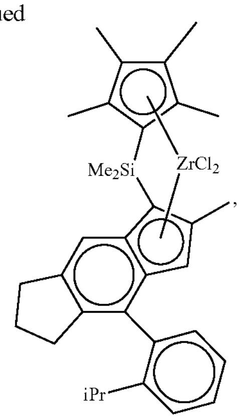
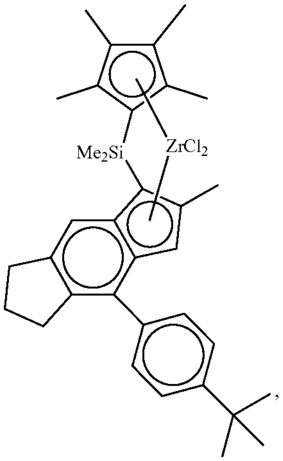
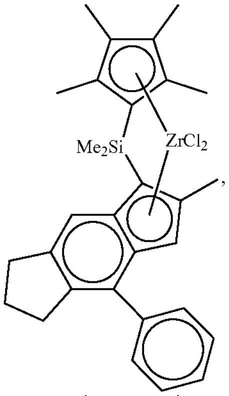
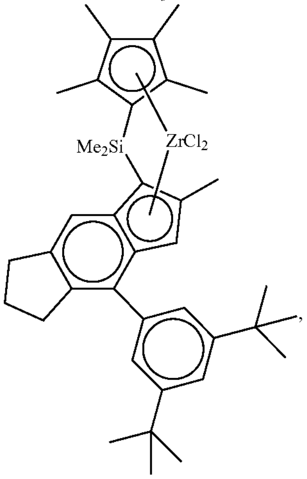

-continued
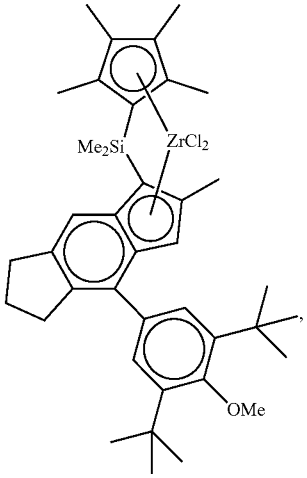
,
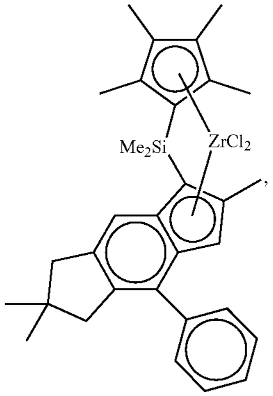
,
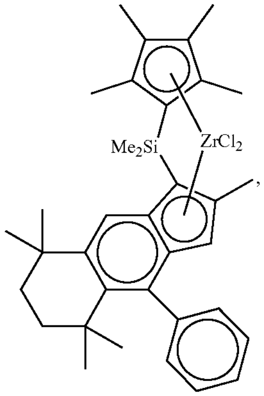
,
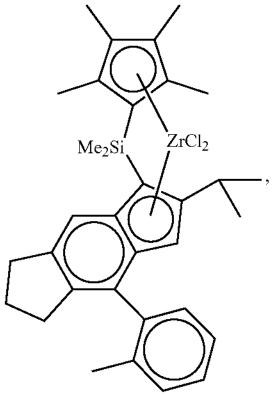
,
-continued
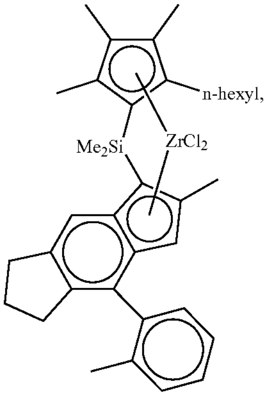
,
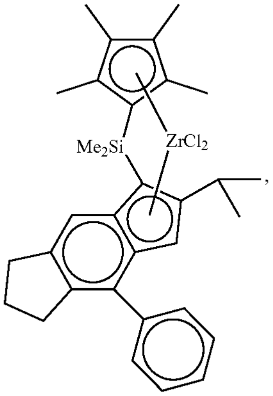
,
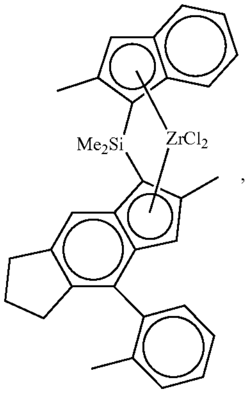
,
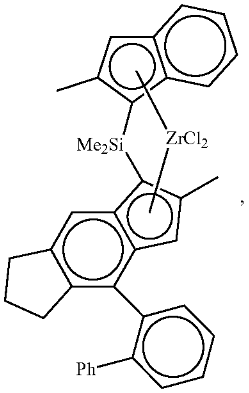
,
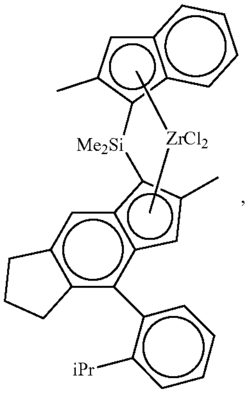
,
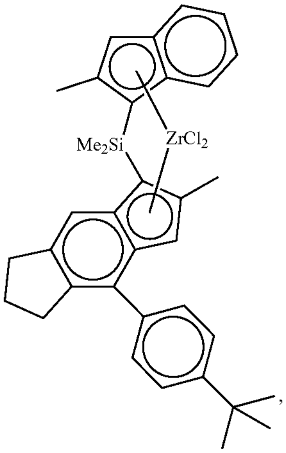
, -continued
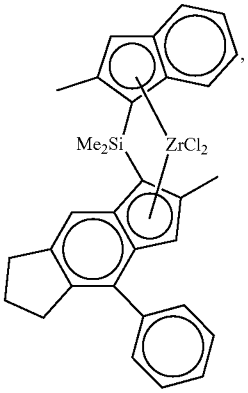
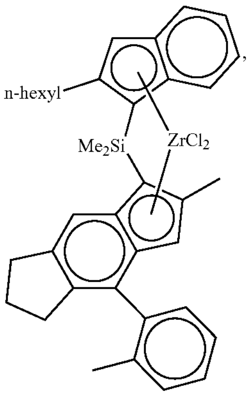
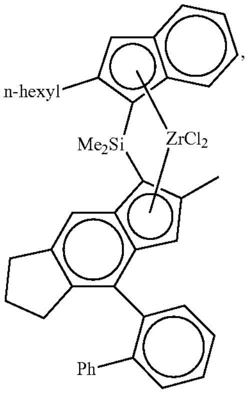
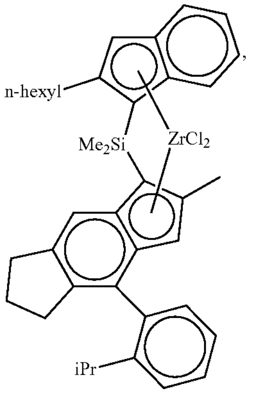
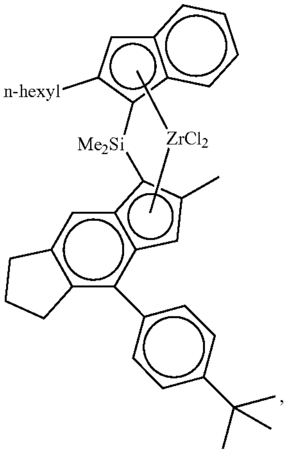
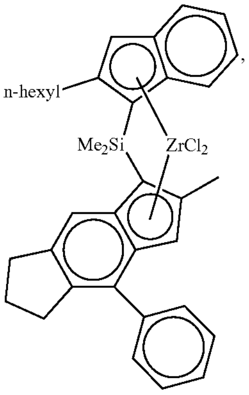
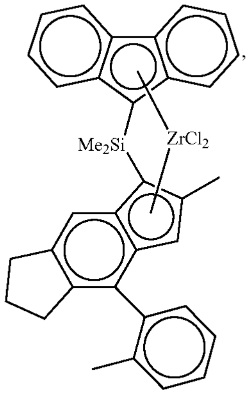
-continued
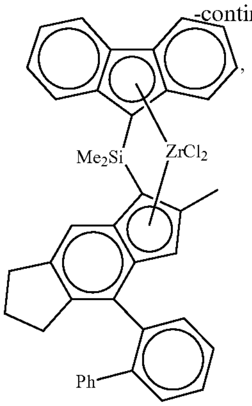
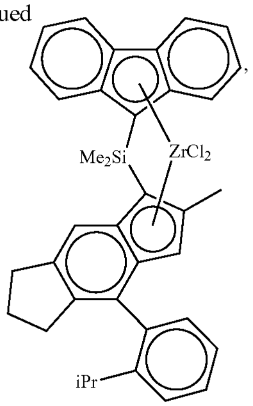
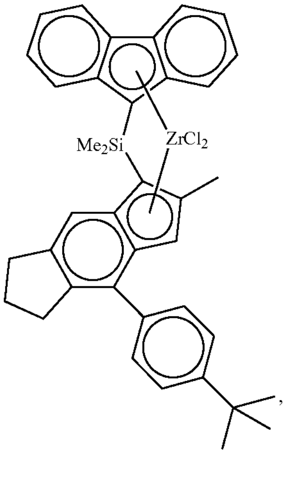
, and
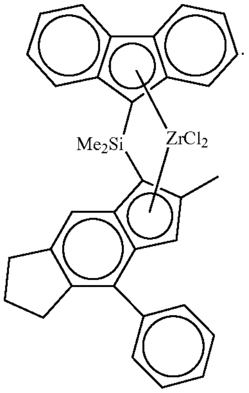
Clause 17. The catalyst compound of Clause 1, wherein the catalyst compound is represented by Formula (III):

(III)

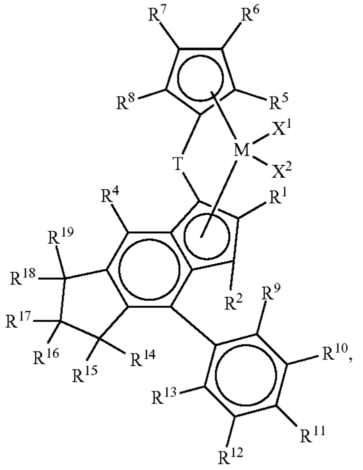

wherein:

M is a Group 4 metal;

T is a bridging group;

each of $X^1$ and $X^2$ is a univalent anionic ligand, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ are joined to form a substituted or unsubstituted $C_4$-$C_{62}$ saturated or unsaturated cyclic or polycyclic ring structure, or a combination thereof;

each of $R^9$, $R^{10}$, $R^{11}$, $R^{12}$, and $R^{13}$ is independently hydrogen, $C_1$-$C_{40}$ hydrocarbyl or $C_1$-$C_{40}$ substituted hydrocarbyl, a heteroatom or a heteroatom-containing group, or two or more of $R^9$, $R^{10}$, $R^{11}$, $R^{12}$, and $R^{13}$ are joined together to form a $C_4$-$C_{20}$ cyclic or polycyclic ring structure; and each of $R^{14}$, $R^{15}$, $R^{16}$, $R^{17}$, $R^{18}$, and $R^{19}$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or two or more of $R^{14}$, $R^{15}$, $R^{16}$, $R^{17}$, $R^{18}$, and $R^{19}$ are joined together to form cyclic or polycyclic ring structure, or a combination thereof.

Clause 18. The catalyst compound of Clause 1, wherein the catalyst compound is represented by Formula (IV):

(IV)

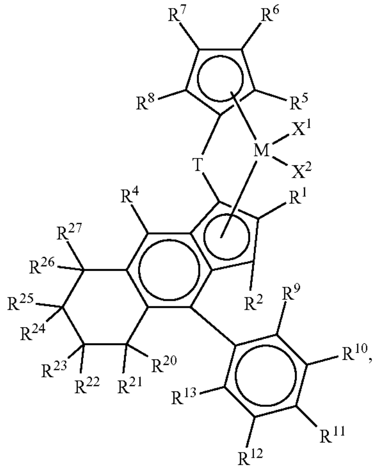

wherein:

M is a Group 4 metal;

T is a bridging group;

each of $X^1$ and $X^2$ is a univalent anionic ligand, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof;

each of $R^9$, $R^{10}$, $R^{11}$, $R^{12}$, and $R^{13}$ is independently hydrogen, $C_1$-$C_{40}$ hydrocarbyl or $C_1$-$C_{40}$ substituted hydrocarbyl, a heteroatom or a heteroatom-containing group, or two or more of $R^9$, $R^{10}$, $R^{11}$, $R^{12}$, and $R^{13}$ are joined together to form a $C_4$-$C_{20}$ cyclic or polycyclic ring structure; and each of $R^{20}$, $R^{21}$, $R^{22}$, $R^{23}$, $R^{24}$, $R^{25}$, $R^{26}$, $R^{27}$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or two or more of $R^{20}$, $R^{21}$, $R^{22}$, $R^{23}$, $R^{24}$, $R^{25}$, $R^{26}$, $R^{27}$ are joined together to form cyclic or polycyclic ring structure, or a combination thereof.

Clause 19. The catalyst compound of Clause 17 or Clause 18, wherein T is represented by the formula:

$$(R^*_2G)_g,$$

wherein each G is C, Si, or Ge, g is 1 or 2, and each R* is, independently, hydrogen, halogen, $C_1$-$C_{20}$ unsubstituted hydrocarbyl, a $C_1$-$C_{20}$ substituted hydrocarbyl, or the two or more R* may join to form a substituted or unsubstituted, saturated, partially unsaturated or aromatic, cyclic or polycyclic substituent.

Clause 20. The catalyst compound of any one of Clauses 17 to 19, wherein T is selected from the group consisting of $CH_2$, $CH_2CH_2$, $C(CH_3)_2$, $(Ph)_2C$, $(p\text{-}(Et)_3SiPh)_2C$, $SiMe_2$, $SiPh_2$, SiMePh, $Si(CH_2)_3$, $Si(CH_2)_4$, and $Si(CH_2)_4$.

Clause 21. The catalyst compound of any one of Clauses 17 to 20, wherein each of $X^1$ and $X^2$ is independently a halide or a $C_1$-$C_5$ hydrocarbyl.

Clause 22. The catalyst compound of any one of Clauses 17 to 21, wherein each of $R^5$, $R^6$, $R^7$, and $R^8$ is independently an unsubstituted $C_1$-$C_{20}$ hydrocarbyl or a $C_1$-$C_{20}$ substituted hydrocarbyl.

Clause 23. The catalyst compound of any one of Clauses 17 to 22, wherein each of $R^5$, $R^6$, $R^7$, and $R^8$ is independently an unsubstituted $C_1$-$C_6$ hydrocarbyl or a substituted $C_1$-$C_6$ hydrocarbyl.

Clause 24. The catalyst compound of any one of Clauses 17 to 23, wherein $R^1$ is hydrogen, a substituted $C_1$-$C_{20}$ hydrocarbyl, or an unsubstituted $C_1$-$C_{20}$ hydrocarbyl.

Clause 25. The catalyst compound of any one of Clauses 17 to 24, wherein $R^1$ is hydrogen, a substituted $C_1$-$C_6$ hydrocarbyl, or an unsubstituted $C_1$-$C_6$ hydrocarbyl.

Clause 26. The catalyst compound of any one of Clauses 17 to 25, wherein each of $R^2$ and $R^4$ is independently hydrogen, a substituted $C_1$-$C_{20}$ hydrocarbyl, or an unsubstituted $C_1$-$C_{20}$ hydrocarbyl.

Clause 27. The catalyst compound of any one of Clauses 17 to 26, wherein each of $R^2$ and $R^4$ is independently hydrogen, a substituted $C_1$-$C_6$ hydrocarbyl, or an unsubstituted $C_1$-$C_6$ hydrocarbyl.

Clause 28. The catalyst compound of any one of Clauses 17 to 27, wherein $R^3$ is represented by the formula:

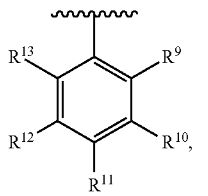

wherein each of $R^9$, $R^{10}$, $R^{11}$, $R^{12}$, and $R^{13}$ is independently hydrogen, $C_1$-$C_{40}$ hydrocarbyl or $C_1$-$C_{40}$ substituted hydrocarbyl, a heteroatom or a heteroatom-containing group, or two or more of $R^9$, $R^{10}$, $R^{11}$, $R^{12}$, and $R^{13}$ are joined together to form a $C_4$-$C_{20}$ cyclic or polycyclic ring structure.

Clause 29. The catalyst compound of Clause 28, wherein each of $R^9$, $R^{10}$, $R^{11}$, $R^{12}$, and $R^{13}$ is independently hydrogen, halogen, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl.

Clause 30. The catalyst compound of Clause 28, wherein each of $R^9$, $R^{10}$, $R^{11}$, $R^{12}$, and $R^{13}$ is independently hydrogen, a substituted $C_1$-$C_6$ hydrocarbyl, an unsubstituted $C_1$-$C_6$ hydrocarbyl, or a phenyl.

Clause 31. The catalyst compound of any one of Clause 17 or Clauses 19 to 30, wherein each of $R^{14}$, $R^{15}$, $R^{16}$, $R^{17}$, $R^{18}$, and $R^{19}$ is independently hydrogen, $C_1$-$C_{40}$ hydrocarbyl, $C_1$-$C_{40}$ substituted hydrocarbyl, or two or more of $R^{14}$, $R^{15}$, $R^{16}$, $R^{17}$, $R^{18}$, and $R^{19}$ are joined together to form cyclic or polycyclic ring structure, or a combination thereof.

Clause 32. The catalyst compound of Clause 31, wherein each of $R^{14}$, $R^{15}$, $R^{16}$, $R^{17}$, $R^{18}$, and $R^{19}$ is independently hydrogen, a substituted $C_1$-$C_{20}$ hydrocarbyl, or an unsubstituted $C_1$-$C_{20}$ hydrocarbyl.

Clause 33. The catalyst compound of Clauses 31 or Clause 32, wherein each of $R^{14}$, $R^{15}$, $R^{16}$, $R^{17}$, $R^{18}$, and $R^{19}$ is independently hydrogen, methyl, ethyl, propyl, butyl, pentyl, or hexyl.

Clause 34. The catalyst compound of any one of Clauses 18 to 30, wherein each of $R^{20}$, $R^{21}$, $R^{22}$, $R^{23}$, $R^{24}$, $R^{25}$, $R^{26}$, $R^{27}$ is independently hydrogen, $C_1$-$C_{40}$ hydrocarbyl, $C_1$-$C_{40}$ substituted hydrocarbyl, or two or more of $R^{20}$, $R^{21}$, $R^{22}$, $R^{23}$, $R^{24}$, $R^{25}$, $R^{26}$, $R^{27}$ are joined together to form cyclic or polycyclic ring structure, or a combination thereof.

Clause 35. The catalyst compound of Clause 34, wherein each of $R^{20}$, $R^{21}$, $R^{22}$, $R^{23}$, $R^{24}$, $R^{25}$, $R^{26}$, $R^{27}$ is independently hydrogen, a substituted $C_1$-$C_{20}$ hydrocarbyl, or an unsubstituted $C_1$-$C_{20}$ hydrocarbyl.

Clause 36. The catalyst compound of Clause 34, wherein each of $R^{20}$, $R^{21}$, $R^{22}$, $R^{23}$, $R^{24}$, $R^{25}$, $R^{26}$, $R^{27}$ is independently hydrogen, methyl, ethyl, propyl, butyl, pentyl, or hexyl.

Clause 37. A catalyst system comprising an activator and the catalyst compound of any one of Clauses 1 to 36.

Clause 38. The catalyst system of Clause 37, further comprising a support material.

Clause 39. The catalyst system of Clause 38, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

Clause 40. The catalyst system of any one of Clauses 37 to 39, wherein the activator comprises a non-coordinating anion activator.

Clause 41. The catalyst system of Clause 40, wherein the activator is represented by the formula:

$$(Z)_d^+(A^{d-})$$

wherein Z is (L-H) or a reducible Lewis Acid, L is a Lewis base; H is hydrogen; $(L\text{-}H)^+$ is a Bronsted acid; $A^{d-}$ is a non-coordinating anion having the charge d−; and d is an integer from 1 to 3.

Clause 42. The catalyst system of Clause 41, wherein the activator is represented by the formula:

$$(Z)_d^+(A^{d-})$$

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

Clause 43. The catalyst system of Clause 40, wherein the activator is

N,N-dimethylanilinium tetrakis(pentafluorophenyl)borate,
dioctadecylmethylammonium tetrakis(pentafluorophenyl) borate,
dioctadecylmethylammonium tetrakis(perfluoronaphthyl) borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-$PhNMe_2H$][$(C_6F_3(C_6F_5)_2)_4B$],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl) borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl)borate,
N,N-dimethylanilinium tetrakis-(2,3,4,6-tetrafluorophenyl) borate,
N,N-diethylanilinium tetrakis-(2,3,4,6-tetrafluorophenyl) borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl) borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl) borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl) phenyl)borate,
N,N-diethylanilinium tetrakis(3,5-bis(trifluoromethyl)phenyl)borate,
N,N-dimethyl-(2,4,6-trimethylanilinium)tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl) borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine,
N-methyl-4-nonadecyl-N-octadecylbenzenaminium tetrakis (pentafluorophenyl)borate,
N-methyl-4-nonadecyl-N-octadecylbenzenaminium tetrakis (perfluoronaphthalenyl)borate,
triphenylcarbenium tetrakis(3,5-bis(trifluoromethyl)phenyl) borate), or
a combination thereof.

Clause 44. The catalyst system of Clause 37, further comprising a metal hydrocarbenyl chain transfer agent represented by the formula:

$$Al(R')_{3-v}(R'')_v$$

wherein each R' independently is a $C_1$-$C_{30}$ hydrocarbyl group; each R", independently, is a $C_4$-$C_{20}$ hydrocarbenyl group having an end-vinyl group; and v is from 0.1 to 3.

Clause 45. The catalyst system of Clause 37, wherein the activator comprises an alkylalumoxane.

Clause 46. The catalyst system of Clause 45, wherein the alkylalumoxane is present at a molar ratio of aluminum to catalyst compound transition metal of 100:1 or more.

Clause 47. A process to prepare a propylene homopolymer comprising:

introducing propylene and a catalyst system of any one of Clauses 38-46 into a reactor at a reactor pressure of from 0.7 bar to 70 bar and a reactor temperature of from 20° C. to 150° C.; and obtaining a propylene homopolymer.

Clause 48. The process of Clause 47, wherein the propylene homopolymer has a Mw of 50,000 to 500,000 g/mol, and $T_m$ of greater than 150° C.

Clause 49. A process to prepare a propylene copolymer comprising:

introducing propylene, one or more of a $C_2$ or $C_4$ to $C_{40}$ olefin monomer, and a catalyst system of any one of Clause 38-46 into a reactor at a reactor pressure of from 0.7 bar to 70 bar and a reactor temperature of from 20° C. to 150° C.; and obtaining a propylene copolymer.

Clause 50. The process of Clause 49, wherein the olefin monomer is one or more of a $C_4$ to $C_{20}$ alpha olefin or a $C_4$ to $C_{14}$ α,ω-olefin.

Clause 51. The process of Clauses 49 or Clause 50, wherein the olefin monomer is a $C_4$ to $C_s$ alpha olefin.

Clause 52. The process of Clauses 49 or Clause 50, wherein the olefin monomer is 1,4-heptadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 2-methyl-1,6-heptadiene, 2-methyl-1,7-octadiene, 2-methyl-1,8-nonadiene, 2-methyl-1,9-decadiene, 2-methyl-1,10-undecadiene, 2-methyl-1,11-dodecadiene, 2-methyl-1,12-tridecadiene, or 2-methyl-1,13-tetradecadiene.

Clause 53. The process of any one of Clauses 49 to 52, wherein the propylene copolymer has a Mw value of 50,000 to 500,000 g/mol, and a $T_m$ of greater than 148° C.

Clause 54. The process of any one of Clauses 49 to 52, wherein the propylene copolymer has a $T_m$ of from 148° C. to 159° C. and Tc of from 112° C. to 125° C.

Clause 55. The process of any one of Clauses 49 to 54, wherein the propylene copolymer has from 0.01 (such as 0.1) wt % to 50 wt % of one or more of $C_2$ or $C_4$ to $C_{20}$ olefin comonomer, based on a total amount of the propylene copolymer.

Clause 56. The process of any one of Clauses 49 to 55, wherein the propylene copolymer has pronounced levels of long-chain branching, as indicated by $g'_{vis}$ values in the range of about 0.5 to about 0.97.

Clause 57. The process of any one of Clauses 49 to 56, wherein the propylene copolymer has a shear thinning ratio of about 0.007 to about 0.12.

Clause 58. The process of any one of Clauses 49 to 57, wherein the propylene copolymer has a complex viscosity as measured by oscillatory shear at a radial frequency of 100 rad/s of about 240 Pa·s to about 1,400 Pa·s.

Clause 59. The process of any one of Clauses 49 to 58, wherein the propylene copolymer has a complex viscosity as measured by oscillatory shear at a radial frequency of 0.1 rad/s of about 2,000 Pa·s to about 60,000 Pa·s.

Clause 60. The process of any one of Clauses 49 to 59, wherein the propylene copolymer has a strain hardening ratio of about 5 to about 25, when measured at Henecky strain rates of 1.0 $s^{-1}$ and 0.1 $s^{-1}$ and at a time of 2.5 seconds, alternately the propylene copolymer has a strain hardening ratio of about 1 to about 15, when measured at Henecky strain rates of 10 $s^{-1}$ and 1 $s^{-1}$ and at a time of 0.25 seconds.

Clause 61. The process of any one of Clauses 49 to 60, wherein the propylene copolymer, at Hencky strain of 2.5 $s^{-1}$ and at Hencky strain rate of 1.0 $s^{-1}$, has an extensional viscosity of about 600 kPa·s or less, measured at 190° C.

Clause 62. The process of any one of Clauses 49 to 61, wherein the propylene copolymer has a crystallization rate and a crystallization half-time greater by a factor of about 1.4 to about 30 than propylene polymer having the same comonomer, same comonomer content, same melt flow rate (MFR, ASTM 1238, 2.16 kg, 230° C.), same Mw/Mn, and a $g'_{vis}$ of 0.95 or more, preferably produced by a catalyst system of dimethylsilyl bis(2-methyl,4-phenyl-indenyl) $ZrMe_2$, methylalumoxane, and optional support.

Clause 63. The process of any one of Clauses 49 to 62, wherein the propylene copolymer has a 1% Secant flexural modulus of about 1,300 MPa to about 2,300 MPa.

Clause 64. A propylene copolymer comprising propylene and 0.1 to 10 wt % diene, having: i) a $g'_{vis}$ of 0.5 to 0.97; and ii) a $T_m$ of greater than about 145° C.; and iii) a 1% Secant flexural modulus of about 1,300 MPa to about 2,300 MPa.

Clause 65. The propylene copolymer of clause 64, wherein the diene is selected from the group consisting of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, ethylidene norbornene, divinylbenzene, and dicyclopentadiene.

66. A polymer produced by the process of any of clauses 49 to 63.

67. The process of any one of clauses 49 to 63, wherein the propylene copolymer shows crystallization half times of about 50 min to about 2 min, measured at a crystallization temperature of 132° C., and crystallization half times of about 1 min to about 30 s, measured at a crystallization temperature of 112° C.

68. The process of any one of clauses 49 to 63, wherein the propylene copolymer shows crystallization rates of about 0.02 $min^{-1}$ to about 0.5 $min^{-1}$, measured at a crystallization temperature of 132° C., and crystallization half times of about 1 $min^{-1}$ to about 2 $min^{-1}$, measured at a crystallization temperature of 112° C.

Examples

A. Example Catalysts and Comparative Catalysts

Table 1 shows example and comparative catalysts used for the investigations. Comparative catalysts F-J are asymmetric catalysts, and comparative catalysts K-M are $C_2$ symmetric catalysts.

TABLE 1
| Example Catalysts |
| --- |
| 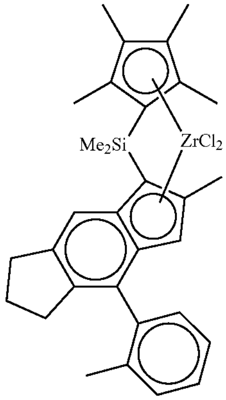 Catalyst A |
| 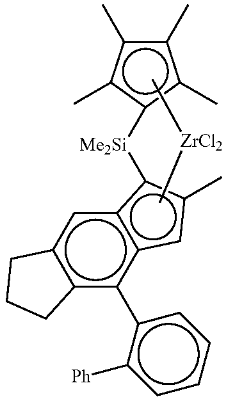 Catalyst B |
| 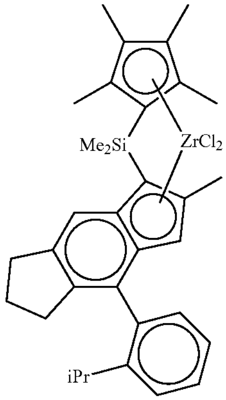 Catalyst C |
TABLE 1-continued
| |
| --- |
| 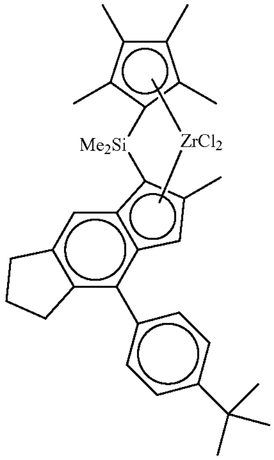 Catalyst D |
| 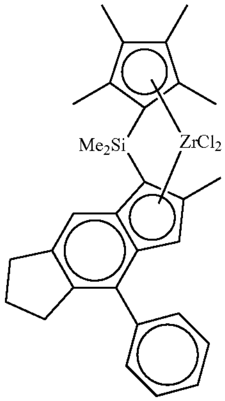 Catalyst E |
| 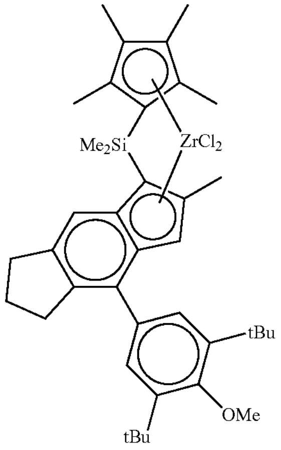 Catalyst F |

TABLE 1-continued
Catalyst G
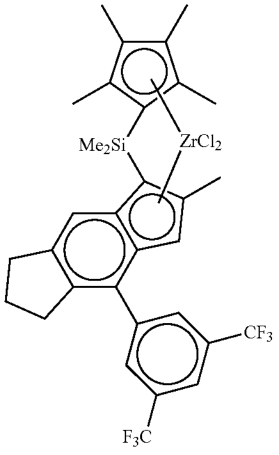
Catalyst H
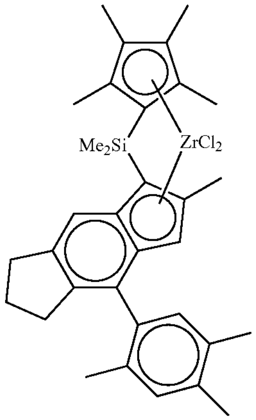
Catalyst I
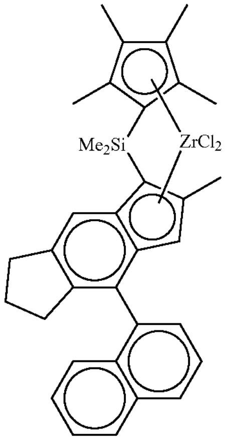
TABLE 1-continued
Catalyst J
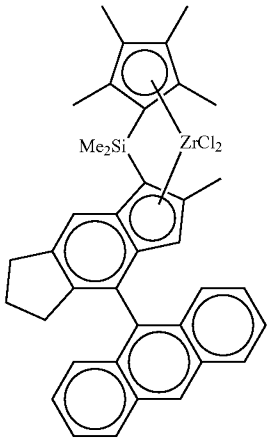
Comparative Catalysts
Catalyst K
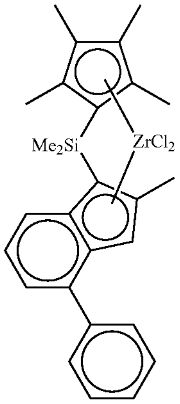
Catalyst L
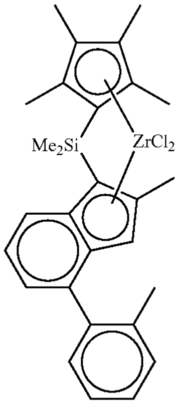

TABLE 1-continued
Catalyst M
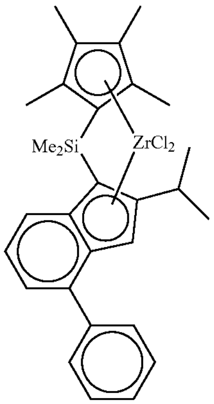
Catalyst N
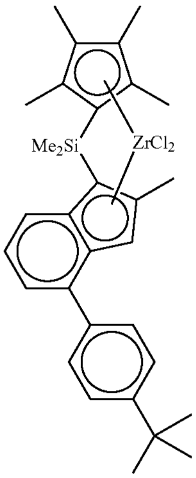
Catalyst O
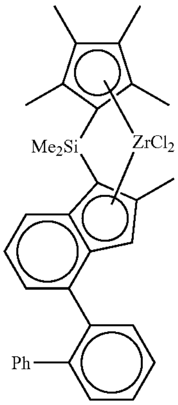
TABLE 1-continued
Catalyst P
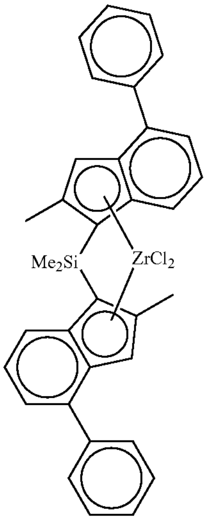
Catalyst Q
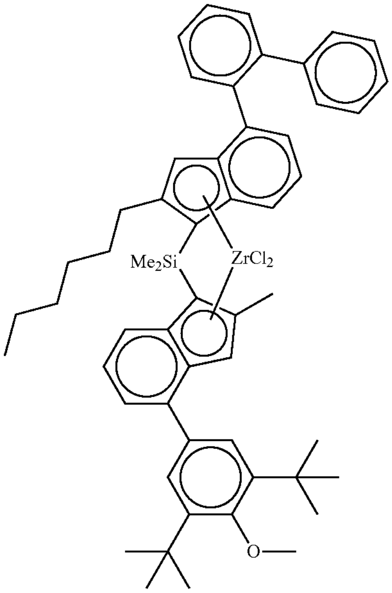
Catalyst R
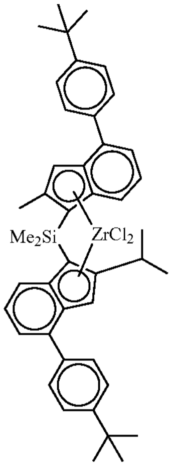

TABLE 1-continued

Catalyst S

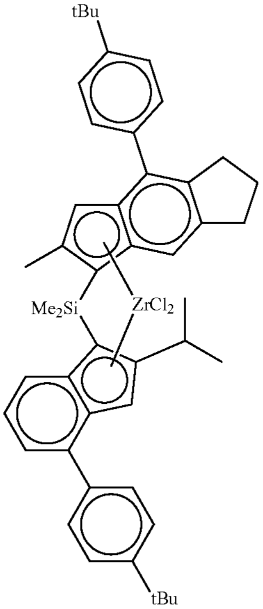

See Section F below for catalyst synthesis and support methods.

For the investigations conducted herein, MAO is methyl alumoxane (30 wt % in toluene).

B. Isotactic Propylene Polymerizations

B1a. 2 L Autoclave Conditions (used in dual-stage polymerizations): Supported catalyst (ca. 0.5-0.6 g) was slurried into dry and degassed mineral oil to yield a slurry that contains 5% by weight of supported catalyst. The supported catalysts (typically 50 mg) were added to the reactor as a slurry in oil. The catalyst slurry containing certain amounts of catalysts was injected using 250 mL propylene into a 2 L autoclave reactor containing propylene (1,000 mL) and triisobutylaluminum, TIBAL (2.0 mL of 5% toluene solution). The reactor was kept at ambient temperature for 5 minutes, after which the temperature was raised to 70° C. At that point, polymerization was allowed to proceed for 30 minutes. After 30 minutes $H_2$ (provided from a 183 mL container under the pressure indicated in the table) and optionally 1,7-octadiene was added to initiate the second stage of polymerization. The polymerization was allowed to proceed for additional 20 minutes. After the allotted time the reactor was cooled to room temperature and vented. The polymer was collected and dried in the vacuum oven at 60° C. overnight.

B1b. 1 L Autoclave Conditions (used in single stage polymerizations): Supported catalyst (ca. 0.5-0.6 g.) was slurried into dry and degassed mineral oil to yield a slurry that contains 5% by weight of supported catalyst. The supported catalysts (typically 12.5-25.0 mg) was added to the reactor as a slurry in oil. The catalyst slurry containing certain amounts of catalysts was injected with 100 mL propylene into a 1 L autoclave reactor containing propylene (500 mL) $H_2$ (provided from a 25 mL pressurized at 30 psi), triisobutylaluminum (TIBAL, 0.2 ml of a 1M hexane solution) and optionally desired amounts of 1,7-octadiene. The reactor was kept at ambient temperature for 5 minutes, after which the temperature was raised to 70° C. The polymerization was run for an allotted period of time typically about 15-30 minutes. After the allotted time the reactor was cooled to room temperature and vented. The polymer was dried in the vacuum oven at 60° C. overnight.

B2. High Throughput Conditions: Unless stated otherwise, propylene homopolymerizations and ethylene-propylene copolymerizations (if any) were carried out in a parallel, pressure reactor, as generally described in U.S. Pat. Nos. 6,306,658; 6,455,316; 6,489,168; WO 2000/009255; and Murphy et al., *J Am. Chem. Soc.,* 2003, v. 125, pp. 4306-4317, each of which is fully incorporated herein by reference for US purposes. Although the specific quantities, temperatures, solvents, reactants, reactant ratios, pressures, and other variables may have changed from one polymerization run to the next, the following describes a typical polymerization performed in a parallel, pressure reactor.

Propylene Polymerization with Metallocene: A pre-weighed glass vial insert and disposable stirring paddle were fitted to each reaction vessel of the reactor, which contains 48 individual reaction vessels. The reactor was then closed and propylene was introduced to each vessel as a condensed gas liquid (typically 1-4 mL) (as shown in examples in Table 1 and Table 2) or gas (as shown in the examples in Table 3). Then solvent (typically the isohexane) was added to bring the total reaction volume, including the subsequent additions, to 5 mL and the reactor vessels were heated to their set temperature (usually from about 50° C. to about 110° C.). The contents of the vessel were stirred at 800 rpm. An activator solution (typically 100-1,000 molar equivalents of methyl alumoxane (MAO) in toluene) was then injected into the reaction vessel along with 500 microliters of toluene, followed by a toluene solution of catalyst (typically 0.50 mM in toluene, such as 20-40 nanomoles of catalyst) and another aliquot of toluene (500 microliters).

In case of slurry polymerization, the injected propylene feed (typically 4 mL) was treated with 100 µL of 0.05 M of scavenger (typically TIBAL—triisobutyl aluminum). Supported catalysts were suspended in hydrocarbon solvent to make a slurry of known concentration (typically 3-5 mg of supported catalysts per 1 mL of solvent). The pre-determined volume of the above mentioned catalyst slurry (typically between 100-150 µL) was then injected in the reactor to initiate polymerization. Equivalence is determined based on the mol. equivalents relative to the moles of the transition metal in the catalyst complex. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

C. Propylene/1-Octene Copolymerizations

Propylene polymerizations with metallocene was prepared by high-throughput conditions according to the following general procedure. A pre-weighed glass vial insert and disposable stirring paddle were fitted to each reaction vessel of the reactor, which contains 48 individual reaction vessels. The reactor was then closed and propylene (typically 1 mL) was introduced to each vessel as a condensed gas liquid (typically 1 mL) (as shown in examples in Table 1) or gas (as shown in the examples in Table 3). Then solvent (typically the isohexane) was added to bring the total reaction volume, including the subsequent additions, to 5 mL and the reactor vessels were heated to their set temperature (usually from about 50° C. to about 110° C.). The contents of the vessel were stirred at 800 rpm. An activator solution (typically 100-1,000 molar equivalents of methyl alumoxane (MAO) in toluene) was then injected into the reaction vessel along with 500 microliters of toluene, followed by addition of 1-octene (typically 20-160 μL). Catalyst (typically 0.50 mM in toluene, such as 20-40 nanomoles of catalyst) and another aliquot of toluene (500 microliters) were then added to initiate the reaction. Equivalence is determined based on the mol equivalents relative to the moles of the transition metal in the catalyst complex. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

D. Results

Solution Phase—Table A summarizes the results for isotactic polypropylene polymerizations using example catalysts described herein and comparative catalysts produced by high throughput conditions (B2 above). Conditions for the data in Table A are: [Cat.]=0.03 μmol, [MAO]=500 equiv., 1 mL of liquid propylene. Isohexane is used as solvent (4 mL). Polymerization temperature is 70° C. and polymerization pressure is 115 psi. Experiments are an average of 3 runs.

TABLE A

Isotactic Polypropylene Polymerizations in Solution Phase

| Run # | Cat. | Quench time (s) | Yield (mg) | Mw (kg/mol) Rapid GPC | $T_m$ (° C.) (DSC-1) | Activity (kg polymer/ mmol catalyst hour) |
|---|---|---|---|---|---|---|
| Ex. 1 | A | 76 | 210.2 | 133 | 160.5 | 334.5 |
| Ex. 2 | B | 104 | 197.9 | 97 | 155.8 | 229.2 |
| Ex. 3 | D | 82 | 224.2 | 88 | 155.2 | 329.2 |
| Ex. 4 | C | 100 | 190.8 | 130 | 159.3 | 228.2 |
| Ex. 5 | E | 72 | 213.6 | 89 | 153.8 | 352.5 |
| Comp. 1 | K | 124 | 152.0 | 115 | 148.5 | 147.1 |
| Comp. 2 | L | 144 | 128.0 | 117 | 156.0 | 106.7 |
| Comp. 3 | M | 172 | 106.3 | 29 | 120.7 | 74.2 |
| Comp. 4 | N | 101 | 151.8 | 90 | 149.9 | 174.6 |
| Comp. 5 | O | 117 | 128.1 | 87 | 153.6 | 140.3 |
| Comp. 6 | P | 116 | 156.1 | 103 | 155.5 | 161.5 |
| Comp. 7 | Q | 69 | 372.0 | 389 | 156.6 | 647.0 |
| Comp. 8 | R | 76 | 276.0 | 344 | 154.9 | 433.8 |

As indicated in Table A, the isotactic polypropylene samples produced with indacenyl catalysts described in Examples 1-5 (Ex. 1-5, catalysts A-E) all have exceptionally high melting points (about 153.8° C. to about 160.5° C.). The melting points, activities, and in many cases the molecular weights (Mw), constitute a definitive improvement over the related asymmetric catalyst family having an indenyl ligand (Comp. 1-5, catalysts K-R). Relative to the state-of-the-art $C_2$ symmetric catalysts (Comp. 6-8, catalysts P-R), the example catalysts described in Ex. 1-5 showed improved isotactic polypropylene melting points and comparable activities. For example, the catalyst described herein (Ex. 1-5) outperforms Comp. 6 (catalyst P). Relative to conventional metallocene catalysts and catalysts systems, the data shows that the metallocene catalyst and catalyst systems described herein can produce isotactic polypropylene having comparable or higher molecular weights and higher melting points, at comparable and/or higher activities. The autoclave polymerization data for example catalyst A, example catalyst B, and example catalyst D is displayed in Table 3 (discussed further below). High catalyst activities and high $T_m$ are both maintained at the larger polymerization scale as well.

Figure 1B:
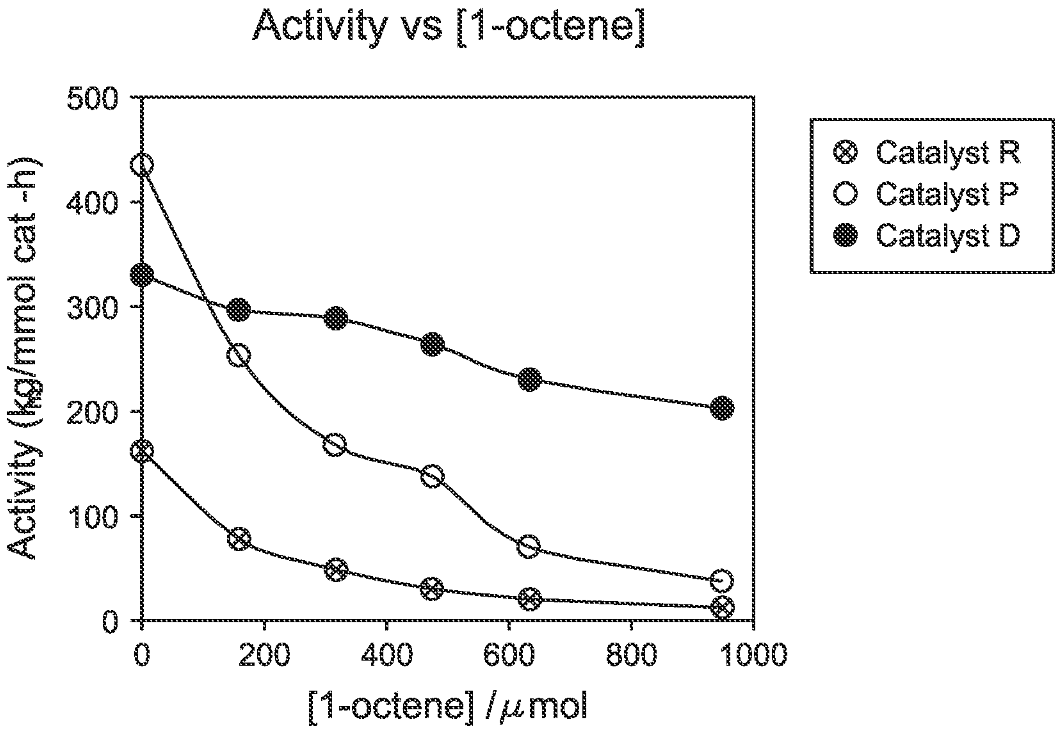
FIG. 1B (FIG. 1B) is a plot of activity (kg polymer/mmol cat. h) versus 1-octene concentration for polymers prepared with example catalysts of the present disclosure and with comparative catalysts.

FIGS. 1A and 1B illustrate that the catalyst systems of the present disclosure demonstrate improved comonomer incorporation ability while maintaining high activity relative to the comparative $C_2$ symmetric catalyst P and the asymmetric indenyl based catalyst R. The plot of FIG. 1A shows 1-octene incorporation in the range of 0 mol % to about 10 mol % of 1-octene relative to propylene. The short chain branches formed disrupt the crystallinity of homopolymer and lead to decreased melting points with the increasing comonomer concentration. However, conventional $C_2$ symmetric metallocenes experience a dramatic activity drop even at low 1-octene concentrations (FIG. 1B). For example, 1-octene concentrations as low as about 200 μmol (1.6 mol % relative to propylene) result in about a 50% decrease in activity for both the comparative catalyst P and comparative catalyst R. In contrast, only a very slight activity drop (about 2%) is observed for the example catalyst D. Although the racemic catalyst R has a higher activity under homo polypropylene conditions, the example catalyst D outperforms comparative catalyst R and the related comparative rac-metallocenes (e.g., catalyst P) in the presence of comonomers. These results demonstrate the outstanding tolerance of the example catalyst family to high alpha olefins (such as up to about $C_{20}$ alpha olefins, e.g., 1-octene), even at high concentrations. In contrast, the conventional $C_2$ symmetric catalysts showed rapid deactivation under similar conditions.

These results show that the catalyst family described herein is capable of delivering high crystalline polypropylene at high concentrations with high comonomer tolerance.

Slurry Phase—Table 2 summarizes the results for isotactic polypropylene polymerizations using example supported catalysts A-J and supported comparative catalysts P, R and S produced by slurry phase polymerization according to procedure B2 (high throughput conditions) above, Conditions for the data in Table 2 are: 4 mL of propylene, 1 mL of isohexane, 5 μmol of TIBAL, 0.45 mg of silica supported catalyst (injected from a 3 mg/mL stock slurry).

TABLE 2

Isotactic Polypropylene Polymerizations with Supported Catalysts in Slurry Process

| Run # | Cat. | # replicates | Average Activity (g/g · h) | Mw (kg/mol) Rapid GPC | $T_m$ (° C.) DSC-1 |
|---|---|---|---|---|---|
| Comp. 9 | P | 3 | 872 | 1660.3 | 148.7 |
| Comp. 10 | R | 3 | 1365 | 476.7 | 153.1 |
| Comp. 11 | S | 3 | 715 | 798.0 | 154.5 |

TABLE 2-continued

Isotactic Polypropylene Polymerizations with Supported Catalysts in Slurry Process

| Run # | Cat. | # replicates | Average Activity (g/g · h) | Mw (kg/mol) Rapid GPC | $T_m$ (° C.) DSC-1 |
|---|---|---|---|---|---|
| Ex. 6 | E | 1 | 597 | 517 | 153.0 |
| Ex. 7 | A | 2 | 1494 | 228.5 | 158.7 |
| Ex. 8 | B | 3 | 1727 | 538.3 | 156.0 |
| Ex. 9 | D | 3 | 1518 | 545.0 | 155.7 |
| Ex. 10 | C | 6 | 1262 | 575.0 | 157.0 |
| Ex. 11 | H | 4 | 2114 | 238.3 | 160.5 |
| Ex. 12 | F | 2 | 1809 | 398.0 | 157.5 |
| Ex. 13 | G | 3 | 750 | 304.7 | 155.0 |
| Ex. 14 | J | 3 | 1060 | 205.7 | 160.5 |
| Ex. 15 | I | 1 | 2054 | 376 | 156.6 |

The results presented in Table 2 suggest that novel $C_1$ symmetric catalysts A-J have comparative and in many cases higher catalyst productivities relative to $C_2$ symmetric control catalyst P, R and S in the absence of hydrogen. At the same time, example $C_1$ symmetric catalysts are capable of producing highly isotactic polypropylene with extraordinarily high melting temperatures ($T_m$). In the cases of catalysts H, J and A, very high melting points are observed ($T_m$>158° C.). For comparison, the highest melting point obtained with supported $C_2$ symmetric catalysts was 154.5 (Catalyst 5). Molecular weight capability for catalysts B, D and C is relatively high (>500 kg/mol) and comparable with the molecular weights obtained with comparative catalysts R and S.

Investigations into the production of in-reactor long chain branched (LCB) propylene copolymer, via introduction of an α,ω-diene, were also performed. The polymerization was carried out in a 2 L autoclave. The data is summarized in Table 3. Conditions for the data in Table 3 are: [Cat.]=1.5 mg, [MAO]=500 equiv., 300 mL of liquid propylene. Isohexane (800 mL) was used as solvent. Polymerization Time: 15 min. Polymerization Temp was 70° C. 2.5 mL of 1,7-octadiene (1,7-OD) was used in Ex 8.

TABLE 3

In-reactor LCB Polypropylene Polymerization in Solution Phase

| Run # | Cat. | Diene | Polymer Yield (g) | Activity (kg Polymer/mmol catalyst · h) | Mw (kg/mol) (GPC-4D) | MWD ($M_w/M_n$) | $T_m$, ° C. (DSC-2) | $g'_{vis}$ (GPC-4D) |
|---|---|---|---|---|---|---|---|---|
| Ex. 16 | A | — | 140.1 | 223.50 | 118 | 2.1 | 159.1 | — |
| Ex. 17 | B | — | 134.8 | 237.58 | 108 | 2.3 | 155.8 | 0.975 |
| Ex. 18 | B | 1,7-OD | 152.2 | 268.24 | 347 | 17.2 | 148.4 | 0.508 |
| Ex. 19 | D | — | 57.7 | 98.78 | 145 | 2.1 | 158.9 | — |

As indicated in Table 3, all catalysts maintained good activity under the described conditions. The homopolymers produced had high melting points (from about 155.8° C. to about 159.1° C.) and molecular weights of from about 108 kg/mol to about 145 kg/mol. Introduction of 1,7-octadiene did not lower the activity; however, it resulted in production of a long chain branched polymer with a molecular weight of about 347 kg/mol and a MWD of about 17.2. The $T_m$ was lowered to about 148.4° C., which may be due to primary insertion of 1,7-octediene to yield a random propylene/diene-copolymer with an unreacted pendant olefin. Similar to that described in the results related to 1-octene incorporation, the presence of the formed short chain branch with diene may lower the crystallinity of the sample. The examples demonstrate that the catalyst systems of the present disclosure produce a LCB propylene copolymer by in-reactor diene incorporation. Using this catalyst family, therefore, can enable the elimination of post-polymerization processing operations.

Figure 2A:
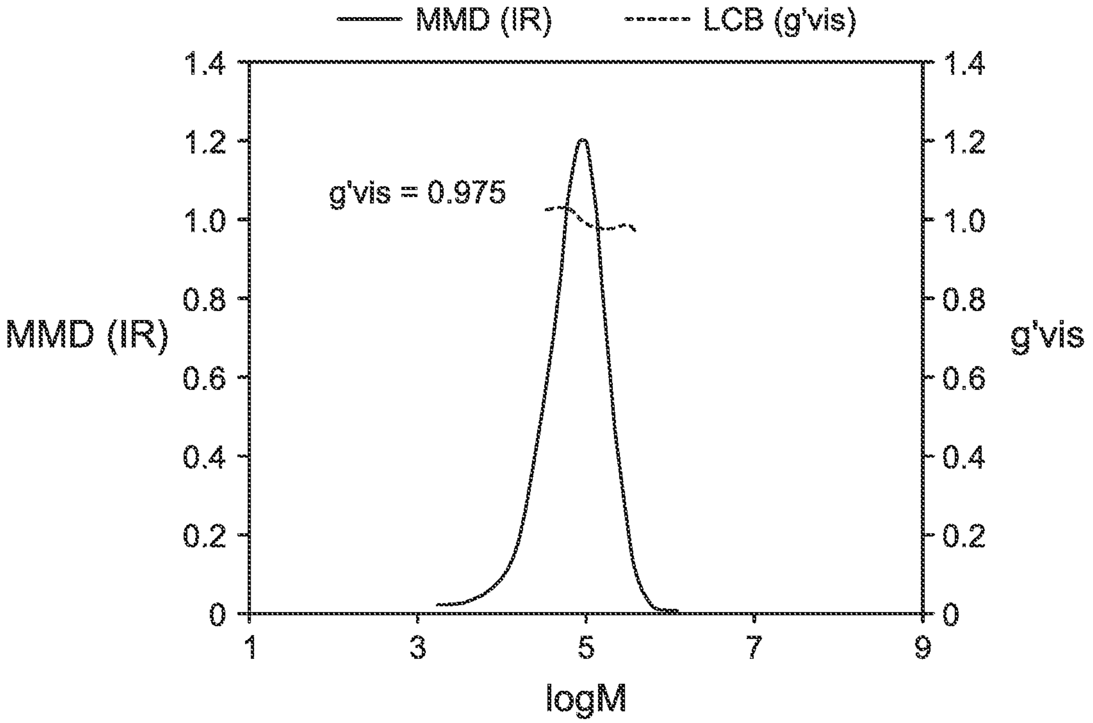
FIG. 2A (FIG. 2A) is a GPC-4D plot for an example homopolymer made using an example catalyst of the present disclosure.
Figure 2B:
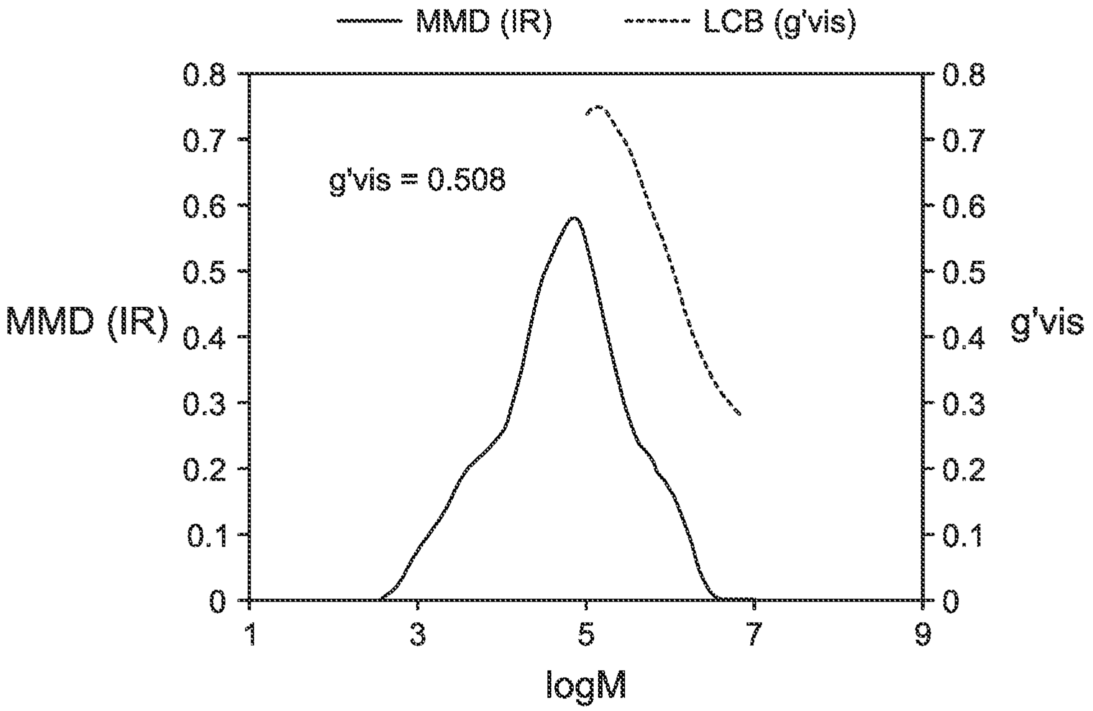
FIG. 2B (FIG. 2B) is a GPC-4D plot for an example long chain branched propylene/1,7-octadiene copolymer made using an example catalyst of the present disclosure.

The GPC traces for the propylene homopolymer (Example 17) and the long chain branched propylene/1,7-octadiene copolymer (Example 18) are shown in FIG. 2A and FIG. 2B, respectively. Evident by the decreasing $g'_{vis}$ value, the presence of long chain branches is confirmed in the GPC-4D trace of long chain branched propylene copolymer sample of FIG. 2B. It is important to note that the GPC sample recovery was 77%, which is an indication of insolubles/gels present in the sample. Reduction of diene concentration would reduce the formation of insolubles.

Further investigations into the production of in-reactor long chain branched propylene copolymer, via introduction of a suitable α,ω-diene, were also performed via high throughput conditions according to procedure B2 above. The data is summarized in Table 4. Conditions for the data in Table 4 are: 0.45 mg of supported catalyst, 1 mL of propylene, 4 mL of isohexane at 70° C., branching index, $g'_{vis}$, was obtained from GPC-4D.

TABLE 4A

In-reactor LCB Polypropylene Slurry Polymerization (High Throughput Conditions)

| Run # | Cat. | Diene (ppm) | Yield (mg) | Tm, ° C. (DSC-1) | Mw (kg/mol) (Rapid CPC) | MWD ($M_w/M_n$) | $g'_{vis}$ (GPC-4D) |
|---|---|---|---|---|---|---|---|
| Ex. 20 | B | 0 | 53.8 | 149.7 | 284 | 2.3 | — |
| Ex. 21 | B | 820 | 58.2 | 148.7 | 474 | 3.5 | 0.704 |
| Ex. 22 | B | 1640 | 105.4 | 148.0 | 372 | 3.0 | 0.765 |
| Ex. 23 | C | 0 | 64.5 | 150.7 | 300 | 2.8 | — |
| Ex. 24 | C | 820 | 62.4 | 149.9 | 417 | 3.0 | 0.738 |
| Ex. 25 | D | 0 | 75.1 | 148.8 | 301 | 2.8 | — |
| Ex. 26 | D | 820 | 111.4 | 150.8 | 417 | 3.2 | 0.704 |
| Ex. 27 | D | 1640 | 73.7 | 149.7 | 432 | 4.0 | 0.640 |

According to the data represented in Table 4A, propylene homopolymer examples (Examples 20, 23, and 25) prepared without diene have a lower $M_w$ compared to the examples prepared with diene (Examples 21, 22, 24, 26, and 27). At concentrations such as less than 1,700 ppm relative to propylene, a very minor drop in polymer crystallinity is observed. In addition, $g'_{vis}$ values for all polymers prepared at diene levels of from about ppm 800 to about 1,700 ppm indicate the presence of long chain branching.

Figure 3:
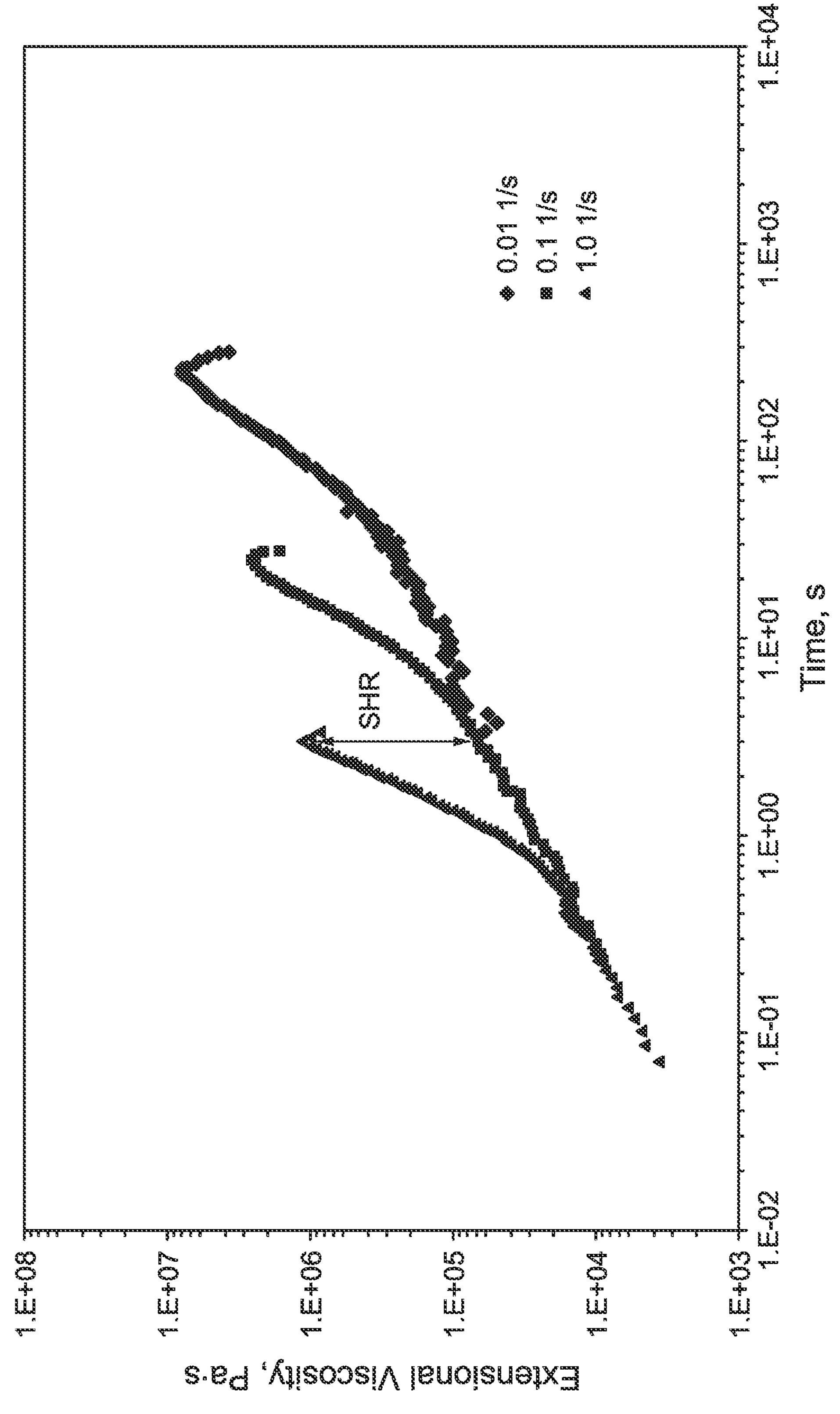
FIG. 3 (FIG. 3) is extensional rheology data for an example long chain branched propylene/1,7-octadiene copolymer made using an example catalyst of the present disclosure.
Figure 4A:
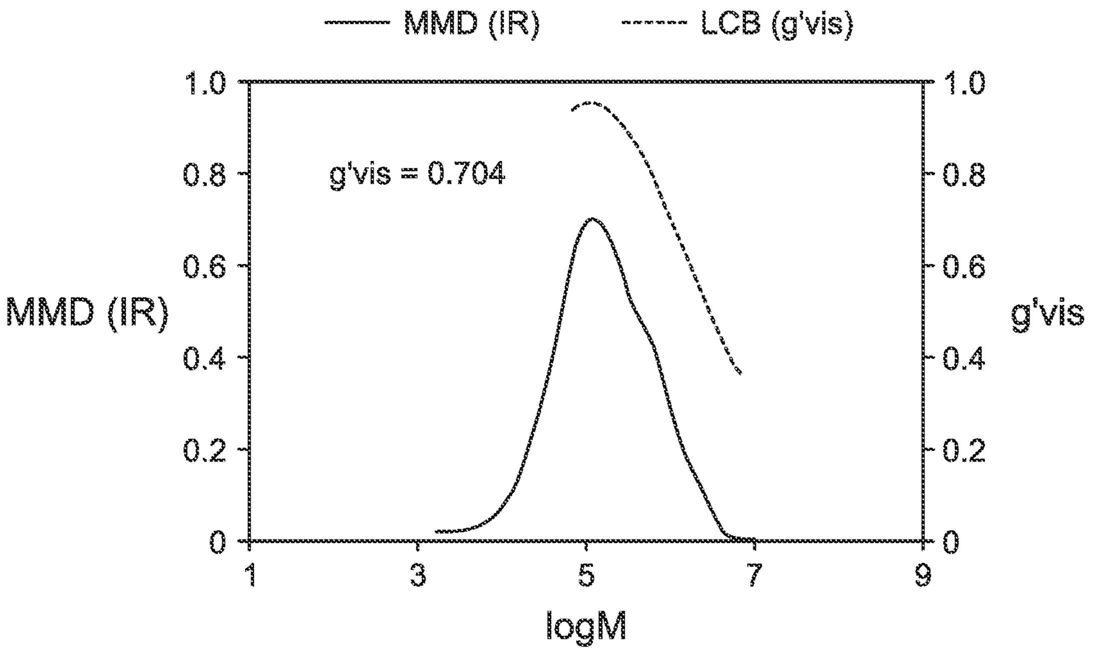
FIG. 4A (FIG. 4A) is a GPC-4D plot for an example long chain branched propylene/1,7-octadiene copolymer using an example catalyst of the present disclosure.
Figure 4B:
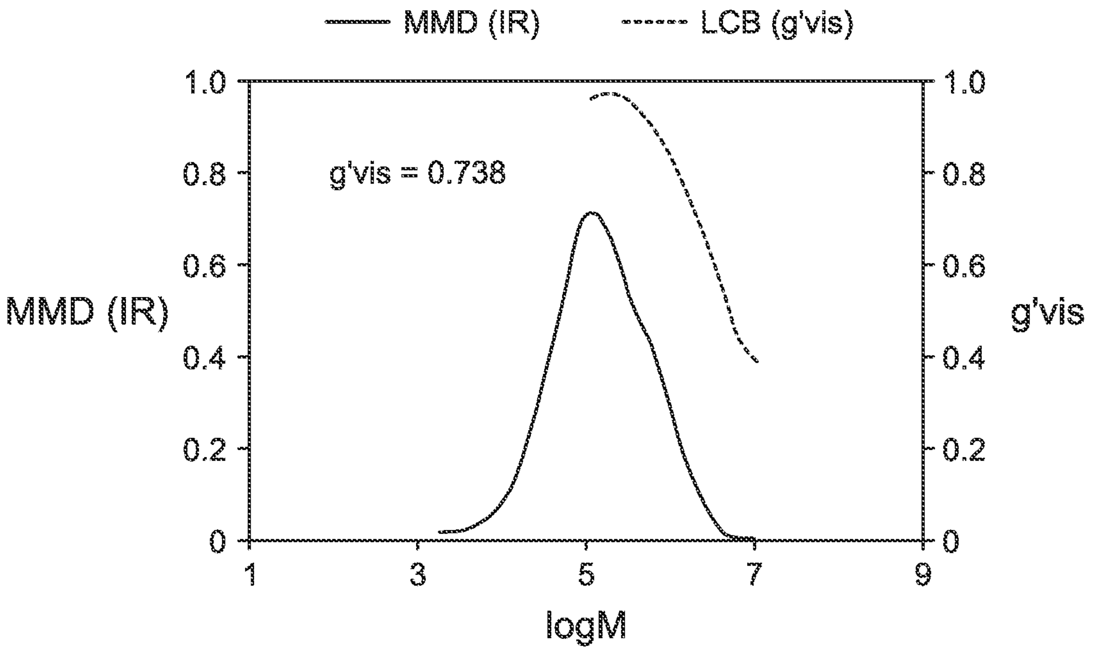
FIG. 4B (FIG. 4B) is a GPC-4D plot for an example long chain branched propylene/1,7-octadiene copolymer made using an example catalyst of the present disclosure.
Figure 4C:
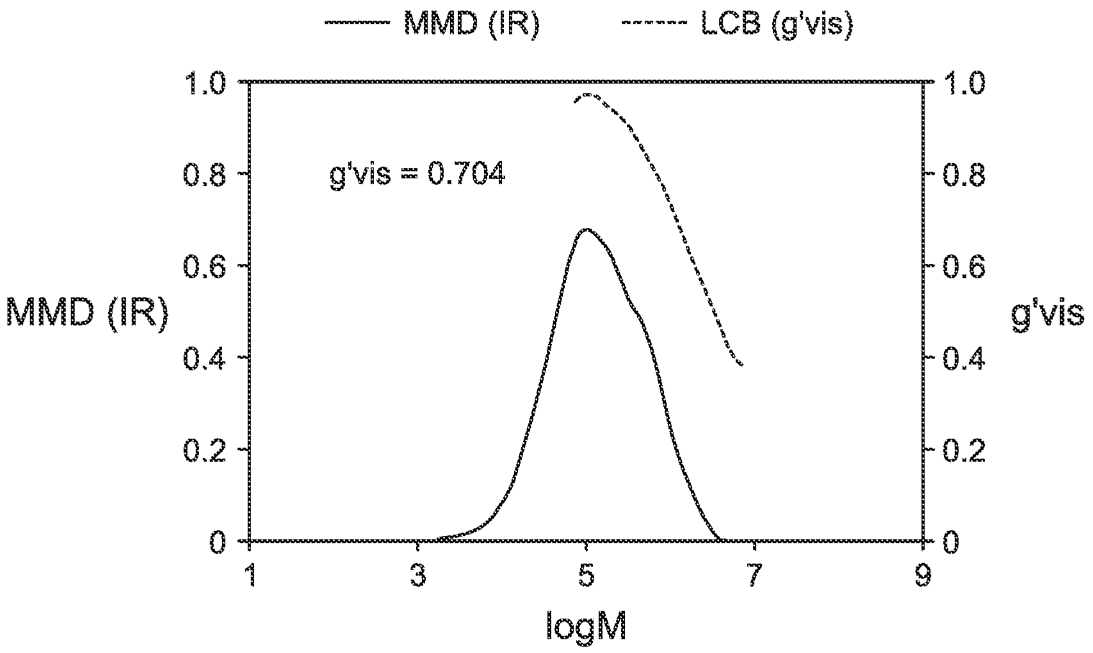
FIG. 4C (FIG. 4C) is GPC-4D plot for an example long chain branched propylene/1,7-octadiene copolymer made using an example catalyst of the present disclosure.
Figure 4D:
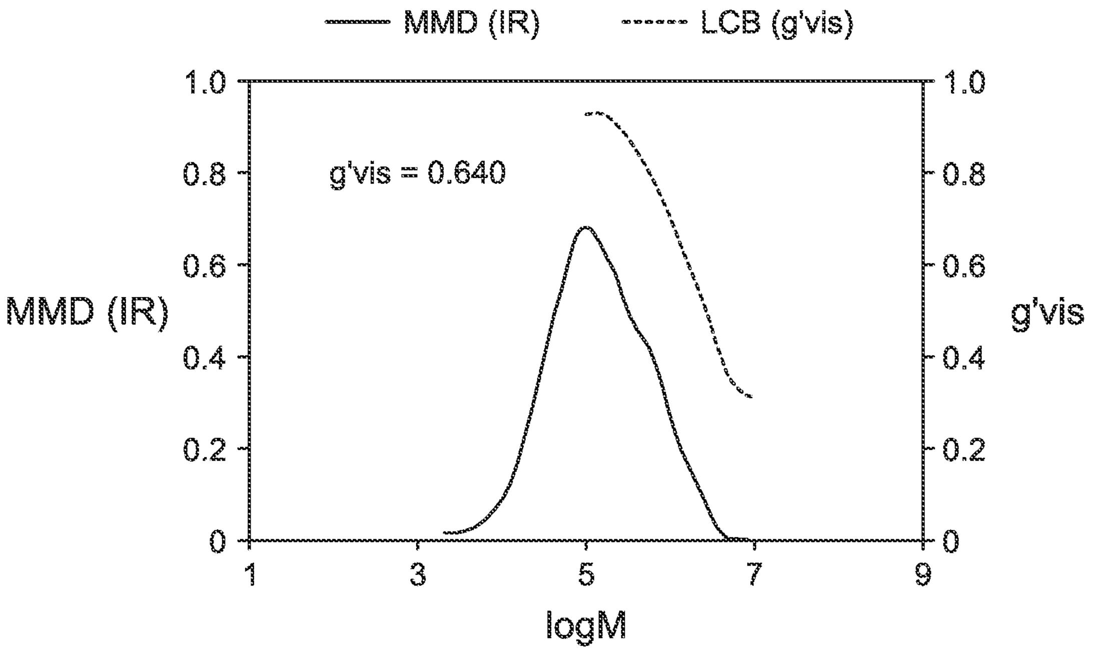
FIG. 4D (FIG. 4D) is GPC-4D plot for an example long chain branched propylene/1,7-octadiene copolymer made using an example catalyst of the present disclosure.

FIG. 3 shows the extensional rheology (SER) data for an example long chain branched propylene/1,7-octadiene copolymer, Example 18. The SER data was recorded at 3 Hencky strain rates: 0.01 $^{s-1}$, $0.1^{s-1}$, and $1.0^{s-1}$. At each frequency rate, the SER data indicates excellent strain hardening behavior of the copolymer example relative to homopolymer examples which is a good indication of long-chain branching. A ratio between extensional viscosities at a Hencky strain rate of 1.0 $s^{-1}$ at t=2.5 $s^{-1}$ and an extensional viscosity at a Hencky strain rate of 0.1 $s^{-1}$ at t=2.5 s yields a strain hardening ratio (SHR) of about 25 or less (such as 1 to 25).

FIGS. 4A-4D are GPC-4D plots for example long chain branched propylene/1,7-octadiene copolymers made in Examples 21, 24, 26, and 27.

A 1 L autoclave reactor equipped with a mechanical stirrer was used for polymer preparation. Prior to the run, the reactor was placed under nitrogen purge while maintaining 90° C. temperature for 30 minutes. Upon cooling back to ambient temperature, propylene feed (500 mL), scavenger (0.2 mL of 1M TIBAL, triisobutylaluminum) and optionally hydrogen (charged from a 25 mL bomb at a desired pressure) were introduced to the reactor and were allowed to mix for 5 minutes. Desired amount of supported catalyst (typically 12.5-25.0 mg) was then introduced to the reactor by flushing the pre-determined amount of catalyst slurry (5 wt % in mineral oil) from a catalyst tube with 100 mL of liquid propylene. The reactor was kept for 5 minutes at room temperature (pre-poly stage), before raising the temperature to 70° C. The reaction was allowed to proceed at that temperature for a desired time period (typically 15-30 min). After the given time, the temperature was reduced to 25°, the excess propylene was vented off and the polymer granules were collected, and dried under vacuum at 60° C. overnight.

The data for single stage polymerization with supported catalysts is described in Table 4B.

with increased $M_w$ capability and much improved polymer crystallinity ($T_m$≈152° C. for catalyst N, and ≈159° C. for catalyst D). At the same time, samples produced with catalyst D showed higher branching under identical conditions (Ex 29-31 vs Comp 12-14), as judged by branching index $g'_{vis}$. Control of diene concentration in the feed is useful to avoid the formation of insolubles. In the case of catalyst D, a wide composition range (including $M_w$, polydispersity and branch content) can be tuned by control of diene content in the feed.

Table 5 below shows the dependence of melting temperature ($T_m$) and crystallization temperature ($T_c$). According to Table 5, $T_m$ and $T_c$ show an inverse relationship at increasing diene concentrations. The presence of long chain branches results in increasing crystallization temperature. The data in Table 5 was taken from example propylene homopolymers and copolymers made using example catalysts described herein under high throughput conditions. The conditions at which those polymers were made are: 0.45 mg of supported catalyst A, 1 mL of propylene, 4 mL of isohexane, at 60° C.

TABLE 5

Dependence of $T_m$ and $T_c$ on Diene Concentration

| Run # | Diene (wt %) | $T_m$ (° C.) (DSC-1) | $T_c$ (° C.) (DSC-1) |
|---|---|---|---|
| Ex. 36 | 0 | 154.6 | 112.7 |
| Ex. 37 | 0.9 | 155.1 | 112.3 |
| Ex. 38 | 1.9 | 153.5 | 118.1 |
| Ex. 39 | 2.8 | 152.5 | 124.5 |
| Ex. 40 | 3.7 | 149.9 | 123.2 |
| Ex. 41 | 5.5 | 149.3 | 123.2 |

TABLE 4B

Single stage polymerization with supported catalyst according to B1b procedure above

| Run # | Cat. | Cat. (mg) | 17-octadiene (µL) | Yield (g) | Activity (g/g/hr) | Mn (g/mol) GPC-4D | Mw (g/mol) GPC-4D | Mz (g/mol) GPC-4D | MWD (Mw/Mn) | g'vis (GPC-4D) | Recovery (%)* | Tm (° C.) DSC-2 | Tc (° C.) DSC-2 |
|---|---|---|---|---|---|---|---|---|---|---|---|---|---|
| Ex. 28 | D | 25.0 | 0 | 131.4 | 20,831 | 74,893 | 245,082 | 443,868 | 3.27 | 0.977 | 100.0 | 158.3 | 113.2 |
| Ex. 29 | D | 12.5 | 50 | 52.8 | 16,887 | 45,874 | 166,079 | 361,774 | 3.62 | 0.924 | 100.0 | 157.6 | 111.6 |
| Ex. 30 | D | 12.5 | 100 | 47.7 | 15,325 | 44,496 | 201,140 | 616,739 | 4.52 | 0.875 | 100.0 | 158.0 | 111.5 |
| Ex. 31 | D | 12.5 | 150 | 60.1 | 18,796 | 49,970 | 278,476 | 1,289,154 | 5.57 | 0.815 | 100.0 | 159.2 | 115.2 |
| Ex. 32 | D | 12.5 | 250 | 59.1 | 19,168 | 54,158 | 381,861 | 2,076,354 | 7.05 | 0.721 | 92.8 | 159.1 | 118.5 |
| Ex. 33 | D | 12.5 | 350 | 58.3 | 18,383 | 42,195 | 265,570 | 1,619,291 | 6.29 | 0.778 | 73.7 | 159.1 | 119.8 |
| Ex. 34 | D | 12.5 | 500 | 65.3 | 20,821 | 40,940 | 203,265 | 1,326,925 | 4.96 | 0.794 | 58.7 | 159.2 | 124.9 |
| Ex. 35 | D | 12.5 | 1,000 | 62.6 | 20,549 | 21,650 | 76,193 | 477,965 | 3.51 | 0.813 | 26.3 | 157.2 | 127.6 |
| Comp. 12 | N | 12.5 | 50 | 14.7 | 4,753 | 35,168 | 104,462 | 214,528 | 2.97 | 0.929 | 100.0 | 152.0 | 110.0 |
| Comp. 13 | N | 25.0 | 100 | 35.9 | 5,661 | 39,920 | 133,655 | 329,172 | 3.35 | 0.908 | 100.0 | 151.8 | 109.8 |
| Comp. 14 | N | 25.0 | 150 | 31.3 | 4,970 | 38,387 | 151,809 | 534,321 | 3.95 | 0.878 | 100.0 | 152.3 | 109.7 |

*This is a GPC-4D mass recovery, which is used as an estimate for gel content. This is the reason why samples that have lower GPC recovery also have generally lower molecular weights (Ex 33, 34, 35). This is due to the inability of GPC to capture higher molecular weight species, which become too insoluble to be analyzed.

Relative to comparative catalyst N (Comp 12-14), which is based on indenyl ligand, the inventive catalyst D (based on tetrahydroindacene, Ex. 28-35) shows dramatic improvements in all 3 aspects of polymer properties. Catalyst D produced long chain branched polypropylenes at roughly 4-fold higher activities (≈20,000 vs ≈5,000 for catalyst N), Table 6 shows the characterization data for polymers prepared in a 2 L autoclave under dual-stage conditions ($1^{st}$ stage, no hydrogen, $2^{nd}$ stage with hydrogen and 1,7-octadiene). These data suggest an effective way of controlling melt-flow rate (MFR) by introducing 1,7-octadiene, while simultaneously improving branching.

TABLE 6

| Characterization Data for Polymers Prepared in a 2 L autoclave | | | | | | | | | |
|---|---|---|---|---|---|---|---|---|---|
| Run # | Cat. | diene (mL) | Productivity (g/g · h) | MFR* (g/10 min) | $M_n$ (g/mol) GPC-4D | $M_w$ (g/mol) GPC-4D | $M_z$ (g/mol) GPC-4D | $g'_{vis}$ GPC-4D | Tm (° C.) DSC-2 |
| Ex. 42 | C | 0 | 5970 | 5.92 | 98060 | 358440 | 782304 | 1.002 | 158.4 |
| Ex. 43 | C | 0.125 | 3550 | 2.73 | 109818 | 428224 | 1005253 | 0.958 | — |
| Ex. 44 | D | 0.25 | 3563 | 1.32 | 170785 | 471384 | 904712 | 0.971 | 155.6 |
| Ex. 45 | D | 0.5 | 2705 | 0.98 | 175893 | 524805 | 1084513 | 0.944 | 156.9 |

*Melt Flow Rate determined by ASTM D1238 (230° C., 2.16 kg)

Table 7 shows a summary of Carreau-Yasuda parameters obtained by fitting shear rheology data of the selected polymers prepared in a 2 L autoclave under dual-stage conditions. The data are measured at 190° C. in the frequency range of from 0.1 and 628 rad/s.

TABLE 7

| Characterization data for polymers prepared in a 2 L autoclave (dual stage conditions) | | | | | | | | | | |
|---|---|---|---|---|---|---|---|---|---|---|
| | | | SAOS Parameters | | | | | | | |
| Run # | Cat. | diene (mL) | $\eta_{oCY}$, (Pa · s) | $\eta_{\infty CY}$ (Pa · s) | $k_{CY}$ | $n_{CY}$ | $a_{CY}$ | η(100 rad/s) (Pa · s) | η(0.1 rad/s) (Pa · s) | STR |
| Ex. 42 | C | 0 | 15,949.1 | 31.9 | 2.9e−4 | −1.1 | 0.2 | 776.23 | 8116.37 | 0.0956 |
| Ex. 43 | C | 0.125 | 258,468 | −33.4 | 1.2e−4 | −0.8 | 0.14 | 1022.89 | 24863.3 | 0.0411 |
| Ex. 44 | D | 0.25 | 2,936,990 | −115.1 | 2.6e−3 | −0.4 | 0.11 | 1392.32 | 50643.5 | 0.0274 |
| Ex. 45 | D | 0.5 | 881,641 | −132.6 | 16.3 | 0.23 | 0.2 | 1327.96 | 57210.3 | 0.0232 |

Carreau-Yasuda model fit parameters (indiated by subscript CY in table 7) are obtained by fitting complex viscosity as function of angular frequency curves in the range of frequencies between 0.1 rad and 628 rad/s. The high quality of the fits is indicated by high values of $R^2$ (>0.9999).

TABLE 8

| SAOS data for highly branched samples (Run #30-32) prepared with catalyst D | | | | | |
|---|---|---|---|---|---|
| Run # | Cat. | Diene (mL) | η (100 rad/s) | η (0.1 rad/s) | STR |
| Ex. 28 | D | 0 | 572.66 | 4124.2 | 0.1389 |
| Ex. 31 | D | 0.15 | 241.66 | 2001.69 | 0.1207 |
| Ex. 32 | D | 0.25 | 284.77 | 11155.5 | 0.0255 |
| Ex. 33 | D | 0.35 | 234.87 | 31646.1 | 0.0074 |

Figure 5:
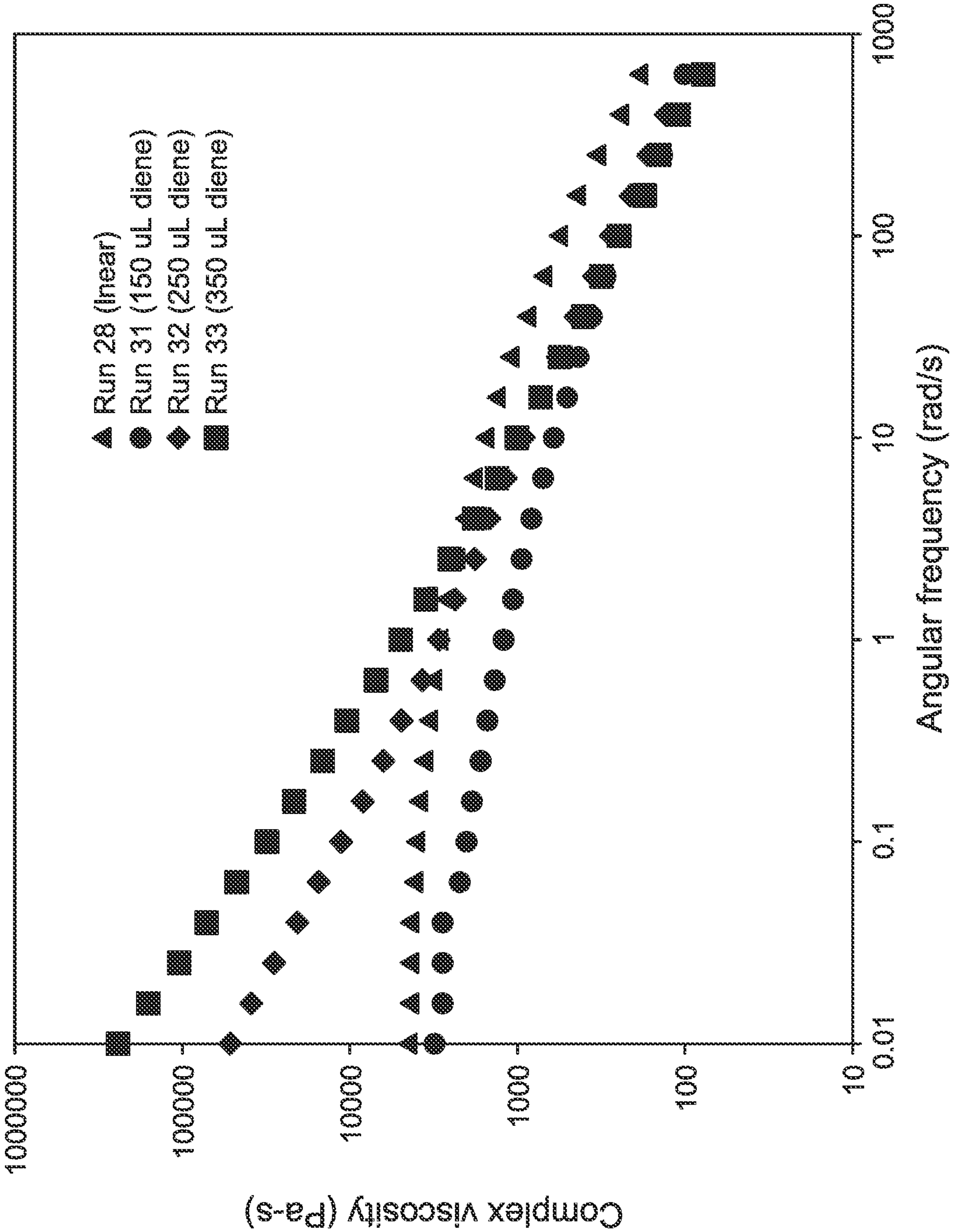
FIG. 5 (FIG. 5) is an overlay of viscosity curves obtained from small angle oscillatory shear (SAOS) of polymer samples prepared using example catalyst in the present disclosure.

Small angle oscillatory shear (SAOS) data indicates improved levels of shear-thinning behavior in samples that can be quantified by shear-thinning ratio (STR), which is defined as a ratio between complex viscosity at 100 rad/s ($\eta_{100\ rad/s}$) and 0.1 rad/s ($\eta_{0.1\ rad/s}$). In all cases diene modified samples demonstrate improved shear thinning (Runs 31-33) relative to linear sample (Run 28), as indicated by decreasing values of STR. The overlay of viscosity curves for Runs #28, 31, 32 and 33 is displayed in FIG. 5.

TABLE 9

| Extensional rheology (SER) data comparison | | | |
|---|---|---|---|
| Run # | Hencky strain rates ($s^{-1}$) | t (s) | Strain Hardening Ratio |
| Ex. 28 | 1 and 0.1 | 2.5 | 1.12 |
| | 10 and 1.0 | 0.25 | 1.13 |
| Ex. 31 | 1 and 0.1 | 2.5 | 3.71 |
| | 10 and 1.0 | 0.25 | 1.95 |

TABLE 9-continued

| Extensional rheology (SER) data comparison | | | |
|---|---|---|---|
| Run # | Hencky strain rates ($s^{-1}$) | t (s) | Strain Hardening Ratio |
| Ex. 32 | 1 and 0.1 | 2.5 | 16.02 |
| | 10 and 1.0 | 0.25 | 6.11 |

Extensional rheology of samples containing diene (Run #31 and Run #32), show improved levels of strain hardening compared to the linear analog described in Run #28. The strain hardening ratio (SHR) is defined as a ratio of extensional viscosities at a first Hencky strain rate divided by the extensional viscosity at a second lower Hencky strain rate at the equal time (t). For example:

A ratio between extensional viscosities at a strain rate of 1.0 $s^{-1}$ at t=2.5 s and an extensional viscosity at a strain rate of 0.1 $s^{-1}$ at t=2.5 s defines a strain hardening ratio (SHR) at a Hencky strain rate of 1.0.

A ratio between extensional viscosities at a strain rate of 10 $s^{-1}$ at t=0.25 s and an extensional viscosity at a strain rate of 1.0 $s^{-1}$ at t=0.25 s defines a strain hardening ratio (SHR) at a Hencky strain rate of 10.

Figure 6:
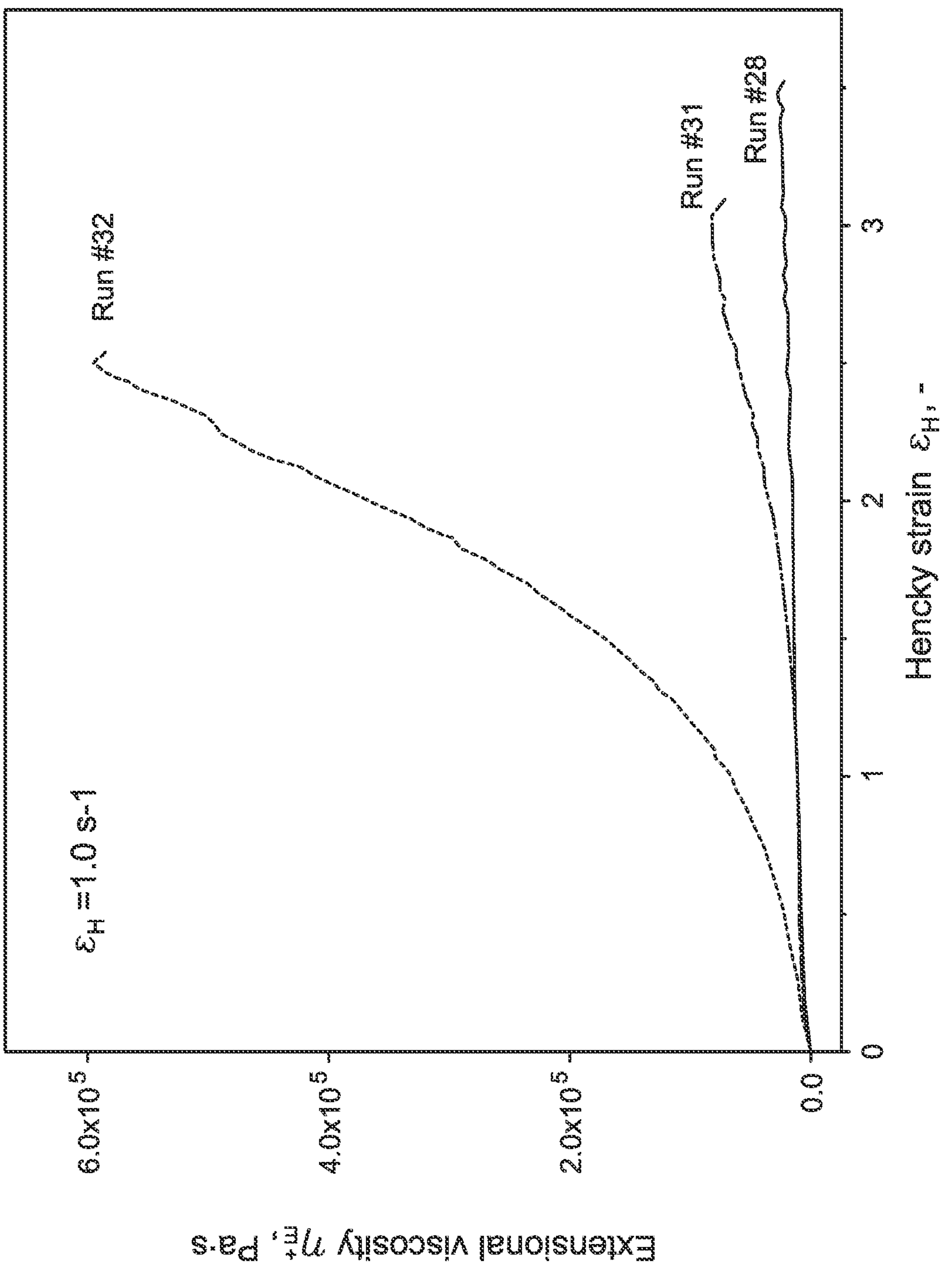
FIG. 6 (FIG. 6) is extensional rheology overlay for linear and long chain branched polypropylene prepared with an example catalysts of the present disclosure.

In all cases, samples with LCB (Run #31 and Run #32) show higher strain hardening ratios relative to linear sample without any LCBs (Run #28). The overlay of extensional viscosity curves for Runs #28, 31 and 32 is displayed in FIG. 6.

TABLE 10

| Crystallization half lives $t_{1/2}$ (s) of samples measured at indicated crystallization temperature $T_c$ | | | | | | | | | | |
|---|---|---|---|---|---|---|---|---|---|---|
| Run # | Diene, μL | $T_c$ = 112° C. | $T_c$ = 114.5° C. | $T_c$ = 117° C. | $T_c$ = 119.5° C. | $T_c$ = 122° C. | $T_c$ = 124.5° C. | $T_c$ = 127° C. | $T_c$ = 129.5° C. | $T_c$ = 132° C. |
| Ex. 28 | 0 | 55.3 | 67.6 | 97.5 | 160 | 262 | 445 | 793 | 1468 | 2831 |
| Ex. 29 | 50 | 53.6 | 60.4 | 80.2 | 114 | 179 | 314 | 580 | 1098 | 2137 |
| Ex. 30 | 100 | 53.4 | 61.3 | 76.2 | 105 | 160 | 261 | 457 | 862 | 1650 |
| Ex. 31 | 150 | 47.7 | 52.4 | 59.9 | 74.4 | 106 | 163 | 262 | 459 | 809 |
| Ex. 32 | 250 | 42.3 | 43.2 | 44.8 | 47.2 | 51.7 | 64.9 | 95 | 140 | 204 |
| Ex. 33 | 350 | 39.1 | 40.8 | 43 | 46.1 | 49.1 | 56.6 | 70.6 | 99.7 | 147 |

TABLE 11

| Rates of crystalization ($s^{-1}$) measured at indicated crystallization temperature $T_c$ | | | | | | | | | | |
|---|---|---|---|---|---|---|---|---|---|---|
| Run # | Diene, μL | $T_c$ = 112° C. | $T_c$ = 114.5° C. | $T_c$ = 117° C. | $T_c$ = 119.5° C. | $T_c$ = 122° C. | $T_c$ = 124.5° C. | $T_c$ = 127° C. | $T_c$ = 129.5° C. | $T_c$ = 132° C. |
| Ex. 28 | 0 | $1.81 \times 10^{-2}$ | $1.48 \times 10^{-2}$ | $1.03 \times 10^{-2}$ | $6.23 \times 10^{-3}$ | $3.82 \times 10^{-3}$ | $2.25 \times 10^{-3}$ | $1.26 \times 10^{-3}$ | $6.81 \times 10^{-4}$ | $3.53 \times 10^{-4}$ |
| Ex. 29 | 50 | $1.87 \times 10^{-2}$ | $1.66 \times 10^{-2}$ | $1.25 \times 10^{-2}$ | $8.77 \times 10^{-3}$ | $5.59 \times 10^{-3}$ | $3.19 \times 10^{-3}$ | $1.72 \times 10^{-3}$ | $9.10 \times 10^{-4}$ | $4.68 \times 10^{-4}$ |
| Ex. 30 | 100 | $1.87 \times 10^{-2}$ | $1.63 \times 10^{-2}$ | $1.31 \times 10^{-2}$ | $9.54 \times 10^{-3}$ | $6.27 \times 10^{-3}$ | $3.83 \times 10^{-3}$ | $2.19 \times 10^{-3}$ | $1.16 \times 10^{-3}$ | $6.06 \times 10^{-4}$ |
| Ex. 31 | 150 | $2.10 \times 10^{-2}$ | $1.91 \times 10^{-2}$ | $1.67 \times 10^{-2}$ | $1.34 \times 10^{-2}$ | $9.43 \times 10^{-3}$ | $6.13 \times 10^{-3}$ | $3.82 \times 10^{-3}$ | $2.18 \times 10^{-3}$ | $1.24 \times 10^{-3}$ |
| Ex. 32 | 250 | $2.36 \times 10^{-2}$ | $2.31 \times 10^{-2}$ | $2.23 \times 10^{-2}$ | $2.12 \times 10^{-2}$ | $1.93 \times 10^{-2}$ | $1.54 \times 10^{-2}$ | $1.05 \times 10^{-2}$ | $7.14 \times 10^{-3}$ | $4.90 \times 10^{-3}$ |
| Ex. 33 | 350 | $2.56 \times 10^{-2}$ | $2.45 \times 10^{-2}$ | $2.33 \times 10^{-2}$ | $2.17 \times 10^{-2}$ | $2.04 \times 10^{-2}$ | $1.77 \times 10^{-2}$ | $1.42 \times 10^{-2}$ | $1.00 \times 10^{-2}$ | $6.83 \times 10^{-3}$ |

Figure 7:
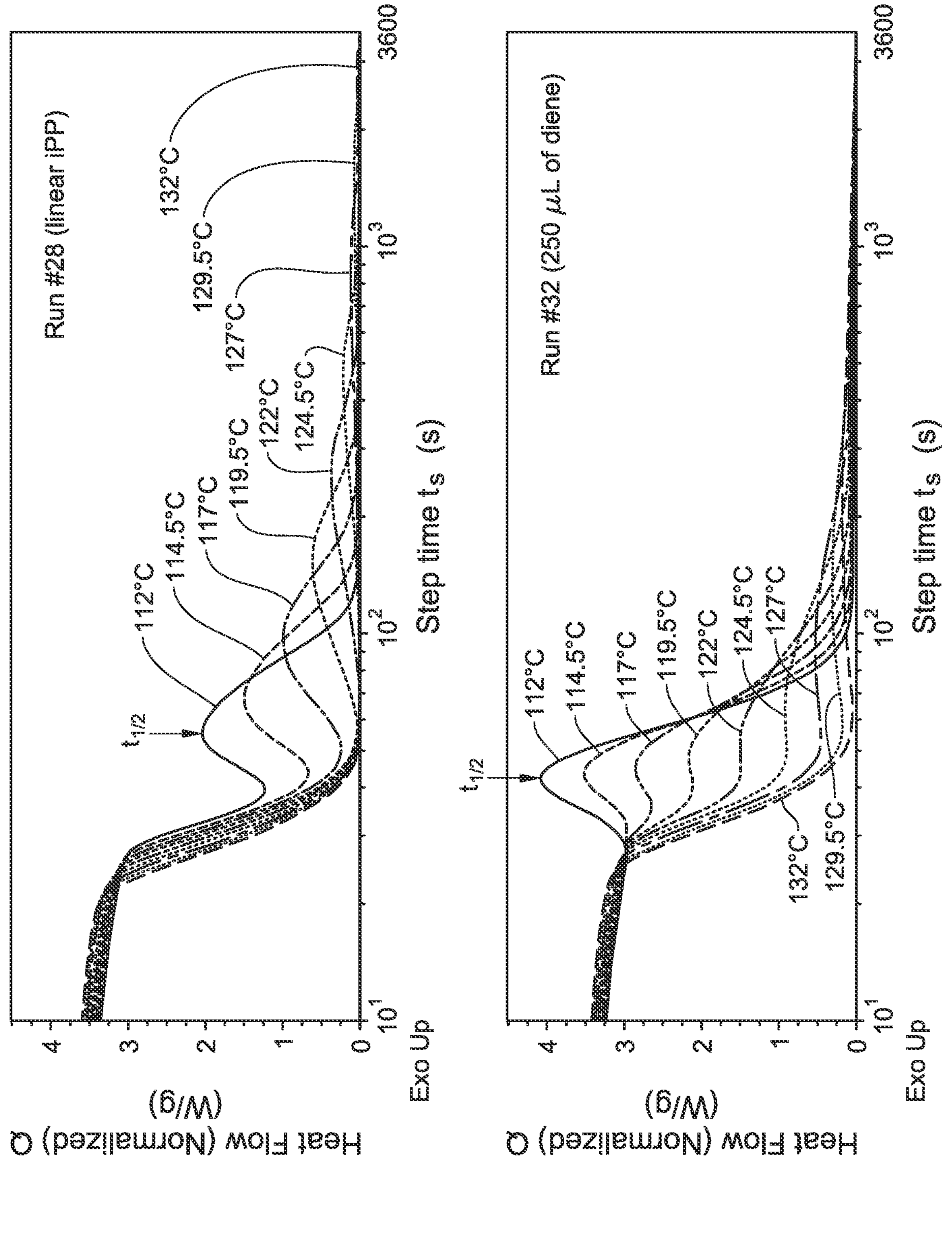
FIG. 7 (FIG. 7) is an isothermal crystallization exotherms of linear polypropylene (A) and propylene-octadiene copolymer (B) prepared with an example catalyst of the present disclosure.

Tables 9 and 10 display data regarding crystallization half lives ($t_{1/2}$) and crystallization rates (represented as reciprocal of $t_{1/2}$) of linear iPP sample (run 28) and LCB-PP samples (runs 29-33). The data suggest a significantly higher crystallization rates in samples containing long chain branches (runs 29-33). Relative to linear sample, about 1.4 to about 20 fold increase in crystallization rates is observed across the temperature range from about 112° C. to about 132° C. FIG. 7 displays isothermal crystallization curves, as measured by differential scanning calorimetry (DSC).

E. Test Methods

E1. Gel Permeation Chromatography (Rapid-GPC): To determine various molecular weight related values by GPC, high temperature size 5 exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388, each of which is fully incorporated herein by reference for US purposes. This apparatus has a series of three 30 cm×7.5 mm linear columns, each containing PLgel 10 μm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector (as shown by the examples in Table 3) or Polymer Char IR4 detector. The molecular weights presented are relative to linear polystyrene standards and are uncorrected.

Gel Permeation Chromatography (GPC-4D): Unless otherwise indicated, the distribution and the moments of molecular weight (Mw, Mn, Mz, Mw/Mn, etc.), the comonomer content, and the branching index (g') were determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 $cm^{-1}$ to about 3,000 $cm^{-1}$ (representing saturated C—H stretching vibration), an 18-angle light scattering detector and a viscometer. Three Agilent PLgel 10-μm Mixed-B LS columns are used to provide polymer separation. Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 μL. The whole system including transfer lines, columns, and detectors can be contained in an oven maintained at ~145° C. A given amount of sample can be weighed and sealed in a standard vial with ~10 μL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IR5 broadband signal, I, using the equation: c=αJ, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha + 1} + \frac{\alpha_{PS} + 1}{\alpha + 1}\log M_{PS}$$

where the variables with subscript "PS" stand for polystyrene while those without a subscript are for the test samples. In this method, $\alpha_{PS}$=0.67 and $K_{PS}$=0.000175, a and K for other materials are as calculated as described in the published in literature (e.g., Sun, T. et al. (2001) *Macromolecules*, v. 34, pg. 6812), except that for purposes of this present disclosure and claims thereto, α=0.705 and K=0.0000229 for ethylene-propylene copolymers and ethylene-propylene-diene terpolymers, α=0.695 and K=0.000579 for linear ethylene polymers, α=0.705 and K=0.0002288 for linear propylene polymers, and α=0.695 and K=0.000181 for linear butene polymers. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000 TC) as a function of molecular weight. The short-chain branch (SCB) content per 1,000 TC (SCB/1000 TC) is then computed as a function of molecular weight by applying a chain-end correction to the CH3/1000 TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2=f*\text{SCB/1000 TC}$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of CH}_3\text{ signal within integration limits}}{\text{Area of CH}_2\text{ signal within integration limits}}.$$

Then the same calibration of the $CH_3$ and $CH_2$ signal ratio, as mentioned previously in obtaining the CH3/1000 TC as a function of molecular weight, is applied to obtain the bulk CH3/1000 TC. A bulk methyl chain ends per 1,000 TC (bulk CH3end/1000 TC) is obtained by weight-averaging the chain-end correction over the molecular-weight range. Then $$w2b=f*\text{bulk } CH3\text{/1000 TC}$$

$$\text{bulk SCB/1000 TC} = \text{bulk } CH3\text{/1000 TC} - \text{bulk } CH3\text{end/1000 TC}$$

and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the IR5 analysis, $A_2$ is the second virial coefficient, P(θ) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and k=665 nm.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i[\eta]_i}{\sum c_i}$$

where the summations are over the chromatographic slices, i, between the integration limits. The branching index $g'_{vis}$ is defined as:

$$g'_{vis} = \frac{[\eta]_{avg}}{KM_v^{\alpha}},$$

where $M_V$ is the viscosity-average molecular weight based on molecular weights determined by LS analysis and the K and a are for the reference linear polymer, which are, for purposes of this present disclosure and claims thereto, α=0.705 and K=0.0000229 for ethylene-propylene copolymers and ethylene-propylene-diene terpolymers, α=0.695 and K=0.000579 for linear ethylene polymers, α=0.705 and K=0.0002288 for linear propylene polymers, α=0.695 and K=0.000181 for linear butene polymers. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

E2. Differential Scanning Calorimetry (DSC-1): For the high throughput samples (described in Table 2, etc.), the melting temperature ($T_m$) and crystallization temperature (Tc) were measured using Differential Scanning Calorimetry (DSC) using commercially available equipment such as a TA Instruments TA-Q200 DSC. Typically, 5 to 10 mg of molded polymer or plasticized polymer is sealed in an aluminum pan and loaded into the instrument at about room temperature. Samples were pre-annealed at about 220° C. for about 15 minutes and then allowed to cool to about room temperature overnight. The samples were then heated to about 220° C. at a heating rate of about 100° C./min., held at this temperature for at least about 5 minutes, and then cooled at a rate of about 50° C./min. to a temperature typically at least about 50° C. below the crystallization temperature. Melting points were collected during the heating period.

Differential Scanning Calorimetry (DSC-2) Peak melting point, $T_m$, described for reactor batches (also referred to as melting point) and peak crystallization temperature, $T_c$, (also referred to as crystallization temperature) are determined using the following DSC procedure. Differential scanning calorimetric (DSC-2) data can be obtained using a TA Instruments model DSC2500 machine. Samples weighing approximately 5 to 10 mg are sealed in an aluminum hermetic sample pan and loaded into the instrument at about room temperature. The DSC data are recorded by first gradually heating the sample to 220° C. at a rate of 10° C./minute in order to erase all thermal history. The sample is kept at 220° C. for 5 minutes, then cooled to −10° C. at a rate of 10° C./minute, followed by an isothermal for 5 minutes and heating to 220° C. at 10° C./minute, holding at 220° C. for 5 minutes and then cooling down to 25° C. at a rate of 10° C./minute. Both the first and second cycle thermal events were recorded. The melting and crystallization temperatures reported here were obtained during the second heating/cooling cycle unless otherwise noted. In the event of conflict between the DSC Procedure-1 and DSC procedure-2, DSC procedure-2 (DSC-2) is used.

Differential scanning calorimetry (DSC) for isothermal crystallization kinetic measurements: Isothermal DSC measurements were conducted using a DSC2500 (TA Instruments) calibrated with indium standard. Isothermal melt crystallization of the iPP samples was performed after melting at 200° C. for 5 min (to erase all the thermal history in the samples), followed by rapid cooling (at 100° C./min) to the indicated crystallization temperature, $T_c$. The exothermic heat flow was recorded at each temperature ($T_c$) as a function of time during 1 hour, which was enough time for all the samples to reach a flat base line. The crystallization half time ($t_{1/2}$) at each temperature ($T_c$) is measured as the time corresponding to the peak in the isothermal heat flow plots, and the rate of crystallization is computed as the reciprocal of $t_{1/2}$.

E3. Elongation Flow Measurements: The transient extensional viscosity was measured at 190° C. using a SER testing Platform available from Xpansion Instruments LLC, Tallmadge, Ohio, USA. The sample was prepared placing the pellets in a mold measuring approximately 50 mm×50 mm with a thickness of ~0.5 mm. The mold was pressed in a carver laboratory press with a 3 pressure stage procedure at 190° C.: The material was preheated with 0 pounds of pressure for 2 minutes, pressed at 5 k lbs of pressure for 2 minutes, then the pressure was maintained at 0 while still in the mold for 15 minutes. Samples were cut into test strips measuring between 13 and 13.4 mm in width, ~18 mm in length, and between 0.5 mm and 0.6 mm in average thickness. Note that there is variation in dimensions due to sample type. Samples were temperature equilibrated for 10-15 minutes before the test. The SER Testing Platform was used on an Advanced Rheometrics Expansion System (ΔRES-G2) from TA Instruments. The SER Testing Platform is described in U.S. Pat. Nos. 6,578,413 and 6,691,569, which are incorporated herein for reference. A general description of transient uniaxial extensional viscosity measurements is provided, for example, in "Measuring the transient extensional rheology of polyethylene melts using the SER universal testing platform", *The Society of Rheology, Inc., J. Rheol.* v. 49(3), 585-606 (2005). Strain hardening can happen when a polymer is subjected to elongational flow and the transient extensional viscosity increases with respect to the linear viscoelasticity envelop (LVE) or subjected to extensional viscosity at higher rates at Hencky strains of 1.0 or lower, where Hencky strain is calculated as product of Hencky strain rate and time. Strain hardening is observed as abrupt upswing of the extensional viscosity in the transient extensional viscosity vs. time plot. Strain hardening ratio (SHR) is used to characterize the upswing in extensional viscosity and is the ratio discussed above. Strain hardening is present in the material when the ratio is greater than 1.

E4. Small Angle Oscillatory Shear Test: Dynamic shear melt rheological data were measured with an Advanced Rheometrics Expansion System (ΔRES-G2) from TA Instruments using parallel plates (diameter=25 mm) in a dynamic mode under nitrogen atmosphere. For all experiments, the rheometer was thermally stable at 190° C. for at least 30 minutes before inserting compression-molded sample of resin onto the parallel plates. To determine the samples viscoelastic behavior, frequency sweeps in the range from 0.01 to 628 rad/s were carried out at a temperature of 190° C. under constant strain. Depending on the molecular weight and temperature, strains in the linear deformation range verified by strain sweep test were used. A nitrogen stream was circulated through the sample oven to minimize chain extension or cross-linking during the experiments. All the samples were compression molded at 190° C. A sinusoidal shear strain is applied to the material if the strain amplitude is sufficiently small the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials, $0<\delta<90$.

The shear thinning parameters of power law index, transition index, consistency, infinite-rate viscosity, and zero-shear viscosity were obtained by fitting shear rheology data of the selected polymers prepared in a 1 L and 2 L autoclave. The data are measured at 190° C. in the frequency range between 0.1 and 628 rad/s. TA Instruments Trios v3.3.1.4246 software was used. For the purpose of quantifying shear thinning behavior in materials described in this document, the shear thinning ratio (STR) is defined as a ratio between the complex viscosity (η) at 100 rad/s ($\eta_{100\ rad/s}$) and 0.1 rad/s ($\eta_{0.1\ rad/s}$).

E7. Flexural Modulus measurements (also referred to as 1% Secant flexural modulus) is measured using an ISO 37-Type 3 bar, with a crosshead speed of 1.0 mm/min and a support span of 30.0 mm using an Instron machine according to ASTM D 790 (A, 1.0 mm/min).

E8. Melt-flow rate (MFR): determined according to ASTM D1238 (230° C., 2.16 kg).

F. Example Method to Prepare the Catalyst Compounds

Scheme 1 shows a general synthetic scheme demonstrating how the catalysts are prepared. The Scheme is an exemplary, non-limiting embodiment of a method to prepare the catalyst compounds described herein.

Scheme 1

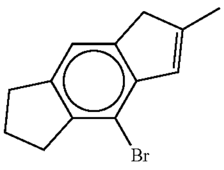

101

ArB(OH)2 or ArMgBr (1 equiv)
Pd(OAc)2 or Pd2(dba)3 (1 mol %)
SPhos (3 mol %)
NaOtBu (3 equiv)
Toluene or THF/H2O
80° C.

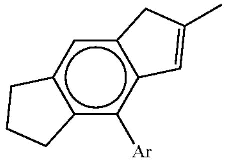

110 n-BuLi (1.1 equiv)
Et2O, -35° C.

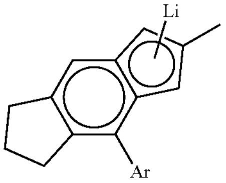

120

Me4CpSiMe2Cl
or
Me4CpSiMe2OTf
Et2O, -35° C.

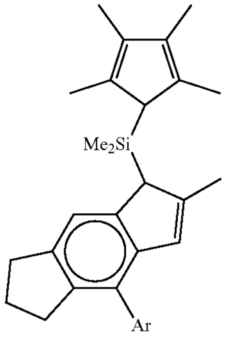

130 n-BuLi (2.15 equiv)
Et2O, -35° C.

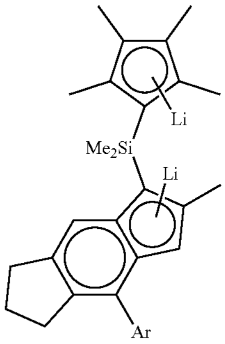

140

ZrCl4(OEt2)2
Et2O, -35° C.

-continued

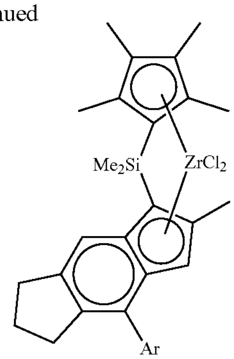

150

Ar = e.g., Ph, 2-Me—Ph, 2-Biphenyl, 2-iPr—Ph, 4-tBu—Ph, Naphtyl, Anthracenyl, 2,4,5-Me—Ph, 3,5-$CF_3$—Ph, 3,5-tBu-5-OMe—Ph.

As shown in Scheme 1, the $C_1$ symmetric catalysts (varying the aryl, "Ar", group) described herein can be prepared in five operations starting from 6-methyl-1,2,3,5-tetrahydro-8-bromo-s-indacene 101. Indacene 101 undergoes a palladium catalyzed cross-coupling with the desired aryl boronic acid ($ArB(OH)_2$) or aryl Grignard (ArMgBr) to yield the 8-aryl substituted indacene compounds 110 after a chromatographic purification. Subsequent lithiation to form lithiated ligands 120 and coupling with a silyl electrophile affords the ligand series $Me_4CpSi(Me_2)$-6-Me-8-Ar-1,2,3,5-tetrahydro-s-indacenes 130. Dilithiation of these complexes to form dilithium species 140 and subsequent metalation with zirconium affords desired metallocenes 150 in 40-70% yield. Detailed structures of these metallocenes as well as the comparative example metallocenes are provided above.

General procedure to form indacene compound 105 using aryl Grignards. 6-methyl-1,2,3,5-tetrahydro-8-bromo-s-indacene (1 equiv.) was dissolved in 30 mL of toluene in a 100 mL round bottom flask. In another vial palladium(II)acetate ($Pd(OAc)_2$, 2 mol %) and 2-dicyclohexylphosphino-2',6'-dimethoxybiphenyl (SPhos, 4 mol %) were dissolved in 2 mL of toluene to give an orange solution. The catalyst solution was then transferred to the vial containing the indacene. While stirring, an ether solution of the appropriate Grignard reagent (ArMgBr) was added to give an intense color change to dark green and finally dark red/brown. The solution was heated to about 80° C. for about 16 hours. Upon cooling, the reaction mixture was concentrated and diluted with water. The organic layer was separated and aqueous layer was extracted with diethyl ether (3×15 mL). The combined extracts were washed with water and brine, dried over $MgSO_4$, filtered and concentrated in vacuo. The crude product was subjected to chromatography to separate starting material (1-5% EtOAc/Hexane over 10 column volumes CV on Biotage) to give spectroscopically pure desired indacenes.

General procedure to form indacene compound 110 using aryl boronic acids. 6-methyl-1,2,3,5-tetrahydro-8-bromo-s-indacene (1 equiv), the appropriate aryl boronic acid ($ArB(OH)_2$, 1.1 equiv), tris(dibenzylideneacetone)dipalladium(0) ($Pd_2(dba)_3$, 2 mol %), SPhos (4 mol %), and sodium tert-butoxide (NaOtBu, 2.2 equiv) were put in a 40 mL vial and suspended in 12.5 mL of THF. Water (2.5 mL) was then quickly added, the vial was sealed and heated to 75° C. for about 20 hours. After about 20 hours, the mixture was concentrated under N2 stream and diluted with 10 mL of water. The aqueous layer was extracted with ether (3×15 mL). The organic layer was washed with water (2×20 mL) and brine (1×20 mL) and was concentrated in vacuo to give an orange oil. The oil was chromatographed (Biotage gradient 0-5% hexane/EtOAc for 10 CV). However, the compound did not elute under those conditions. The column was repeated with a more aggressive gradient (0-20% over 8 CV) in order to elute the compound. After solvent removal the desired compound was obtained as a ratio of double bond isomers. The following compounds (with yields) were obtained: 6-methyl-8-(o-tolyl)-1,2,3,5-tetrahydro-s-indacene (60% yield); 8-([1,1'-biphenyl]-2-yl)-6-methyl-1,2,3,5-tetrahydro-s-indacene (62% yield); 8-(2-isopropylphenyl)-6-methyl-1,2,3,5-tetrahydro-s-indacene (80% yield); and 8-(4-(tert-butyl)phenyl)-6-methyl-1,2,3,5-tetrahydro-s-indacene (37% yield), 6-methyl-8-(naphtalen-1-yl)-1,2,3,5-tetrahydro-s-indacene (92% yield), 9-(6-methyl-1,2,3,7-tetrahydro-s-indacen-4-yl)anhracene (77% yield) 6-methyl-8-(2,4,5-trimethylphenyl)-1,2,3,5-tetrahydro-s-indacene (38% yield), 8-(3,5-di-tert-butyl-4-methoxyphenyl)-6-methyl-1,2,3,5-tetrahydro-s-indacene (81% yield), 8-(3,5-bis(trifluoromethyl)phenyl)-6-methyl-1,2,3,5-tetrahydro-s-indacene (81%).

General procedure to form lithiated ligands 120. Ligand precursors were suspended in 20 mL of diethyl ether and cooled to about −35° C. While stirring, a solution of n-butyllithium (n-BuLi, 1.1 equiv) was added dropwise, which resulted in instant color change from colorless to yellow. Almost immediately, the solid began to precipitate out of solution. The mixture was stirred at room temperature for about 18 hours. After about 18 hours, a copious amount of tan precipitate formed. Solvent was evaporated under $N_2$ stream and the resulting solid was washed with pentane (1×10 mL) and dried in vacuo to give a desired products with various amounts of residual diethylether in excellent yield and purity. The following compounds (with yields) were obtained:

(2-methyl-4-(o-tolyl)-1,5,6,7-tetrahydro-s-indacen-1-yl) lithium (91% Yield): $^1$H NMR (400 MHz, THF-d8) δ 7.28 (m, 5H), 5.69 (s, 1H), 5.25 (s, 1H), 2.85 (m, 2H), 2.60 (m, 2H) 2.31 (s, 3H), 2.19 (s, 3H), 1.94 (m, 2H).

(4-([1,1'-biphenyl]-2-yl)-2-methyl-1,5,6,7-tetrahydro-s-indacen-1-yl)lithium (96% Yield) $^1$H NMR (400 MHz, THF-d8) δ 7.49 (m, 2H), 7.37 (m, 2H), 7.20 (m, 2H), 7.00 (m, 4H), 5.73 (s, 1H), 5.58 (s, 1H), 2.64 (m, 2H), 2.35 (s, 3H), 2.19 (m, 1H), 1.99 (m, 1H), 1.55 (m, 2H).

(4-(2-isopropylphenyl)-2-methyl-1,5,6,7-tetrahydro-s-indacen-1-yl)lithium (98% Yield) $^1$H NMR (400 MHz, THF-d8) δ 7.48 (m, 2H), 7.32 (m, 3H), 6.20 (s, 1H), 5.69 (s, 1H) 3.31 (m, 1H), 3.14 (m, 2H), 2.87 (m, 2H), 2.49 (s, 3H), 2.06 (m, 2H), 1.20 (m, 6H).

(4-(4-(tert-butyl)phenyl)-2-methyl-1,5,6,7-tetrahydro-s-indacen-1-yl)lithium (99% yield) $^1$H NMR (37% Yield) $^1$H NMR (400 MHz, THF-d8) 7.89 (d, 2H), 7.53 (s, 1H), 7.48 (d, 2H), 3.12 (m, 4H), 2.56 (s, 3H), 2.04 (m, 2H), 1.33 (s, 9H).

(4-(3,5-di-tert-butyl-4-methoxyphenyl)-2-methyl-1,5,6,7-tetrahydro-s-indacen-1-yl)lithium (87% Yield)$^1$H NMR (400 MHz, THF-d8) 7.91 (s, 2H), 7.53 (s, 1H), 6.29 (s, 1H), 6.22 (s, 1H), 3.60 (s, 3H), 3.15 (m, 4H), 2.59 (s, 3H), 2.30 (m, 2H), 1.61 (s, 18H).

(2-methyl-4-(2,4,5-trimethylphenyl)-1,5,6,7-tetrahydro-s-indacen-1-yl)lithium (79% Yield) $^1$H NMR (400 MHz, $C_6D_6$/THF-d8) 7.08 (s, 1H), 7.00 (s, 1H), 6.95 (s, 1H), 5.71 (s, 1H), 5.26 (s, 1H), 2.91 (m, 2H), 2.52 (m, 4H) 2.29 (s, 6H), 2.23 (s, 3H), 2.04 (s, 3H).

(4-(3,5-bis(trifluoromethyl)phenyl)-2-methyl-1,5,6,7-tetrahydro-s-indacen-1-yl)lithium (97% Yield) $^1$H NMR (400 MHz, $C_6D_6$/THF-d8) 8.25 (s, 2H), 7.77 (s, 1H), 7.41 (s, 1H), 6.05 (s, 1H), 5.97 (s, 1H), 2.99 (m, 2H), 2.85 (m, 2H), 2.43 (s, 3H), 1.95 (m, 2H).

(2-methyl-4-(naphthalen-1-yl)-1,5,6,7-tetrahydro-s-indacen-1-yl)lithium (86% Yield) $^1$H NMR (400 MHz, THF-d8) 7.87 (m, 1H), 7.73 (m, 2H), 7.50 (m, 2H), 7.38 (m, 1H), 7.19 (m, 2H), 5.75 (s, 1H), 5.23 (s, 1H), 2.96 (m, 2H), 2.50 (m, 2H), 2.26 (s, 3H), 1.91 (m, 2H).

General procedure to form the ligand series $Me_4CpSi(Me_2)$-6-Me-8-Ar-1,2,3,5-tetrahydro-s-indacene 130. Chlorodimethyl(2,3,4,5-tetramethyl-2,4-cyclopentadien-1-yl)silane ($CpMe_4Si(Me)_2Cl$) or $CpMe_4Si(Me)_2OTf$ (1 equiv.) were dissolved in 15 mL of diethylether in a small round bottom flask with a stir bar. The corresponding lithium indacenide (1 equiv) was dissolved in a 5 mL of 1:1 mixture of ether/THF. Both solutions were chilled to about −35° C. in a glove box freezer. After cooling to about −35° C., a solution of lithium indacenide was added dropwise to the solution of $CpMe_4Si(Me)_2X$. After the addition was complete, the reaction mixture became cloudy yellow. The resulting mixture was allowed to warm up to about room temperature and was stirred for about 18 hours. The solvent was removed in vacuo and the residue was extracted with 15 mL of pentane and filtered. Solvent removal under reduced pressure gave the desired compounds as off-white foamy solids in quantitative yield. The crude products were used without further purification.

General procedure to form dilithium species 140. To a stirred solution of the $Me_4CpSi(Me_2)$-6-Me-8-Ar-1,2,3,5-tetrahydro-s-indacene in diethylether was slowly added n-BuLi (2.1 equiv.) at about −35° C. The solution was then stirred at about room temperature for about 20 hours. After about 20 hours, the solution was orange with some yellow precipitate. The solvent was removed under vacuum and the orange residue was washed with pentane (2×30 mL) and dried under vacuum to give a product as an ether adduct. The following compounds (with yields) were obtained:

Dilithium-dimethyl(2-methyl-4-(o-tolyl)-1,5,6,7-tetrahydro-s-indacen-1-yl)(2,3,4,5-tetramethylcyclopenta-2,4-dien-1-yl)silane (100% yield) $^1$H NMR (400 MHz, THF-ds): 7.46 (s, 1H), 7.31 (m, 5H), 2.79 (m, 2H), 2.58 (m, 2H), 2.36 (s, 3H), 2.17 (overlapping s, 9H), 1.96 (s, 6H), 1.89 (m, 2H), 0.60 (bs, 6H).

Dilithium-(4-([1,1'-biphenyl]-2-yl)-2-methyl-1,5,6,7-tetrahydro-s-indacen-1-yl)dimethyl(2,3,4,5-tetramethylcyclopenta-2,4-dien-1-yl)silane (100% yield)$^1$H NMR (400 MHz, THF) δ 7.53 (m, 3H), 7.24 (m, 4H), 7.00 (m, 3H), 5.73 (s, 1H), 2.47 (m, 2H), 2.38 (s, 3H), 2.16 (m, 2H), 1.95 (overlapping s, 12H), 1.60-1.49 (m, 2H), 0.65 (d, 6H).

Dilithium-(4-(2-isopropylphenyl)-2-methyl-1,5,6,7-tetrahydro-s-indacen-1-yl)dimethyl(2,3,4,5-tetramethylcyclopenta-2,4-dien-1-yl)silane (100% yield)$^1$H NMR (400 MHz, THF) δ 7.50 (m, 1H), 7.38 (m, 1H), 7.25 (m, 1H), 7.10 (m, 1H), 7.04 (m, 1H), 5.38 (s, 1H), 3.04 (m, 1H), 2.91 (m, 2H), 2.55 (m, 2H), 2.32 (s, 3H), 2.11 (bs, 6H), 1.90 (overlapping s, 8H), 1.08 (m, 6H), 0.65 (d, 6H).

Dilithium-dimethyl(2-methyl-4-(4-tertbutylphenyl)-1,5,6,7-tetrahydro-s-indacen-1-yl)(2,3,4,5-tetramethylcyclopenta-2,4-dien-1-yl)silane (100% yield)$^1$H NMR (400 MHz, THF) δ 7.59 (m, 1H), 7.52 (d, 2H), 7.39 (d, 2H), 5.87 (s, 1H), 2.89 (m, 6H), 2.15 (s, 3H), 1.94 (overlapping s, 8H), 1.41 (s, 9H), 0.63 (bs, 6H).

Dilithium-(4-(3,5-di-tert-butyl-4-methoxyphenyl)-2-methyl-1,5,6,7-tetrahydro-s-indacen-1-yl)dimethyl(2,3,4,5-tetramethylcyclopenta-2,4-dien-1-yl)silane (84% yield)$^1$H NMR (400 MHz, THF-d8) 7.66 (s, 2H), 7.62 (s, 1H), 6.04 (s, 1H), 3.91 (s, 3H), 3.04 (m, 4H) 2.54 (s, 3H), 2.30 (s, 6H), 2.09 (m, 12H), 1.64 (s, 18H), 0.77 (s, 6H).

Dilithium-dimethyl(2-methyl-4-(naphthalen-1-yl)-1,5,6,7-tetrahydro-s-indacen-1-yl)(2,3,4,5-tetramethylcyclopenta-2,4-dien-1-yl)silane $^1$H NMR (400 MHz, THF-$d_8$) δ 7.84 (s, 1H), 7.77 (s, 1H), 7.70 (m, 1H), 7.58 (s, 1H), 7.43 (s, 2H), 7.37 (s, 1H), 7.20 (s, 1H), 5.34 (s, 1H), 2.95 (s, 2H), 2.46 (s, 2H), 2.28 (s, 3H), 2.17 (s, 6H), 1.97 (s, 6H), 1.89 (s, 2H) 0.64 (s, 6H).

General procedure to form metallocenes 150 (used for catalysts A, B, C, D, E, F, I). $ZrCl_4(OEt_2)_2$ was added slowly to a stirred solution of dilithium species in about 40 mL of diethyl ether at about −35° C. The mixture initially darkened, and after about 1 hour regained the yellow color with a copious amount of white precipitate. The reaction was stirred for about 20 hours at about room temperature, after which time the reaction mixture was concentrated, and the residue was extracted with methylene chloride. The resulting bright yellow solution was filtered through celite and concentrated to give a yellow residue. Excess hexane (25 mL) was added which resulted in further precipitation of white product. The solution was filtered, concentrated to about 5 mL and placed in the freezer. The metallocene complexes were obtained from hexane solution as yellow powders. In instances with ortho substituted phenyl ring in the 4-position, isomer ratio is typically obtained due to the hindered rotation around the indacene moiety.

General procedure to form metallocenes 150 (used for catalysts G, H, J). nBuLi (2.05 equiv) was slowly added to a pre-cooled mixture of ligand 130 in diethylether. The mixture was allowed to warm up to room temperature and was stirred overnight. After ca. 18 hours the mixture was cooled back to −35° C. $ZrCl_4(OEt_2)_2$ was then added to the stirring mixture of in-situ prepared lithiated ligand. The mixture initially darkened, and after about 1 hour regained the yellow color with a copious amount of white precipitate. The reaction was stirred for about 20 hours at about room temperature, after which time the reaction mixture was concentrated, and the residue was extracted with methylene chloride. The resulting bright yellow solution was filtered through celite and concentrated to give a yellow residue. Excess hexane (25 mL) was added which resulted in further precipitation of white product. The solution was filtered, concentrated to about 5 mL and placed in the freezer. The metallocene complexes were obtained from hexane solution as yellow powders. In instances with ortho substituted phenyl ring in the 4-position, isomer ratio is typically obtained due to the hindered rotation around the indacene moiety.

Catalyst A: Dimethyl(2-methyl-4-(o-tolyl)-1,5,6,7-tetrahydro-s-indacen-1-yl)(2,3,4,5-tetramethylcyclopenta-2,4-dien-1-yl)silane zirconium dichloride (61% yield, 80:20 isomer ratio)$^1$H NMR (400 MHz, $CD_2Cl_2$) δ 7.43 (s, 1H), 7.35 (m, 3H), 7.19 (m, 2H), 6.98 (d, 1H), 6.57 (s, 1H), 2.91 (m, 4H), 2.52 (s, 3H), 2.26 (s, 3H), 2.06 (s, 3H), 2.00 (s, 3H), 1.95 (s, 3H), 1.93 (s, 3H), 1.23 (s, 3H), 1.11 (s, 3H).

Catalyst B: (4-([1,1'-biphenyl]-2-yl)-2-methyl-1,5,6,7-tetrahydro-s-indacen-1-yl)dimethyl(2,3,4,5-tetramethylcyclopenta-2,4-dien-1-yl)silane zirconium dichloride (44% yield, 90:10 isomer ratio)$^1$H NMR (400 MHz, Benzene-$d_6$) δ 8.47 (s, 1H), 7.45 (s, 1H), 7.32 (s, 1H), 7.24 (s, 2H), 7.12 (s, 2H), 6.88 (d, 4H), 2.68 (s, 1H), 2.52 (d, 3H), 2.30 (s, 1H), 2.02 (s, 3H), 1.97 (s, 3H), 1.92 (s, 3H), 1.87 (s, 3H), 1.81 (s, 3H), 1.69 (s, 2H), 1.44 (s, 2H), 0.76 (s, 3H), 0.62 (s, 3H).

Catalyst C: (4-(2-isopropylphenyl)-2-methyl-1,5,6,7-tetrahydro-s-indacen-1-yl)dimethyl(2,3,4,5-tetramethylcyclopenta-2,4-dien-1-yl)silane zirconium dichloride (52% yield. 92:8 isomer ratio)$^1$H NMR (400 MHz, Benzene-$d_6$) δ 8.25 (d, 1H), 7.35 (m, 2H), 7.23 (m, 2H), 6.67 (s, 1H), 2.89 (m, 1H), 2.74 (m, 4H), 2.62 (m, 1H), 1.98 (s, 3H), 1.95 (s, 3H), 1.94 (s, 3H), 1.88 (s, 3H), 1.85 (s, 3H), 1.24 (s, 4H), 1.10 (d, 3H), 1.02 (d, 3H), 0.84 (s, 3H), 0.65 (s, 3H).

Catalyst D: dimethyl(2-methyl-4-(4-tertbutylphenyl)-1,5,6,7-tetrahydro-s-indacen-1-yl)(2,3,4,5-tetramethylcyclopenta-2,4-dien-1-yl)silane zirconium dichloride (46% yield, single isomer)$^1$H NMR (400 MHz, Benzene-$d_6$) δ 7.89 (s, 2H), 7.45-7.40 (m, 2H), 7.38 (s, 1H), 7.07 (s, 1H), 3.03-2.88 (m, 2H), 2.88-2.67 (m, 2H), 2.03 (s, 3H), 1.98 (s, 3H), 1.92 (s, 3H), 1.88 (s, 6H), 1.85-1.75 (m, 2H), 1.24 (s, 9H), 0.86 (s, 3H). 0.66 (s, 3H).

Catalyst E: dimethyl(2-methyl-4-phenyl)-1,5,6,7-tetrahydro-s-indacen-1-yl)(2,3,4,5-tetramethylcyclopenta-2,4-dien-1-yl)silane zirconium dichloride $^1$H NMR ($CD_2Cl_2$): 7.57 (d, 2H), 7.45 (t, 2H), 7.34-7.39 (m, 2H), 6.68 (s, 1H), 2.80-2.93 (m, 4H), 2.22 (s, 3H), 2.03 (s, 3H), 1.96-2.00 (m, 2H), 1.94 (s, 3H), 1.92 (s, 3H), 1.89 (s, 3H), 1.21 (s, 3H), 1.08 (s, 3H).

Catalyst F: (4-(3,5-di-tert-butyl-4-methoxyphenyl)-2-methyl-1,5,6,7-tetrahydro-s-indacen-1-yl)dimethyl(2,3,4,5-tetramethylcyclopenta-2,4-dien-1-yl)silane zirconium dichloride (30% yield, single isomer)$^1$H NMR (400 MHz, Benzene-$d_6$) δ 7.54 (s, 2H), 7.41 (s, 1H), 6.78 (s, 1H), 3.78 (s, 3H) 3.07-2.85 (m, 6H), 2.27 (s, 3H), 2.09 (s, 3H), 2.02 (s, 3H), 1.97 (s, 3H), 1.93 (s, 3H), 1.50 (s, 18H) 1.25 (s, 3H). 1.13 (s, 3H).

Catalyst G: (4-(3,5-bis(trifluoromethyl)phenyl)-2-methyl-1,5,6,7-tetrahydro-s-indacen-1-yl)dimethyl(2,3,4,5-tetramethylcyclopenta-2,4-dien-1-yl)silane zirconium dichloride (72% yield, single isomer)$^1$H NMR (400 MHz, Benzene-$d_6$) δ 8.12 (s, 2H) 7.94 (s, 1H), 7.51 (s, 1H), 6.62 (s, 1H) 2.93 (m, 4H), 2.28 (s, 3H), 2.09 (s, 3H), 2.05 (s, 3H), 2.04 (m, 2H), 2.01 (s, 3H), 1.96 (s, 3H), 1.94 (s, 3H), 1.26 (s, 3H), 1.14 (s, 3H). $^{19}$F NMR (400 MHz, Benzene-$d_6$).

Catalyst H: (4-(3,5-di-tert-butyl-4-methoxyphenyl)-2-methyl-1,5,6,7-tetrahydro-s-indacen-1-yl)dimethyl(2,3,4,5-tetramethylcyclopenta-2,4-dien-1-yl)silane zirconium dichloride (57% yield, single isomer)$^1$H NMR (400 MHz, Benzene-$d_6$) a 7.43 (s, 1H, minor) 7.41 (s, 1H, major), 7.13 (s, major isomer), 7.10 (s, minor isomer), 6.75 (s, 1H, major isomer), 6.59 (s, 1H, major isomer), 6.37 (s, 1H, minor isomer), 2.90 (m, 5H, overlap minor and major isomers), 2.43 (m, 3H overlap minor and major isomers) 2.43 (s, 3H, major isomer), 2.32 (s, 3H minor isomer), 2.31 (s, 3H major isomer) 2.27 (s, 3H major isomer) 2.23 (s, 3H minor isomer) 2.31 (s, 3H minor isomer) 2.05 (s, 3H major isomer) 2.04 (s, 3H minor isomer) 1.99 (s, 3H minor isomer) 1.97 (s, 3H minor isomer) 1.94 (s, 3H minor isomer) 1.93 (s, 6H major and minor isomer) 1.92 (s, 6H major isomer) 1.91 (s, 6H minor isomer) 2.31 (s, 3H major isomer) 1.24 (s, 3H minor isomer) 1.23 (s, 3H major isomer) 1.11 (s, 3H minor isomer) 1.10 (s, 3H major isomer) δ −63.03 (s).

Catalyst J: (4-(anthracen-9-yl)-2-methyl-1,5,6,7-tetrahydro-s-indacen-1-yl)dimethyl(2,3,4,5-tetramethylcyclopenta-2,4-dien-1-yl)silane zirconium dichloride (51% yield, single isomer) $^1$H NMR (400 MHz, Benzene-$d_6$) δ 9.42 (d, 1H), 1.37 (s, 1H), 7.87 (m, 3H), 7.54 (m, 2H), 7.25 (m, 2H), 7.02 (m, 1H), 6.43 (s, 1H) 2.84 (m, 4H), 2.25 (m, 2H) 2.01 (s, 3H), 1.99 (s, 3H), 1.90 (s, 3H), 1.77 (s, 3H), 1.75 (s, 3H), 0.89 (s, 3H), 0.62 (s, 3H).

Catalyst I: dimethyl(2-methyl-4-(4-tertbutylphenyl)-1,5,6,7-tetrahydro-s-indacen-1-yl)(2,3,4,5-tetramethylcyclopenta-2,4-dien-1-yl)silane zirconium dichloride (46% yield, single isomer)$^1$H NMR (400 MHz, Benzene-$d_6$) δ 7.89 (s, 2H), 7.45-7.40 (m, 2H), 7.38 (s, 1H), 7.07 (s, 1H), 3.03-2.88 (m, 2H), 2.88-2.67 (m, 2H), 2.03 (s, 3H), 1.98 (s, 3H), 1.92 (s, 3H), 1.88 (s, 6H), 1.85-1.75 (m, 2H), 1.24 (s, 9H), 0.86 (s, 3H). 0.66 (s, 3H).

Preparation of Silica Supported MAO (SMAO).

In a celstir bottle, 20.0 g of silica (DM Series, AGC Chemicals, calcined at 200° C. for 3 days under $N_2$ flow) and 91.2 g of toluene were mixed. The silica slurry was then allowed to cool in the freezer for 30 mins. In a square bottle, 31.8 g MAO (30% toluene solution, GRACE chemicals), based on 7.5 mmol Al/g silica) was charged in and also cooled down in the freezer for 30 min. After 30 min., the cold MAO solution was added slowly into the silica slurry bottle by pipette. The solution was allowed to stir at room temperature for 1 hour. After 1 hour, the oil bath was heated up to 100° C. and the solution stirred at 100° C. for 3 hours. After 2.5 hours of stirring, the celstir bottle was taken off the heat and continued to stir for another 30 min. The mixture was then filtered, washed 2×20 g toluene (to remove toluene soluble MAO) and 2×20 g isohexane (to remove toluene for easier drying). The product was dried under vacuum overnight.

Supported Catalyst A: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst A (19.7 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst A as an orange solid in quantitative yield.

Supported Catalyst B: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst B (21.7 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst B as an orange solid in quantitative yield.

Supported Catalyst C: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst C (20.6 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst C as an orange solid in quantitative yield.

Supported Catalyst D: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst D (21.1 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst D as an orange solid in quantitative yield.

Supported Catalyst E: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst E (19.2 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst E as an orange solid in quantitative yield.

Supported Catalyst F: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst E (19.2 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst E as an orange solid in quantitative yield.

Supported Catalyst G: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst E (19.2 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst E as an orange solid in quantitative yield.

Supported Catalyst H: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst E (19.2 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst E as an orange solid in quantitative yield.

Supported Catalyst I: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst E (19.2 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst E as an orange solid in quantitative yield.

Supported Catalyst J: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst E (19.2 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported catalyst E as an orange solid in quantitative yield.

Molecular metallocene catalyst P used in supportive examples was obtained from commercial sources. Catalyst R was prepared according to WO 2001/048034. Catalyst S was prepared as described in WO 2005/058916A2. Catalyst Q was prepared according to WO2017/196331A1. Catalysts K-O were obtained in a similar manner as described in US 2015/0119539.

Supported catalysts K-S were prepared according to following general procedure: 1 g of SMAO (200° C. calcination) was suspended in 5 mL of toluene and placed on a shaker. TIBAL (7 wt % relative to silica) was added, and the resulting mixture was allowed to shake for 15 minutes. After 15 minutes, metallocene catalyst K-S (corresponding to 0.3 wt % Zr with respect to silica) was added as a toluene solution (2 mL) to the silica mixture. The mixture was allowed to react for 3 hours. After 3 hours, the mixture was filtered and the solid was washed with toluene (5 mL) and hexane (2×5 mL) and dried in vacuo to give supported catalysts K-S as free-flowing solids in quantitative yield.

Herein, a $C_1$ symmetric metallocene family is described. This catalyst family produces highly crystalline isotactic polypropylene with high activities and good molecular weights. In addition, unlike many of the $C_2$ symmetric bis-indenyl catalysts that show rapid deactivation in the presence of alpha olefins and dienes, the catalyst family described herein is tolerant of higher alpha olefins and α,ω-dienes, such as 1-octene, and 1,7-octadiene (and at high concentrations) while maintaining excellent incorporation capabilities and high activities. This capability can be applied to the production of in-reactor long chain branched and short chain branched polypropylene.

The catalyst family described herein can be used to produce, for example, propylene based polymers including homopolymer propylene (e.g., iPP), propylene-octene copolymer, and long chain branched polypropylene. In some examples, propylene homopolymers prepared in solution process have exceptionally high crystallinity (e.g., $T_m$ of from about 155° C. to about 160° C. or more) with molecular weights (Mw) of from about 90,000 g/mol to about 130,000 g/mol. The corresponding homopolymers prepared in slurry process with supported catalysts exhibit similarly high polymer crystallinities and much improved molecular weights (Mw>400,000 g/mol) at comparable and often times improved activities relative to state of the art $C_2$ symmetric metallocenes used as comparative examples. The capability for diene and α-olefin incorporation without catalyst activity reduction provides another application for inventive catalysts described in this document.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A catalyst compound represented by the Formula (I):

(I)

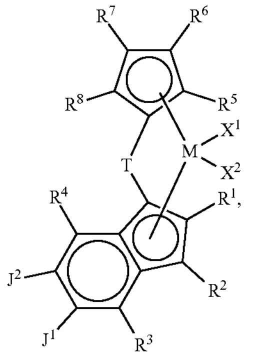

wherein:

M is zirconium or hafnium;

T is a bridging group;

each of $X^1$ and $X^2$ is a halide or a $C_1$-$C_5$ hydrocarbyl, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;

$R^3$ is an unsubstituted $C_4$-$C_{62}$ cycloalkyl, a substituted $C_4$-$C_{62}$ cycloalkyl, a substituted $C_4$-$C_{62}$ aryl, an unsubstituted $C_4$-$C_{62}$ heteroaryl, or a substituted $C_4$-$C_{62}$ heteroaryl, such that when $R^3$ is a substituted $C_4$-$C_{62}$ aryl, it is substituted with at least one of $C_1$-$C_{40}$ substituted hydrocarbyl, a heteroatom, or a heteroatom-containing group;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR', —SiR'$_3$, —OSiR'$_3$, —PR'$_2$, or —R"—

$SiR'_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, an unsubstituted $C_1$-$C_{40}$ hydrocarbyl, or a $C_1$-$C_{40}$ substituted hydrocarbyl; and $J^1$ and $J^2$ are joined to form a substituted or unsubstituted $C_4$-$C_{62}$ saturated or unsaturated cyclic or polycyclic ring structure, or a combination thereof, provided that $J^1$ and $J^2$ together with the two carbons they are bound to on the indenyl group form at least one saturated ring.

2. A catalyst compound represented by the Formula (III):

(III)

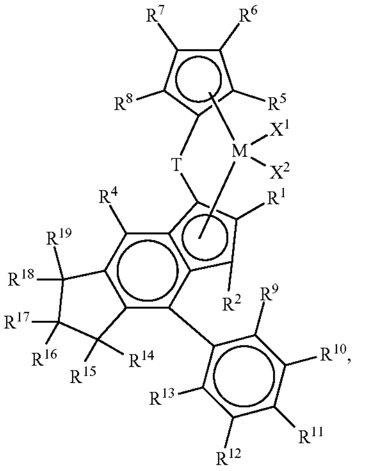

wherein:

M is zirconium or hafnium;

T is a bridging group;

each of $X^1$ and $X^2$ is a halide or a $C_1$-$C_5$ hydrocarbyl, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR, —$SiR'_3$, —$OSiR'_3$, —$PR'_2$, or —R"—$SiR'_3$, where R" is $C_1$-$C_{10}$ alkyl and each R' is hydrogen, halogen, $C_1$-$C_{10}$ alkyl, or $C_6$-$C_{10}$ aryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR', —$SiR'_3$, —$OSiR'_3$, —$PR'_2$, or —R"—$SiR'_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, an unsubstituted $C_1$-$C_{40}$ hydrocarbyl, a $C_1$-$C_{40}$ substituted hydrocarbyl;

each of $R^9$, $R^{10}$, $R^{11}$, $R^{12}$, and $R^{13}$ is independently hydrogen, $C_1$-$C_{40}$ hydrocarbyl or $C_1$-$C_{40}$ substituted hydrocarbyl, a heteroatom or a heteroatom-containing group, or two or more of $R^9$, $R^{10}$, $R^{11}$, $R^{12}$, and $R^{13}$ are joined together to form a $C_4$-$C_{20}$ cyclic or polycyclic ring structure;

each of $R^{14}$, $R^1$, $R^{18}$, and $R^{19}$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR, —$SiR'_3$, —$OSiR'_3$, —$PR'_2$, or —R"—$SiR'_3$, wherein R" is $C_1$-$C_{10}$ alkyl and each R' is hydrogen, halogen, $C_1$-$C_{10}$ alkyl, or $C_6$-$C_{10}$ aryl, or two or more of $R^{14}$, $R^1$, $R^{16}$, $R^7$, $R^{18}$, and $R^{19}$ are joined together to form cyclic or polycyclic ring structure, or a combination thereof; and each of $R^{16}$ and $R^{17}$ is a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR', —$SiR'_3$, —$OSiR'_3$, —$PR'_2$, or —R"—$SiR'_3$, wherein R" is $C_1$-$C_{10}$ alkyl and each R' is hydrogen, halogen, $C_1$-$C_{10}$ alkyl, or $C_6$-$C_{10}$ aryl, or two or more of $R^{14}$, $R^1$, $R^{16}$, $R^7$, $R^{18}$, and $R^{19}$ are joined together to form cyclic or polycyclic ring structure, or a combination thereof.

3. A catalyst compound represented by the Formula (IV):

(IV)

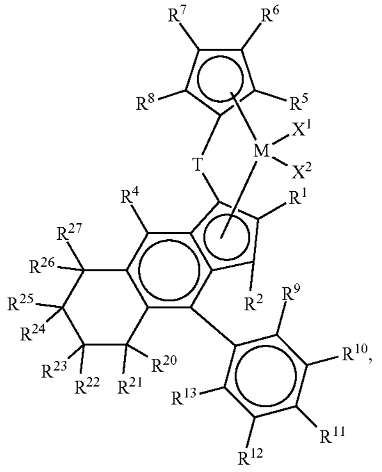

wherein:

M is zirconium or hafnium;

T is a bridging group;

each of $X^1$ and $X^2$ is a halide or a $C_1$-$C_5$ hydrocarbyl, or $X^1$ and $X^2$ are joined to form a metallocycle ring;

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR', —$SiR'_3$, —$OSiR'_3$, —$PR'_2$, or —R"—$SiR'_3$, where R" is $C_1$-$C_{10}$ alkyl and each R' is hydrogen, halogen, $C_1$-$C_{10}$ alkyl, or $C_6$-$C_{10}$ aryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR', —$SiR'_3$, —$OSiR'_3$, —$PR'_2$, or —R"—$SiR'_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, an unsubstituted $C_1$-$C_{40}$ hydrocarbyl, a $C_1$-$C_{40}$ substituted hydrocarbyl;

each of $R^9$, $R^{10}$, $R^{11}$, $R^{12}$, and $R^{13}$ is independently hydrogen, $C_1$-$C_{40}$ hydrocarbyl or $C_1$-$C_{40}$ substituted hydrocarbyl, a heteroatom or a heteroatom-containing group, or two or more of $R^9$, $R^{10}$, $R^{11}$, $R^{12}$, and $R^{13}$ are joined together to form a $C_4$-$C_{20}$ cyclic or polycyclic ring structure; and each of $R^{20}$, $R^{21}$, $R^{22}$, $R^{23}$, $R^{24}$, $R^{25}$, $R^{26}$, $R^{27}$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or two or more of $R^{20}$, $R^{21}$, $R^{22}$, $R^{23}$, $R^{24}$, $R^{25}$, $R^{26}$, $R^{27}$ are joined together to form cyclic or polycyclic ring structure, or a combination thereof.

4. The catalyst compound of claim 1, wherein T is represented by the formula:

$(R^*_2G)_g$, wherein each G is C, Si, or Ge, g is 1 or 2, and each R* is, independently, hydrogen, halogen, $C_1$-$C_{20}$ unsubstituted hydrocarbyl, a $C_1$-$C_{20}$ substituted hydrocarbyl, or the two or more R* may join to form a substituted or unsubstituted, saturated, partially unsaturated or aromatic, cyclic or polycyclic substituent, or wherein T is selected from the group consisting of $CH_2$, $CH_2CH_2$, $C(CH_3)_2$, $(Ph)_2C$, $(p\text{-}(Et)_3SiPh)_2C$, $SiMe_2$, $SiPh_2$, SiMePh, $Si(CH_2)_3$, $Si(CH_2)_4$, and $Si(CH_2)_4$.

5. The catalyst compound of claim 1, wherein each of $R^5$, $R^6$, $R^7$, and $R^8$ is independently an unsubstituted $C_1$-$C_6$ hydrocarbyl, or a substituted $C_1$-$C_6$ hydrocarbyl.

6. The catalyst compound of claim 1, wherein $R^1$ is hydrogen, a substituted $C_1$-$C_6$ hydrocarbyl, or an unsubstituted $C_1$-$C_6$ hydrocarbyl.

7. The catalyst compound of claim 1, wherein each of $R^2$ and $R^4$ is independently hydrogen, a substituted $C_1$ to $C_6$ hydrocarbyl, or an unsubstituted $C_1$ to $C_6$ hydrocarbyl.

8. The catalyst compound of claim 1, wherein the catalyst compound is selected from the group consisting of:

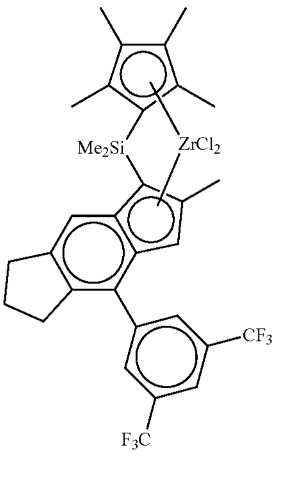

and

-continued

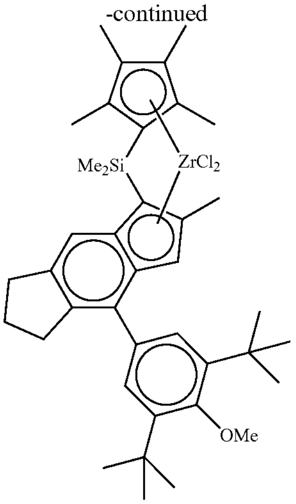

.

9. A process comprising:

introducing propylene, optionally one or more of a $C_2$ or $C_4$ to $C_{40}$ olefin monomer, preferably a $C_4$ to $C_{20}$ alpha olefin or a $C_4$ to $C_{14}$ α,ω-olefin or a $C_4$ to $C_8$ alpha olefin, and a catalyst system formed from the catalyst compound of any one of claims 1-3 and an activator into a reactor at a reactor pressure of from 0.7 bar to 70 bar and a reactor temperature of from 20° C. to 150° C.; and obtaining a propylene homopolymer or copolymer.

10. The process of claim 9, wherein the propylene homopolymer has a Mw of 50,000 to 500,000 g/mol, and $T_m$ of greater than 150° C.

11. The process of claim 9, wherein the olefin monomer is 1,4-heptadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 2-methyl-1,6-heptadiene, 2-methyl-1,7-octadiene, 2-methyl-1,8-nonadiene, 2-methyl-1,9-decadiene, 2-methyl-1,10-undecadiene, 2-methyl-1,11-dodecadiene, 2-methyl-1,12-tridecadiene, or 2-methyl-1,13-tetradecadiene.

12. The process of claim 9, wherein the propylene copolymer has a Mw value of 50,000 to 500,000 g/mol, and a $T_m$ of greater than 148° C., a $T_m$ of from 148° C. to 159° C. and $T_c$ of from 112° C. to 125° C., from 0.1 wt % to 50 wt % of one or more of $C_2$ or $C_4$ to $C_{20}$ olefin comonomer, based on a total amount of propylene copolymer, a $g'_{vis}$ of about 0.5 to about 0.97, a shear thinning ratio of about 0.007 to about 0.12, a complex viscosity as measured by oscillatory shear at a radial frequency of 100 rad/s of about 240 Pa·s to about 1,400 Pa·s, a complex viscosity as measured by oscillatory shear at a radial frequency of 0.1 rad/s of about 2,000 Pa·s to about 60,000 Pa·s, a strain hardening ratio of about 5 to about 25, as determined by dividing a Hencky strain rate at 1.0 $sec^{-1}$ and 2.5 seconds by a Hencky strain rate at 0.1 $sec^{-1}$ at 2.5 seconds, at Hencky strain of 2.5 and at Hencky strain rate of 1.0 $s^{-1}$, an extensional viscosity of about 600 kPa·s or less, measured at 190° C., and a 1% Secant flexural modulus of about 1,300 MPa to about 2,300 MPa.

13. The catalyst compound of claim 1 wherein $R^3$ is selected from cyclohexyl, cyclopentyl, cyclooctyl, adamantyl, benzyl, carbazolyl, and fluorenyl.

14. The catalyst compound of claim 1 wherein $R^3$ is a substituted aryl group represented by the formula:

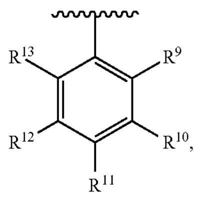

wherein each of $R^9$, $R^{10}$, $R^{11}$, $R^{12}$, and $R^{13}$ is independently hydrogen, $C_1$-$C_{40}$ hydrocarbyl or $C_1$-$C_{40}$ substituted hydrocarbyl, a heteroatom or a heteroatom-containing group, or two or more of $R^9$, $R^{10}$, $R^{11}$, $R^{12}$, and $R^{13}$ are joined together to form a $C_4$-$C_{20}$ cyclic or polycyclic ring structure, and at least one of $R^9$, $R^{10}$, $R^{11}$, $R^{12}$, and $R^{13}$ is a $C_1$-$C_{40}$ substituted hydrocarbyl, a heteroatom, or a heteroatom-containing group.

15. The catalyst compound of claim 14 wherein the heteroatom or heteroatom-containing group is independently halogen, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl.

16. The catalyst compound of claim 1 wherein $R^3$ is a substituted $C_4$-$C_{62}$ aryl wherein at least one hydrogen atom of the $C_4$-$C_{62}$ aryl has been substituted with a group selected from halocarbyl, —OR', —NR'$_2$, —SR', —SiR$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl.

17. The catalyst compound of claim 2, wherein T is represented by the formula:

$(R^*_2G)_g$, wherein each G is C, Si, or Ge, g is 1 or 2, and each R* is, independently, hydrogen, halogen, $C_1$-$C_{20}$ unsubstituted hydrocarbyl, a $C_1$-$C_{20}$ substituted hydrocarbyl, or the two or more R* may join to form a substituted or unsubstituted, saturated, partially unsaturated or aromatic, cyclic or polycyclic substituent, or wherein T is selected from the group consisting of $CH_2$, $CH_2CH_2$, $C(CH_3)_2$, $(Ph)_2C$, $(p\text{-}(Et)_3SiPh)_2C$, $SiMe_2$, $SiPh_2$, SiMePh, $Si(CH_2)_3$, $Si(CH_2)_4$, and $Si(CH_2)_4$.

18. The catalyst compound of claim 2, wherein each of $R^5$, $R^6$, $R^7$, and $R^8$ is independently an unsubstituted $C_1$-$C_6$ hydrocarbyl, or a substituted $C_1$-$C_6$ hydrocarbyl.

19. The catalyst compound of claim 2, wherein $R^1$ is hydrogen, a substituted $C_1$-$C_6$ hydrocarbyl, or an unsubstituted $C_1$-$C_6$ hydrocarbyl.

20. The catalyst compound of claim 2, wherein each of $R^2$ and $R^4$ is independently hydrogen, a substituted $C_1$ to $C_6$ hydrocarbyl, or an unsubstituted $C_1$ to $C_6$ hydrocarbyl.

21. The catalyst compound of claim 2, wherein at least one of $R^9$, $R^{10}$, $R^{11}$, $R^{12}$, and $R^{13}$ is selected from halocarbyl, —OR', —NR'$_2$, —SR', —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl.

22. The catalyst compound of claim 2, wherein the catalyst compound is represented by the following chemical formula:

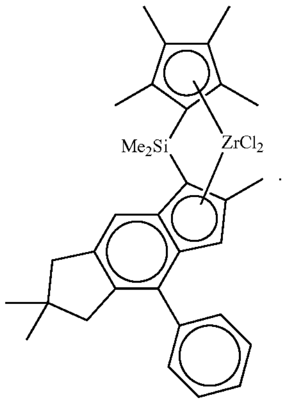

23. The catalyst compound of claim 3, wherein T is represented by the formula:

$(R^*_2G)_g$, wherein each G is C, Si, or Ge, g is 1 or 2, and each R* is, independently, hydrogen, halogen, $C_1$-$C_{20}$ unsubstituted hydrocarbyl, a $C_1$-$C_{20}$ substituted hydrocarbyl, or the two or more R* may join to form a substituted or unsubstituted, saturated, partially unsaturated or aromatic, cyclic or polycyclic substituent, or wherein T is selected from the group consisting of $CH_2$, $CH_2CH_2$, $C(CH_3)_2$, $(Ph)_2C$, $(p\text{-}(Et)_3SiPh)_2C$, $SiMe_2$, $SiPh_2$, SiMePh, $Si(CH_2)_3$, $Si(CH_2)_4$, and $Si(CH_2)_4$.

24. The catalyst compound of claim 3, wherein each of $R^5$, $R^6$, $R^7$, and $R^8$ is independently an unsubstituted $C_1$-$C_6$ hydrocarbyl, or a substituted $C_1$-$C_6$ hydrocarbyl.

25. The catalyst compound of claim 3, wherein $R^1$ is hydrogen, a substituted $C_1$-$C_6$ hydrocarbyl, or an unsubstituted $C_1$-$C_6$ hydrocarbyl.

26. The catalyst compound of claim 3, wherein each of $R^2$ and $R^4$ is independently hydrogen, a substituted $C_1$ to $C_6$ hydrocarbyl, or an unsubstituted $C_1$ to $C_6$ hydrocarbyl.

27. The catalyst compound of claim 3, wherein at least one of $R^9$, $R^{10}$, $R^{11}$, $R^{12}$, and $R^{13}$ is selected from halocarbyl, —OR', —NR'$_2$, —SR', —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl.

28. The catalyst compound of claim 3, wherein the catalyst compound is represented by the following chemical formula:

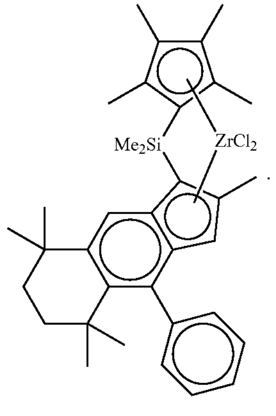

* * * * *